(12) United States Patent
Wang et al.

(10) Patent No.: US 12,207,259 B2
(45) Date of Patent: Jan. 21, 2025

(54) SIDELINK MODE 1 MINI-SLOT

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Fairless Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 17/647,003

(22) Filed: Jan. 4, 2022

(65) Prior Publication Data

US 2023/0217441 A1     Jul. 6, 2023

(51) Int. Cl.
| | | |
|---|---|---|
| *H04W 72/20* | (2023.01) | |
| *H04L 1/00* | (2006.01) | |
| *H04L 5/00* | (2006.01) | |
| *H04W 28/26* | (2009.01) | |

(52) U.S. Cl.
CPC .......... *H04W 72/20* (2023.01); *H04L 1/0061* (2013.01); *H04L 5/0012* (2013.01); *H04L 5/0053* (2013.01); *H04W 28/26* (2013.01)

(58) Field of Classification Search
CPC ..... H04W 72/20; H04W 28/26; H04W 92/18; H04W 72/25; H04L 1/0061; H04L 5/0012; H04L 5/0053; H04L 1/08; H04L 1/0025; H04L 1/1822; H04L 1/1854; H04L 5/0094; H04L 5/0044

See application file for complete search history.

(56) References Cited

U.S. PATENT DOCUMENTS

| | | | | |
|---|---|---|---|---|
| 2019/0149365 | A1* | 5/2019 | Chatterjee | ........... H04L 25/0226 |
| | | | | 370/329 |
| 2020/0228236 | A1* | 7/2020 | Xi | ......................... H04L 1/0057 |
| 2020/0389897 | A1* | 12/2020 | Mondal | ................. H04W 16/02 |
| 2021/0195625 | A1* | 6/2021 | Xu | ......................... H04W 72/23 |
| 2021/0250159 | A1* | 8/2021 | Su | ......................... H04L 5/0094 |
| 2021/0297971 | A1* | 9/2021 | Hosseini | ............. H04W 56/001 |
| 2021/0400689 | A1* | 12/2021 | Wang | .................... H04W 72/20 |
| 2023/0299935 | A1* | 9/2023 | Lee | ........................ H04L 5/1469 |
| | | | | 370/329 |

FOREIGN PATENT DOCUMENTS

WO      WO-2022175894 A1 *   8/2022

* cited by examiner

*Primary Examiner* — Ashley Shivers
(74) *Attorney, Agent, or Firm* — Arent Fox, LLP / Qualcomm

(57) ABSTRACT

Aspects are provided which allow a base station to indicate use of a mini-slot based resource allocation in sidelink communications between a Tx UE and a Rx UE. Initially, the base station configures control information indicating a sidelink data resource for a mini-slot, and transmits the control information to a Tx UE. After the Tx UE receives the control information, the Tx UE transmits sidelink data in the sidelink data resource to a Rx UE. Similarly, the Rx UE receives the control information from either the Tx UE or the base station, and the Rx UE receives the sidelink data in the sidelink data resource from the Tx UE. Accordingly, the base station may schedule the Tx UE and Rx UE to communicate sidelink data in mini-slots rather than slots, thereby reducing scheduling latency, increasing the number of available resources, and achieving more flexibility in sidelink communications.

30 Claims, 24 Drawing Sheets

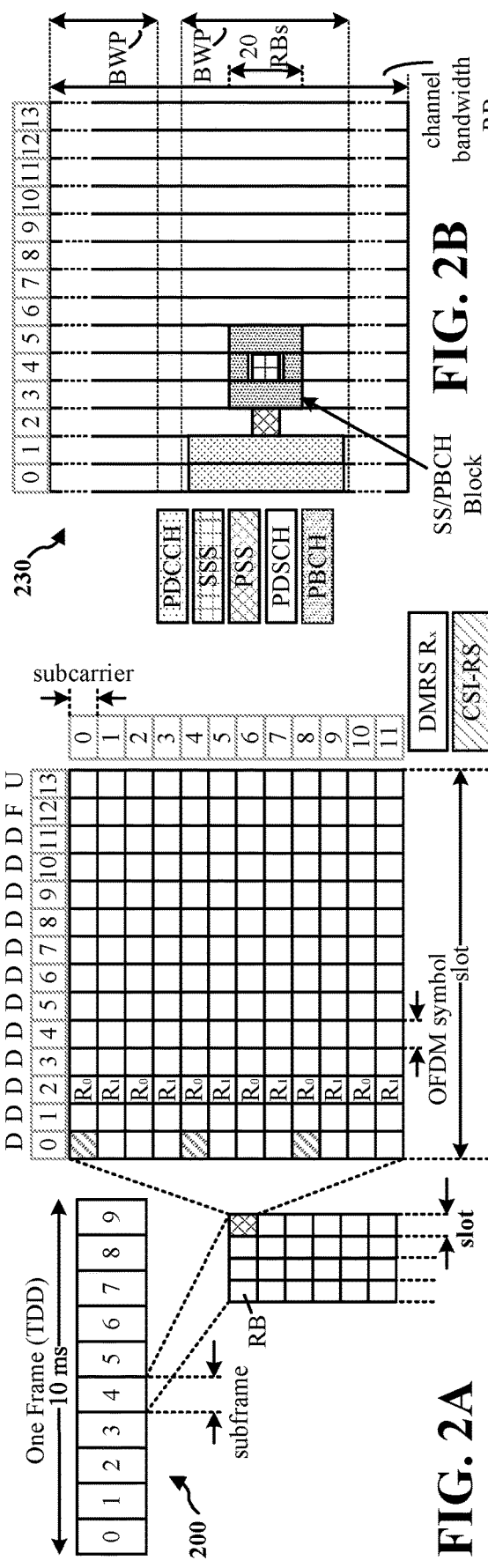
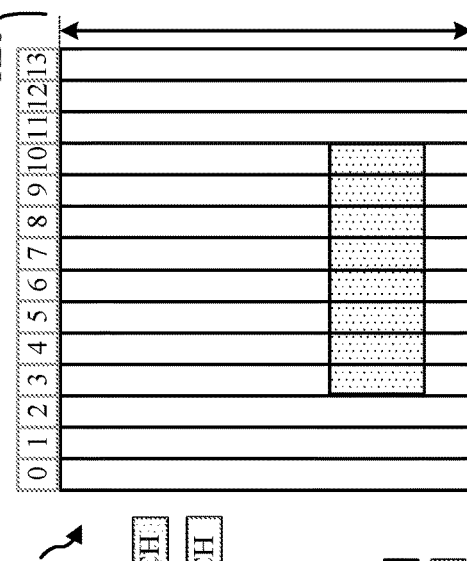
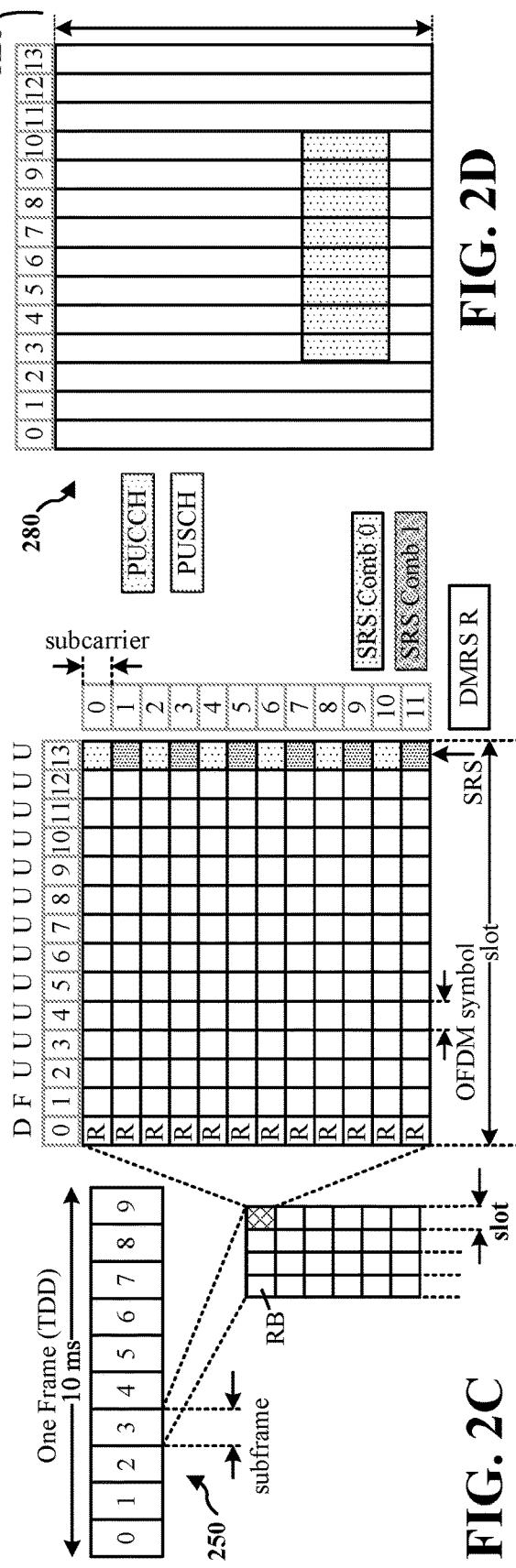
FIG. 2A
FIG. 2B
FIG. 2C
FIG. 2D

SIDELINK MODE 1 MINI-SLOT

BACKGROUND

Technical Field

The present disclosure generally relates to communication systems, and more particularly, to wireless, sidelink communication between user equipment (UEs) and to wireless communication between a UE and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, some aspects of wireless communication include direct communication between devices, such as device-to-device (D2D), vehicle-to-everything (V2X), and the like. There exists a need for further improvements in such direct communication between devices. Improvements related to direct communication between devices may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE which transmits sidelink data (e.g., a transmitting [Tx] UE). The apparatus receives control information indicating a sidelink data resource for a mini-slot. The apparatus communicates sidelink data in the sidelink data resource with a UE.

In an aspect of the disclosure, a method, a computer-readable medium, and an apparatus are provided. The apparatus may be a base station. The apparatus configures control information indicating a sidelink data resource for a mini-slot. The apparatus transmits the control information to a UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
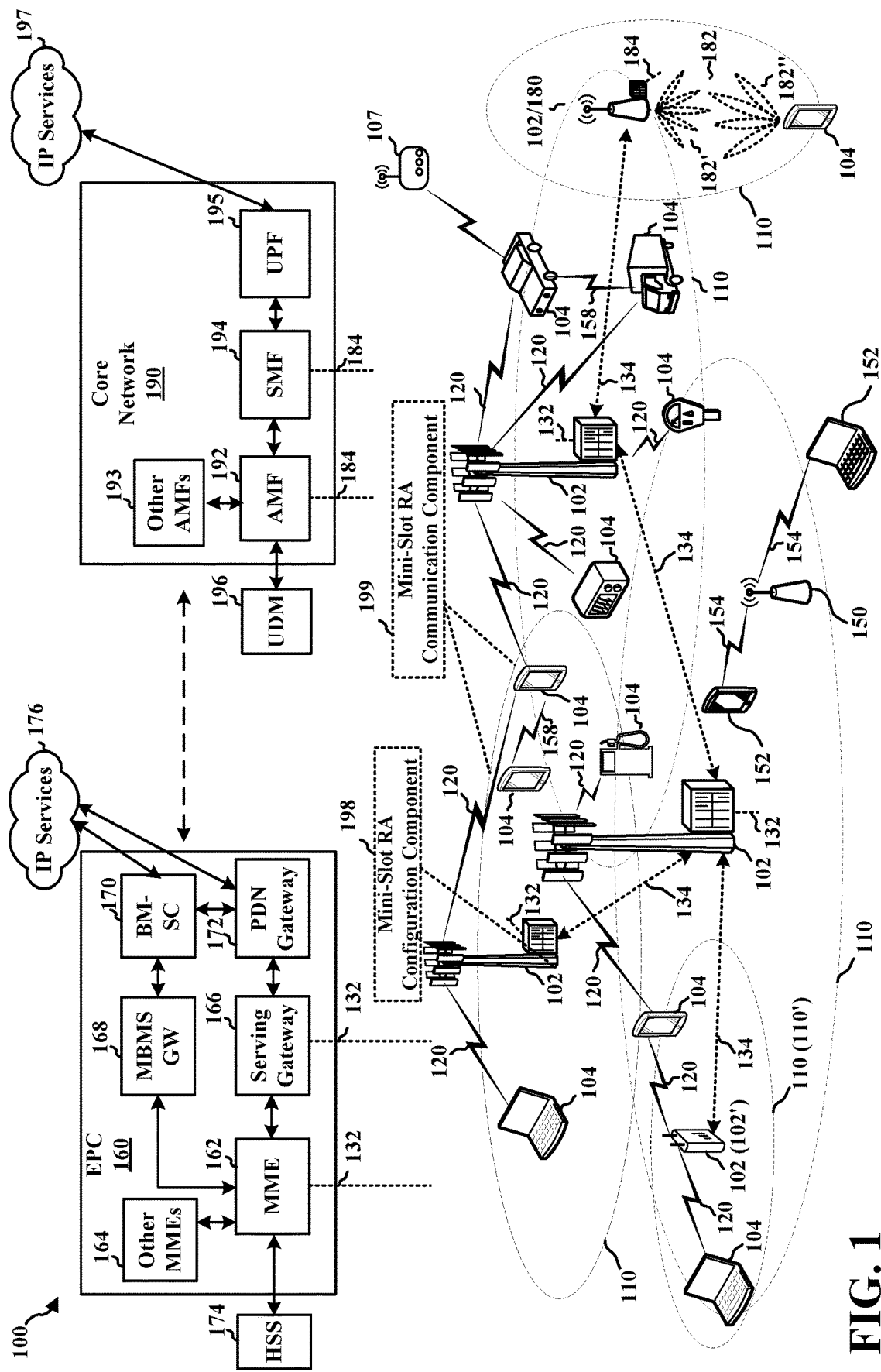
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Generally, in sidelink communications, a Tx UE initially achieves sidelink synchronization with a Rx UE. Following synchronization, the Tx UE may obtain an allocation of time-frequency resources, e.g., one or more slots, RBs, or subchannels in a resource pool, in which to transmit sidelink data to the Rx UE. Typically, the resource allocation may be scheduled by a base station in downlink control information (DCI) (in a mode 1 resource allocation), or the resource allocation may be determined through a sensing procedure conducted autonomously by the Tx UE (in a mode 2 resource allocation). After determining the resources, the Tx UE may send sidelink control information (SCI) including the resource allocation in a physical sidelink control channel (PSCCH) to the Rx UE. The Tx UE may transmit the SCI in two stages, including a first-stage SCI (also referred to as SCI-1) carried on PSCCH, and a second-stage SCI (also referred to as SCI-2) carried on a physical sidelink shared channel (PSSCH). SCI-1 may contain information about the resource allocation, while SCI-2 may carry information for identifying and decoding the sidelink data. The Tx UE may transmit the sidelink data in the PSSCH to the Rx UE in the allocated resources.

Currently, sidelink resource pools and sidelink resource allocations are slot-based (e.g., one scheduling opportunity or resource reservation per slot). For example, when the base station configures a resource pool index and a number of resource reservations in the associated resource pool for sidelink communication, each of the resource reservations in the resource pool may span a duration of one slot at minimum. In another example, each resource reservation may span a number of symbols less than that of a slot, but only one resource reservation may be present in a slot. For instance, in a slot-based resource allocation, even if a resource reservation spans only the first 7 symbols in a 14 symbol slot, the remaining 7 symbols of that slot may not be allocated in another resource reservation for sidelink communication. Moreover, the base station may provide system information including a semi-static slot format for a given bandwidth, where the slot format indicates which symbols of a slot are downlink (DL), uplink (UL), or flexible (F, which may be configured as either DL or UL). The base station may also indicate a configured start symbol and a configured number of symbols or length which are applicable for sidelink communications. Based on all of this information, the Tx UE may determine whether a resource pool may be used for sidelink transmission.

However, slot-based resource allocation may result in increased scheduling latency for sidelink communications. For example, if a Tx UE receives a sidelink grant shortly before a configured start symbol for the sidelink communication, or if the Tx UE receives the sidelink grant in the middle of a configured symbol length for the sidelink communication, the Tx UE may not have sufficient time to configure and transmit the sidelink communication within that configured range of symbols to the Rx UE. As a result, the Tx UE may wait until a subsequent slot to send the sidelink communication, increasing scheduling latency. Moreover, slot-based resource allocation has relatively coarse granularity (one scheduling opportunity or resource reservation per slot), resulting in limited flexibility for sidelink communications. For example, each resource reservation may encompass a fixed number of symbols (e.g., 14 symbols for a slot), limiting the number of possible resource allocations available for sidelink communications. Moreover, the aforementioned, semi-statically configured slot formats applicable for slot-based resource allocations may reduce the number of resources available for sidelink communications. For example, a Tx UE may be limited to transmit sidelink data in reserved resources within slots having only UL symbols, thereby reducing the number of possible slots which may be scheduled for sidelink communications.

Accordingly, aspects of the present disclosure allow a base station to schedule sidelink data in mini-slots (e.g., in a mini-slot based resource allocation) rather than merely slots. For instance, the base station may configure and transmit control information indicating a sidelink data resource for a mini-slot. A Tx UE which receives this control information may transmit sidelink data in the sidelink data resource to a Rx UE. Similarly, a Rx UE may receive control information indicating a sidelink data resource for a mini-slot, and accordingly receive sidelink data in the sidelink resource from a Tx UE. As a result of mini-slot based resource allocations, the scheduling latency for sidelink communications may be reduced, the number of available resources for sidelink communications may be increased, and more flexibility in sidelink communications may be achieved than in slot-based resource allocations.

In various examples, a mini-slot based resource allocation may include more than one scheduling opportunity or resource reservation per slot. Moreover, a mini-slot may include any number of symbols less than that of a slot (e.g., if a slot is 14 symbols, a mini-slot may be any number between and including 1 and 13 symbols). In one example, during mode 1 resource allocation, a base station may provide a DCI indicating use of a mini-slot based resource allocation to schedule sidelink data resources configured in the DCI. For instance, each of the resource reservations in a resource pool configured by the base station may span a duration of one mini-slot at minimum, rather than one slot at minimum as in slot-based resource allocations. Thus, unlike slot-based resource allocations, here more than one resource reservation may be present in a slot. For example, in a mini-slot based resource allocation including 7-symbol mini-slots, two sidelink data resources may be within a 14 symbol slot, in contrast to only one 7-symbol, sidelink data resource in a slot-based resource allocation. In different examples, the base station may indicate a mini-slot based resource allocation via a resource pool index in the DCI, a cyclic redundancy check scrambling sequence for the DCI, a radio resource control configuration indicating a mini-slot based, time domain resource allocation (TDRA) and frequency domain resource allocation (FDRA), one or more dedicated fields in the DCI, a time resource indicator value (TRIV) for the TDRA and a frequency resource indicator value (FRIV) for the FDRA in the DCI, or a configuration index in the DCI. Moreover, the Tx UE receiving the DCI may indicate the mini-slot based resource allocation in SCI to the Rx UE. Additionally, while the aforementioned examples specifically refer to mode 1 resource allocation, the aspects of the present disclosure are not limited to this type of resource allocation. For instance, during mode 2 resource allocation, the Tx UE may similarly provide SCI indicating use of a mini-slot based resource allocation to schedule sidelink data resources which are autonomously determined by the Tx UE.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication, e.g., as described in connection with the example in FIG. 3.

Although the present disclosure may focus on V2X/D2D or other sidelink communication in connection with 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the base station 102/180 may include a mini-slot resource allocation (RA) configuration component 198 that is configured to configure control information indicating a sidelink data resource for a mini-slot, and to transmit the control information to a UE. In other aspects, the UE 104 (e.g., a Tx UE or a Rx UE) may include a mini-slot RA communication component 199 that is configured to receive control information indicating a sidelink data resource for a mini-slot; and communicate sidelink data in the sidelink data resource with a UE (e.g., a Rx UE or a Tx UE, respectively).

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include, for example, 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
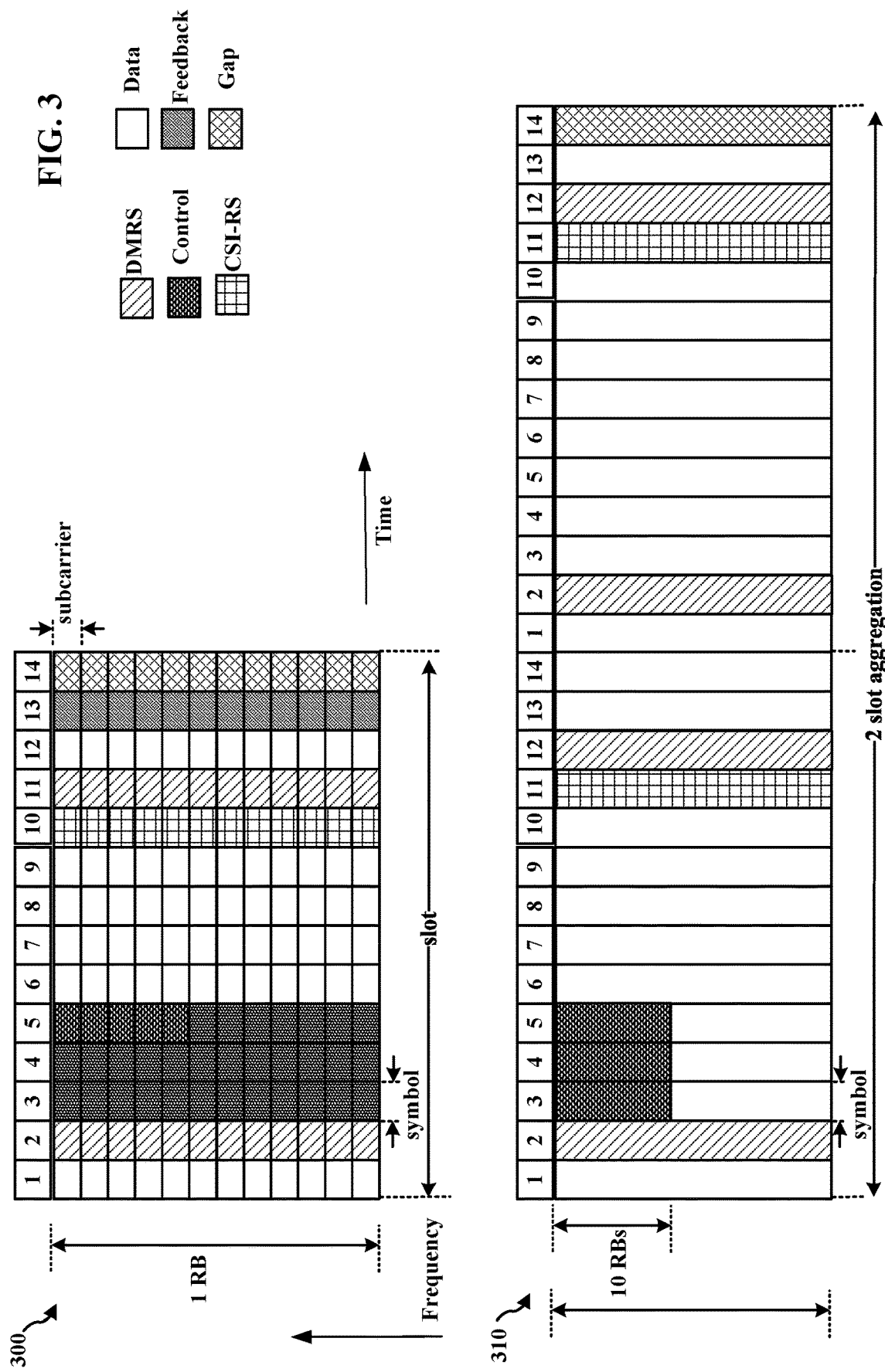
FIG. 3 illustrate example aspects of a sidelink slot structure.

FIG. 3 illustrates example diagrams 300 and 310 illustrating example slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include, for example, 7, 4, or 2 symbols. Each slot may include 7 or 14 symbols, depending on the slot configuration. For slot configuration 0, each slot may include 14 symbols, and for slot configuration 1, each slot may include 7 symbols. Diagram 300 illustrates a single slot transmission, e.g., which may correspond to a 0.5 ms transmission time interval (TTI). Diagram 310 illustrates an example two-slot aggregation, e.g., an aggregation of two 0.5 ms TTIs. Diagram 300 illustrates a single RB, whereas diagram 310 illustrates N RBs. In diagram 310, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 3, some of the REs may comprise control information, e.g., along with demodulation RS (DMRS). FIG. 3 also illustrates that symbol(s) may comprise CSI-RS. The symbols in FIG. 3 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. Multiple slots may be aggregated together. FIG. 3 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 4:
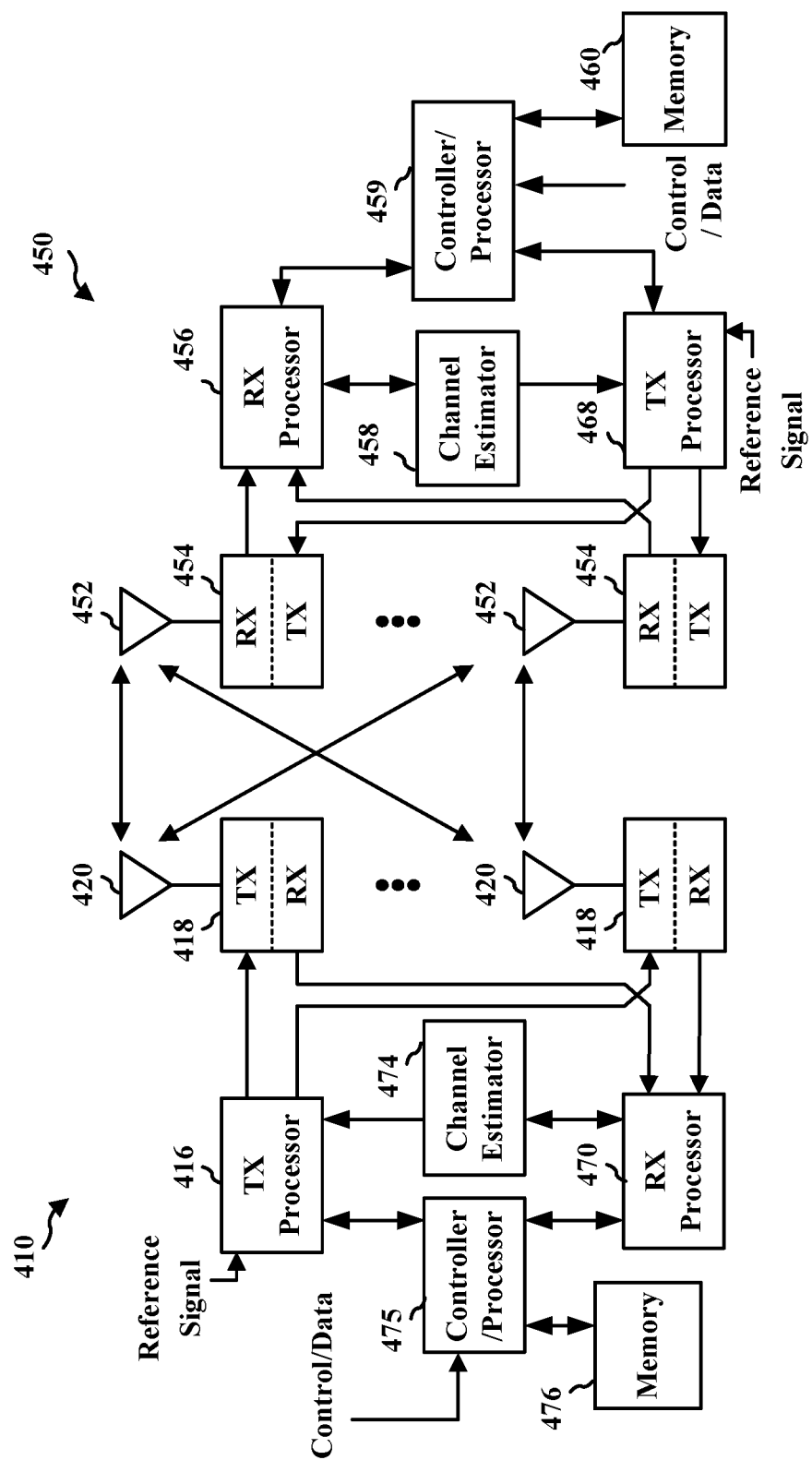
FIG. 4 is a diagram illustrating an example of a first device and a second device involved in wireless communication based, e.g., on sidelink communication.

FIG. 4 is a block diagram of a first wireless communication device 410 in communication with a second wireless communication device 450, e.g., via V2V/V2X/D2D communication or in an access network. The device 410 may comprise a transmitting device communicating with a receiving device, e.g., device 450, via V2V/V2X/D2D communication. The communication may be based, e.g., on sidelink. The transmitting device 410 may comprise a UE, a base station, an RSU, etc. The receiving device may comprise a UE, a base station, an RSU, etc.

IP packets from the EPC 160 may be provided to a controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TB s), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the device 450. Each spatial stream may then be provided to a different antenna 420 via a separate transmitter 418TX. Each transmitter 418TX may modulate an RF carrier with a respective spatial stream for transmission.

At the device 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the device 450. If multiple spatial streams are destined for the device 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 410. These soft decisions may be based on channel estimates computed by the channel estimator 458. The soft decisions are then decoded and deinterleaved to recover the data and control signals that were originally transmitted by the device 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. The controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the device 410, the controller/ processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by device 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The transmission is processed at the device 410 in a manner similar to that described in connection with the receiver function at the device 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. The controller/processor 475 provides demultiplexing between transport and logical channels, packet reassembly, deciphering, header decompression, control signal processing to recover IP packets from the device 450. IP packets from the controller/processor 475 may be provided to the EPC 160. The controller/processor 475 is also responsible for error detection using an ACK and/or NACK protocol to support HARQ operations.

At least one of the TX processor 416, the RX processor 470, or the controller/processor 475 of device 410, or at least one of the TX processor 468, the RX processor 456, or the controller/processor 459 of device 450, may be configured to perform aspects described in connection with mini-slot RA communication component 199 of FIG. 1.

At least one of the TX processor 416, the RX processor 470, or the controller/processor 475 of device 410 may be configured to perform aspects described in connection with mini-slot RA configuration component 198 of FIG. 1.

Generally, in sidelink communications, first wireless communication device 410 (e.g., a Tx UE) initially achieves sidelink synchronization with second wireless communication device 450 (e.g., a Rx UE). Following synchronization, the Tx UE may obtain an allocation of time-frequency resources, e.g., one or more slots, RBs, or subchannels in a resource pool, in which to transmit sidelink data to the Rx UE. One subchannel includes at least 10 or some other number of consecutive, non-overlapping RBs. Typically, the resource allocation may be scheduled by a base station in downlink control information (DCI) (in a mode 1 resource allocation), or the resource allocation may be determined through a sensing procedure conducted autonomously by the Tx UE (in a mode 2 resource allocation). After determining the resources, the Tx UE may send sidelink control information (SCI) including the resource allocation in a physical sidelink control channel (PSCCH) to the Rx UE. The Tx UE may transmit the SCI in two stages, including a first-stage SCI (also referred to as SCI-1) carried on PSCCH, and a second-stage SCI (also referred to as SCI-2) carried on a physical sidelink shared channel (PSSCH). SCI-1 may contain information about the resource allocation, while SCI-2 may carry information for identifying and decoding the sidelink data (e.g., a modulation and coding scheme (MCS)). The Tx UE may transmit the sidelink data in the PSSCH to the Rx UE in the allocated resources.

Upon receiving the sidelink transmission, the Rx UE may attempt to blindly decode the PSCCH in all of the allocated subchannels of the resource pool. Typically, the number of allocated subchannels in the resource pool is small (e.g., 1-27 subchannels), allowing blind decoding to be feasible. If the Rx UE successfully decodes the PSCCH, the UE may also attempt to decode the PSSCH scheduled by the PSCCH for the sidelink data. Depending on the decoding result, the Rx UE may provide hybrid automatic repeat request (HARQ) acknowledgment/negative acknowledgment (ACK/NACK) feedback to the Tx UE in a physical sidelink feedback channel (PSFCH). For example, if the Rx UE failed to decode the sidelink data, the UE may provide NACK to the Tx UE, while if the Rx UE successfully decoded the sidelink data, the UE may provide ACK to the Tx UE. If the Tx UE receives NACK from the Rx UE, the Tx UE may retransmit the sidelink data. Otherwise, if the Tx UE receives ACK from the Rx UE, the Tx UE may transmit new data to the Rx UE, or transmit data to a different Rx UE.

Figure 5:
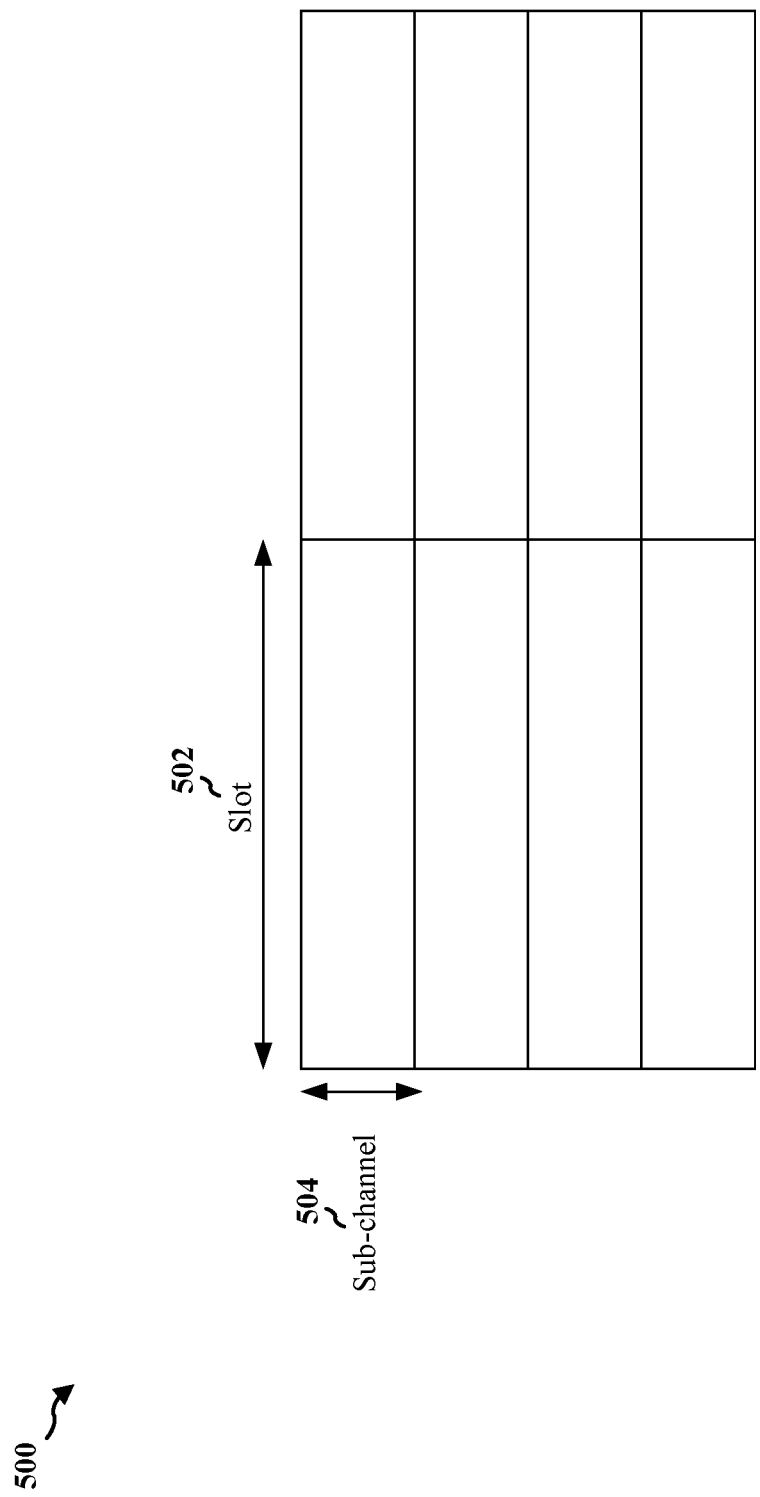
FIG. 5 is a diagram illustrating an example of an allocation of slots and subchannels in a resource pool.

FIG. 5 illustrates an example 500 of an allocation of slots 502 and subchannels 504 in a resource pool. The Tx UE may transmit PSCCH and PSSCH within a same slot. While PSSCH may occupy up to a configured number of contiguous subchannels $N_{subchannel}^{SL}$ in a slot, PSCCH may only occupy up to one subchannel with the lowest subchannel index in the slot. For instance, in the example of FIG. 5, PSCCH may occupy sub-channel 504 (e.g., the top-left illustrated subchannel corresponding to the lowest subchannel index) in slot 502. The Tx UE may transmit SCI-1 in the PSCCH, which may contain information about the PSSCH bandwidth and configured resource reservations in subsequent slots. The Tx UE may also transmit SCI-2 in the PSSCH, which may contain information such as the source identifier (source ID) and destination identifier (destination ID) of a sidelink packet carried in the PSSCH. Upon receiving the sidelink transmission, the Rx UE may blindly decode each sub-channel of a slot for the PSCCH. After decoding PSCCH, the Rx UE may decode PSSCH to distinguish whether the sidelink packet is intended for the Rx UE or another UE, and to identify the Tx UE which sent the packet.

When the Tx UE transmits SCI-1, the SCI-1 may indicate a number and location of resource reservations for the PSSCH. For instance, SCI-1 may indicate a frequency domain resource allocation (FDRA) and a time domain resource allocation (TDRA) indicating the sub-channel(s) and slot(s) which are reserved for the sidelink data transmission. The FDRA and TDRA may each be a field of SCI-1, where each field may include a different numbers of bits depending on the number of configured reservations for the sidelink transmission. For example, in FDRA, the number of bits in the FDRA field may be $$\left\lceil \log \frac{N_{subchannel}^{SL}\left(N_{subchannel}^{SL}+1\right)}{2} \right\rceil$$

or some other number for two reservations, and $$\left\lceil \log \frac{N_{subchannel}^{SL}\left(N_{subchannel}^{SL}+1\right)\left(2N_{subchannel}^{SL}+1\right)}{6} \right\rceil$$

or some other number for three reservations. The value of the bits in the FDRA may indicate the sub-channel(s) and RBs in the resource pool which are allocated for the sidelink data. Similarly, in TDRA, the number of bits may be 5 or some other number for two reservations, and 9 or some other number for three reservations. The value of the bits in the TDRA indicates the slot(s) and symbols in the resource pool which are allocated for the sidelink data.

SCI-1 may also include various other fields in addition to the TDRA and FDRA. For instance, SCI format 1-A in PSCCH may indicate at least the following information: a priority associated with the PSSCH transmission and having a fixed number of bits (e.g., 3 bits or some other number), a FDRA whose number of bits depends on a number of slot reservations and a number of subchannels such as previously described, a TDRA whose number of bits depends on a number of reservations such as previously described (e.g., 5 bits for 2 reservations and 9 bits for 3 reservations), a resource reservation period whose number of bits depend on a number of allowed periods, a DMRS pattern whose number of bits depends on a number of configured patterns, a SCI-2 format having a fixed number of bits (e.g., 2 bits or some other number), a beta offset for SCI-2 rate matching having a fixed number of bits (e.g., 2 bits or some other number), a DMRS port having a number of bits (e.g., 1 bit or some other number) indicating a number of data layers for the PSSCH (e.g., one or two data layers), a MCS having a fixed number of bits (e.g. 5 bits or some other number), an additional MCS table having a fixed number of bits (e.g., 0-2 bits or some other range), a PSFCH overhead indicator having a fixed number of bits (e.g., 0 or 1 bit or some other number), and reserved bits for use by the upper layer. The Rx UE may decode SCI-1 to determine this information and receive the PSSCH. Moreover, when the resources allocated in the SCI-1 are autonomously determined by the Tx UE (in mode 2 resource allocation), the Rx UE and other sidelink UEs may decode the SCI-1 in order to perform channel sensing and to avoid resource collision.

Figure 6:
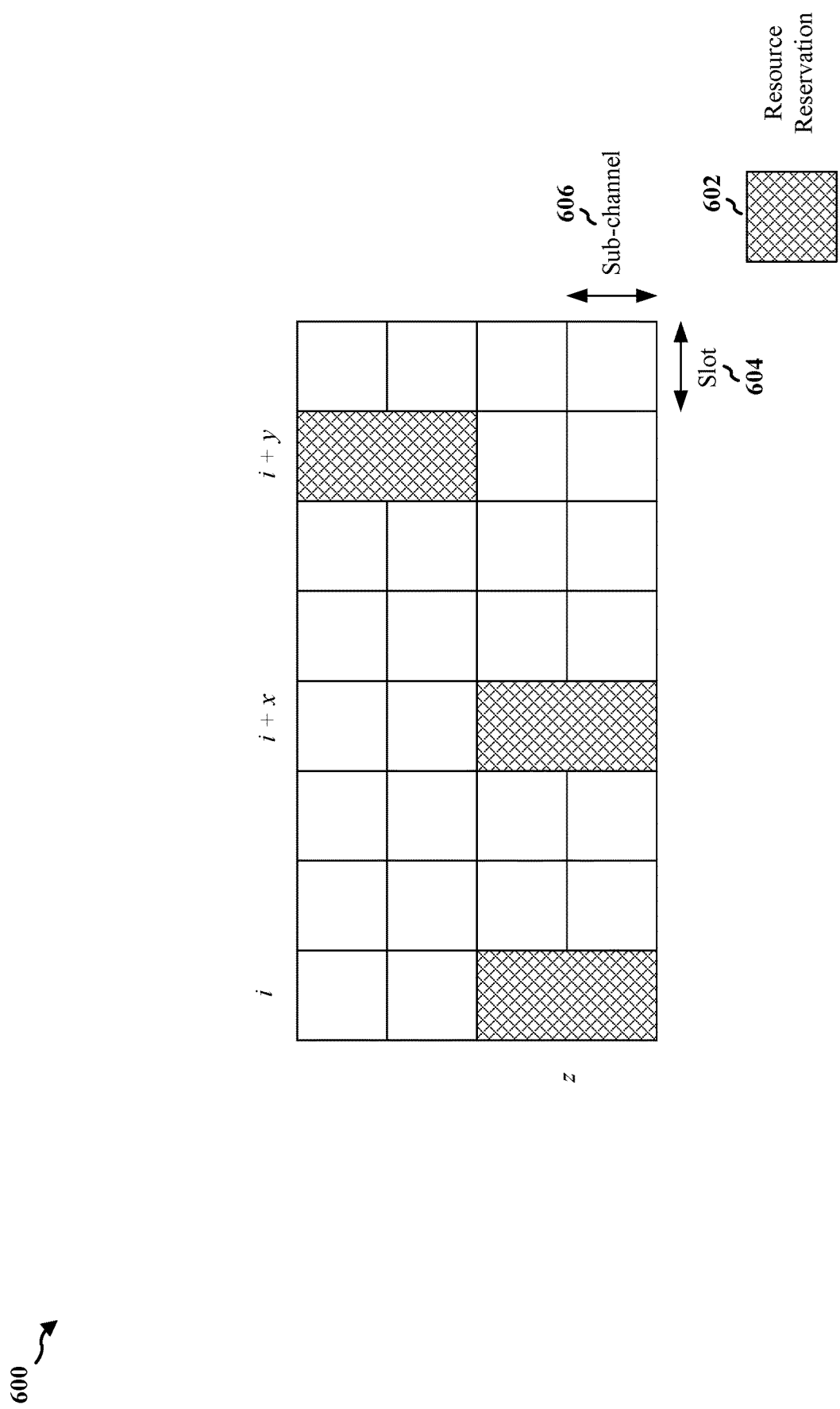
FIG. 6 is a diagram illustrating an example of a resource pool including resource reservations for a sidelink data transmission.

FIG. 6 illustrates an example of a resource pool 600 including resource reservations 602 for a sidelink data transmission. Each resource reservation 602 may include a slot 604 and one or more subchannels 606. For example, the base station or Tx UE may configure a resource pool with three resource reservations such as illustrated in FIG. 6, with each resource reservation spanning one slot and two subchannels. The base station may configure the resource pool 600 and resource reservations 602 in DCI (in a mode 1 resource allocation), or the Tx UE may determine the resource pool 600 and resource reservations 602 autonomously (in a mode 2 resource allocation). The Tx UE may also indicate the resource pool 600 and resource reservations 602 in SCI-1 to a Rx UE. For instance, the Tx UE may transmit PSCCH including SCI-1 in slot i indicating that resource reservations for PSSCH are present in slots i, i+x, and i+y and each span a number of subcarriers z, with i, x, y, and z being configured values such as indicated for example in the following Table 1. These values are merely examples; the resource pool may be configured with a different number of resource reservations spanning a different number of slot(s) and subchannel(s) in other examples.

TABLE 1

| Reservations Signaled by an SCI in slot i | | |
|---|---|---|
| Reservation | # of Sub-channels | Slot |
| 1 | z | i |
| 2 | z | i + x: 0 < x ≤ 31 |
| 3 | z | i + y: x < y ≤ 31 |

Thus, the Tx UE may transmit SCI-1 to indicate to the Rx UE the allocated resources for the PSSCH. Additionally, the Tx UE may transmit SCI-2 to indicate other information for the Rx UE to decode the PSSCH. For instance, SCI-2 may be front-loaded in PSSCH to indicate at least the following information: a HARQ process ID for the PSSCH whose number of bits depend on a number of HARQ processes, a new data indicator (NDI) having a fixed number of bits (e.g., 1 bit), a redundancy version identifier (RV-ID) having a fixed number of bits (e.g., 2 bits), a source identifier of the Tx UE having a fixed number of bits (e.g., 8 bits), a destination identifier of the Rx UE having a fixed number of bits (e.g., 16 bits), and a HARQ enable/disable flag having a fixed number of bits (e.g., 1 bit). Additionally, the SCI-2 may include other fields particular to the SCI-2 format. For example, SCI 2-A format may indicate a cast type for the PSSCH (broadcast, groupcast, unicast) having a fixed number of bits (e.g., 2 bits) and a CSI request flag having a fixed number of bits (e.g., 1 bit), and SCI 2-B format may indicate a zone identifier (e.g., 12 bits) and a communication range (e.g., 4 bits). The Rx UE and other sidelink UEs may determine this information to identify which UE(s) the Rx UEs, as well as to allow the Rx UE(s) to successfully decode the PSSCH in the allocated resources.

Figure 7:
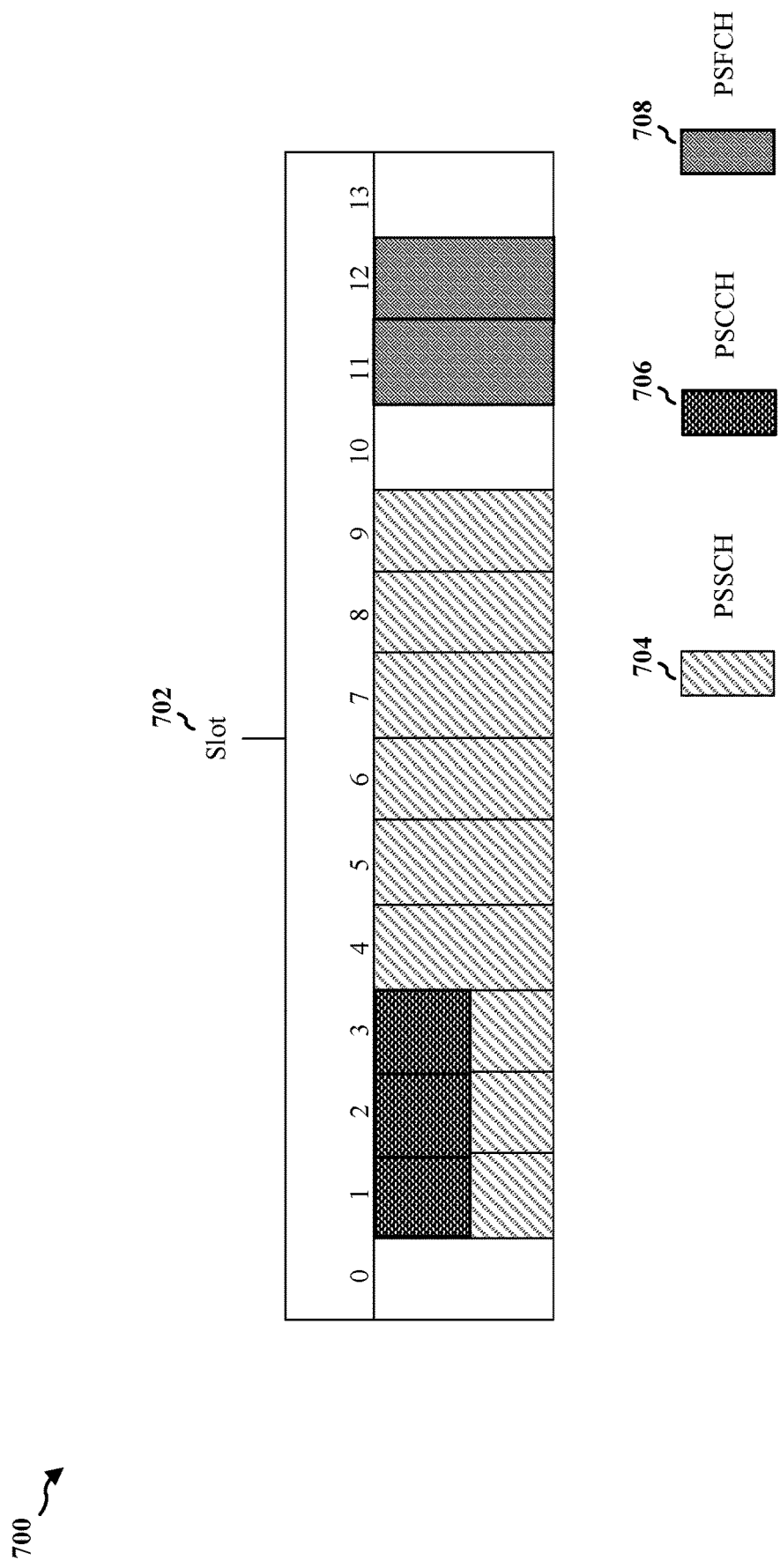
FIG. 7 is a diagram illustrating an example of a slot carrying sidelink data from a Tx UE to a Rx UE.

FIG. 7 illustrates an example 700 of a slot 702 carrying sidelink data in PSSCH 704 from a Tx UE to a Rx UE. In addition to the PSSCH 704, slot 702 may include a PSCCH 706 carrying SCI-1, and a PSFCH 708 for carrying HARQ feedback (ACK/NACK) from the Rx UE. The slot may also include other data besides the information carried in PSSCH 704, PSCCH 706, and PSFCH 708, including, for example, DMRS and guard periods. The PSSCH may occupy at least 1 sub-channel and contain SCI-2. The PSCCH 706 may be multiplexed with the PSSCH 704 in various time-frequency resources within slot 702. The PSCCH may be configured (or pre-configured) to occupy 10, 12, 15, 20, 25, or other number of PRBs in a single subchannel. The PSCCH duration may also be configured (or pre-configured) to be 2, 3, or other number of symbols. Moreover, a subchannel may occupy 10, 15, 20, 25, 50, 75, 100, or other number of PRBs. The number of subchannels in a resource pool (RP) may be anywhere including or between 1 to 27 subchannels or other number. The PSCCH size may be fixed for a resource pool, taking anywhere including or between 10% to 100% of a sub-channel or other range, during a first 2, 3, or other number of symbols, depending on the configuration of the PSCCH. Thus, while FIG. 7 illustrates a particular example configuration for PSSCH, PSCCH, and PSFCH, in other examples, PSSCH, PSCCH, or PSFCH may be configured differently such as previously described.

Resource allocation for sidelink transmissions may be performed under different modes. In one mode (mode 1 resource allocation), the base station may provide a DCI that assigns the Tx UE the resources for sidelink communications. The DCI may have the DCI format 3_0, for example. In another mode (mode 2 resource allocation), the Tx UE autonomously decides the resources for sidelink communication. The Rx UE may receive sidelink communications from the Tx UE in the configured resource allocation similarly in either mode.

In mode 1 resource allocation, the DCI format 3_0 may indicate a resource allocation for a sidelink data transmission through one or more parameters. For instance, the DCI may include a resource pool index identifying the resource pool for the sidelink data transmission. The resource pool index field may have a number of bits depending on a number of resource pools configured by the base station (e.g., in a parameter sl-TxPoolScheduling or some other name). The DCI may also include a time gap indicating a number of slots after reception of the DCI which the Tx UE waits before sending the sidelink data transmission (e.g., to allow the Rx UE sufficient time to decode the DCI). The time gap field may have a fixed number of bits and a configurable value by the base station (e.g., in a parameter sl-DCI-ToSL-Trans or some other name). The DCI may also include other parameters including, but not limited to, a HARQ process #, a NDI indicating whether the sidelink data transmission is a first transmission or a re-transmission, SCI-1-A format fields indicating the time/frequency resources for the sidelink data transmission (e.g., a TDRA, an FDRA, and a lowest subchannel index for allocation in the frequency domain), a PSFCH to HARQ feedback timing between when the Tx UE receives PSFCH feedback from the Rx UE and sends PUCCH to the base station indicating whether the Rx UE successfully received the sidelink data transmission, a PUCCH resource indicator (PRI) for the PUCCH to the base station, and a configuration index for a periodic resource grant indicating the configured resources which are applied for the sidelink transmission when the DCI is not a dynamic (one-shot) grant but rather a configured grant.

Figure 8:
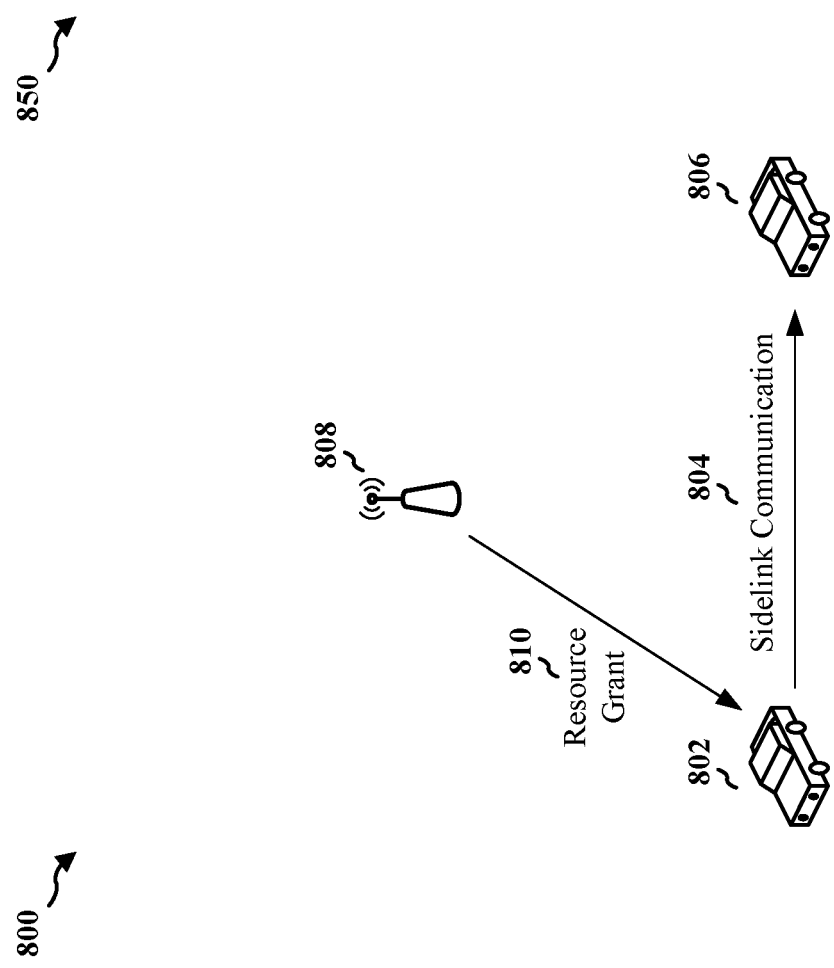
FIGS. 8A-8B are diagrams illustrating examples of a Tx UE sending a sidelink communication to a Rx UE in response to a mode 1 resource allocation or a mode 2 resource allocation, respectively.

FIGS. 8A-8B illustrate examples 800, 850 of a Tx UE 802, 852 that provides a sidelink communication 804, 854 to a Rx UE 806, 856. In mode 1 resource allocation, referring to example 800 of FIG. 8A, a base station 808 may provide a resource grant 810 to the Tx UE 802 indicating the resource allocation for sidelink communication 804. The resource grant 810 may be, for example, a dynamic grant (DG), a configured grant (CG) type 1, or a CG type 2. For a DG, the resource grant 810 may be a DCI which the base station 808 provides aperiodically to the Tx UE 802 indicating the time-frequency resources for sidelink communication 804 on a slot by slot basis. For a CG type 1, the resource grant 810 may be an RRC configuration which the base station 808 provides periodically to the Tx UE 802 indicating the time-frequency resources for sidelink communication 804 for a configured period of time or until a subsequent resource grant is transmitted. For a CG type 2, the resource grant 810 may be a DCI which the base station 808 provides to the Tx UE 802 in order to activate a configured resource allocation for sidelink communication 804 for a configured period of time or until a subsequent resource grant is transmitted. The activated resource allocation may be configured in a RRC configuration similar to that for CG type 1. In either DGs or CGs, where the base station 808 provides DCI to the Tx UE 802 to allocate or activate the time-frequency resources, the DCI may include a specific DCI format 3_0 associated with mode 1 resource allocation. The DCI format may indicate the TDRA and FDRA of the sidelink resources, the transmission timing between reception of the resource grant 810 and transmission of the sidelink communication 804, and other information. The DCI may not configure a specific MCS for the sidelink communication; instead, the Tx UE may determine the MCS within a configured limit by the base station. After obtaining the resource allocation, the Tx UE 802 provides the sidelink communication 804 to the Rx UE 806 in the allocated resources.

In contrast, for a mode 2 resource allocation, referring to example 850 of FIG. 8B, the Tx UE 852 does not receive a resource grant from a base station allocating the resources for sidelink communication 854. Instead, the Tx UE 852 performs channel sensing and resource selection autonomously. For example, during channel sensing, the Tx UE blindly decodes all PSCCH channels and determines the reserved resources by other sidelink transmissions. Upon determining the reserved resources, during resource selection, the Tx UE reports the available resources to an upper layer of the Tx UE, which subsequently decides the resources to allocate to the sidelink communication 854. After selecting the resources, the Tx UE 852 may provide the sidelink communication 854 to the Rx UE 856 in the selected resources.

Sidelink communications may also be applicable to industrial internet of things (IIoT). In IIoT, a programmable logic controller (PLC) may directly communicate in sidelink with sensors or actuators to collect, exchange, and analyze data and to facilitate improvements in productivity, efficiency, or other benefits in industrial applications. Typically, IIoT traffic is deterministic with packets of 32 to 256 bytes (or other byte range), and since the bandwidth required for IIoT traffic is thus relatively low, a small number of RBs such as 2 RBs may be sufficient for data communication. Moreover, sensors and actuators may have UE capability constraints in terms of bandwidth and processing power, even though the overall bandwidth in dedicated frequency bands or unlicensed bands may be relatively large. Furthermore, sensors and actuators may not detect or monitor all transmissions in IIoT. Each of these traffic characteristics thus allows for sidelink communication to be an effective method of communication in IIoT.

Figure 9:
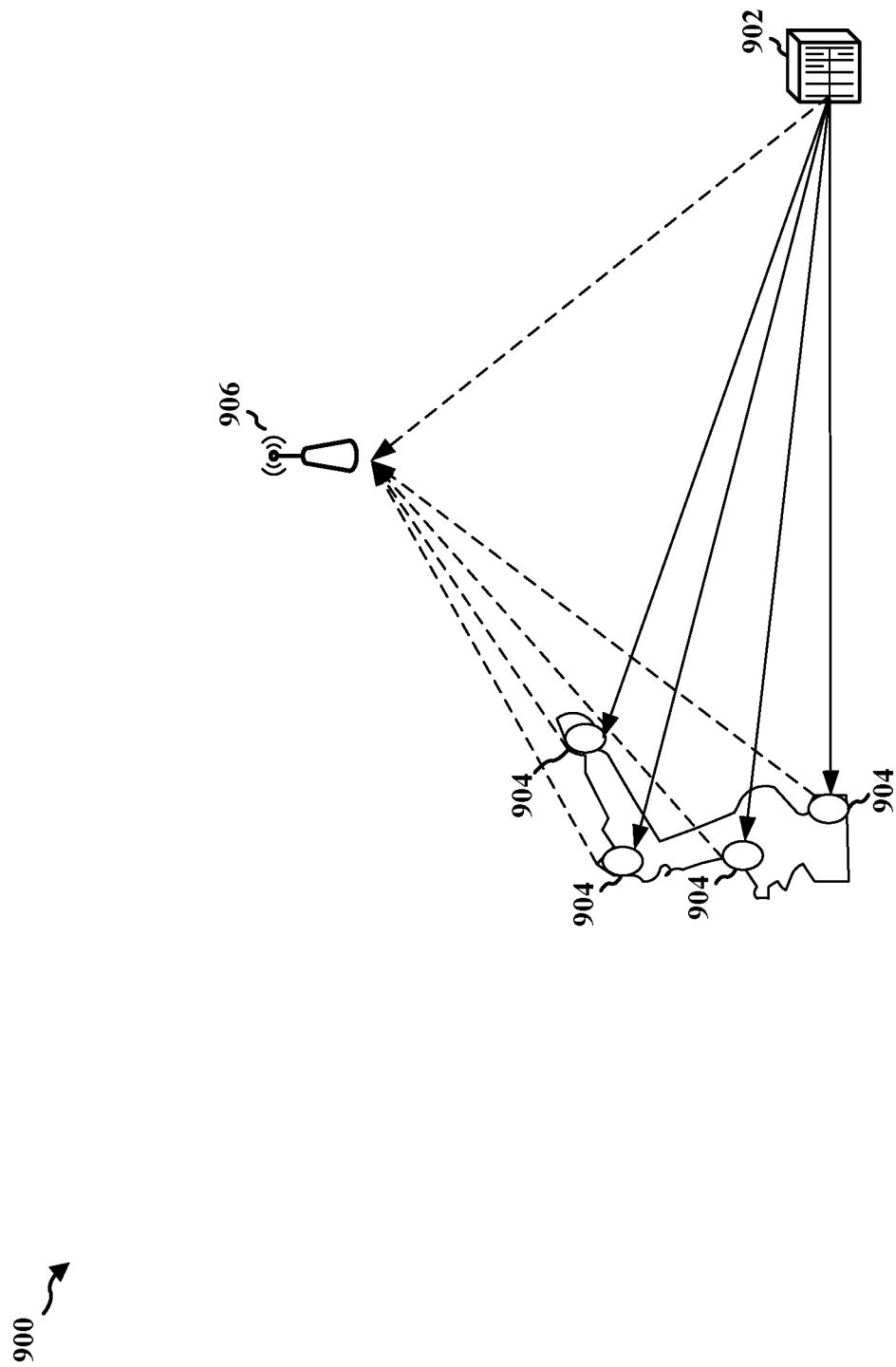
FIG. 9 is a diagram illustrating an example of a programmable logic controller which communicates in sidelink with sensors or actuators.

FIG. 9 illustrates an example 900 of a PLC 902 which communicates in sidelink with sensors or actuators 904 of an assembly robot in order to efficiently manufacture industrial products, although the sensors or actuators may be coupled to other devices than assembly robots and for other industrial purposes than manufacturing in other examples. The PLC 902, as well as the sensors or actuators 904, may be examples of UEs 104. The PLC may communicate wirelessly with the sensors or actuators, thus allowing flexible and simple deployment of PLCs. While the example of FIG. 9 illustrates the PLC 902 controlling four different sensors or actuators, a PLC may control a larger number of sensors or actuators, such as 20 to 50 sensors or actuators. Moreover, sidelink communication in IIoT typically has a tight latency requirement between 1 and 2 ms and an ultra-reliability requirement of $10^{-6}$ error rate, although the latency requirement and ultra-reliability requirement are not limited to these numbers. Therefore, rather than communicating through a base station 906 over multiple over-the-air (OTA) transmissions, the PLC may communicate directly with the sensors or actuators in order to meet the aforementioned latency and reliability requirements. The PSCCH may also meet these stringent IIoT requirements notwithstanding any blockage and interference that may arise due to challenging radio frequency environments.

Accordingly, in mode 1 resource allocation, the base station 102/180, 410, 808, 906 may provide a Tx UE (e.g., UE 104, 450, 802, 902) a DCI with DCI format 3_0 configuring the resource allocation for sidelink communication 804 between the Tx UE and a Rx UE (e.g., UE 104,

450, 806, 904). The DCI 3_0 may specify the resource allocation for a single transport block, e.g., via a resource pool index, TDRA, FDRA, lowest sub-channel index, or other fields of the DCI, which the Tx UE may apply in the sidelink communication. Furthermore, based on the information in the DCI, the Tx UE may configure the SCI carried in the sidelink communication. For example, the Tx UE may maintain a one-to-one mapping of the HARQ process number indicated in DCI and in the SCI for the transport block, and the Tx UE may toggle the NDI in the SCI in response to the NDI in DCI. Moreover, as the DCI generally does not include a destination ID for the Rx UE, the Tx UE may select a destination ID to include in the SCI for the Rx UE.

Figure 10:
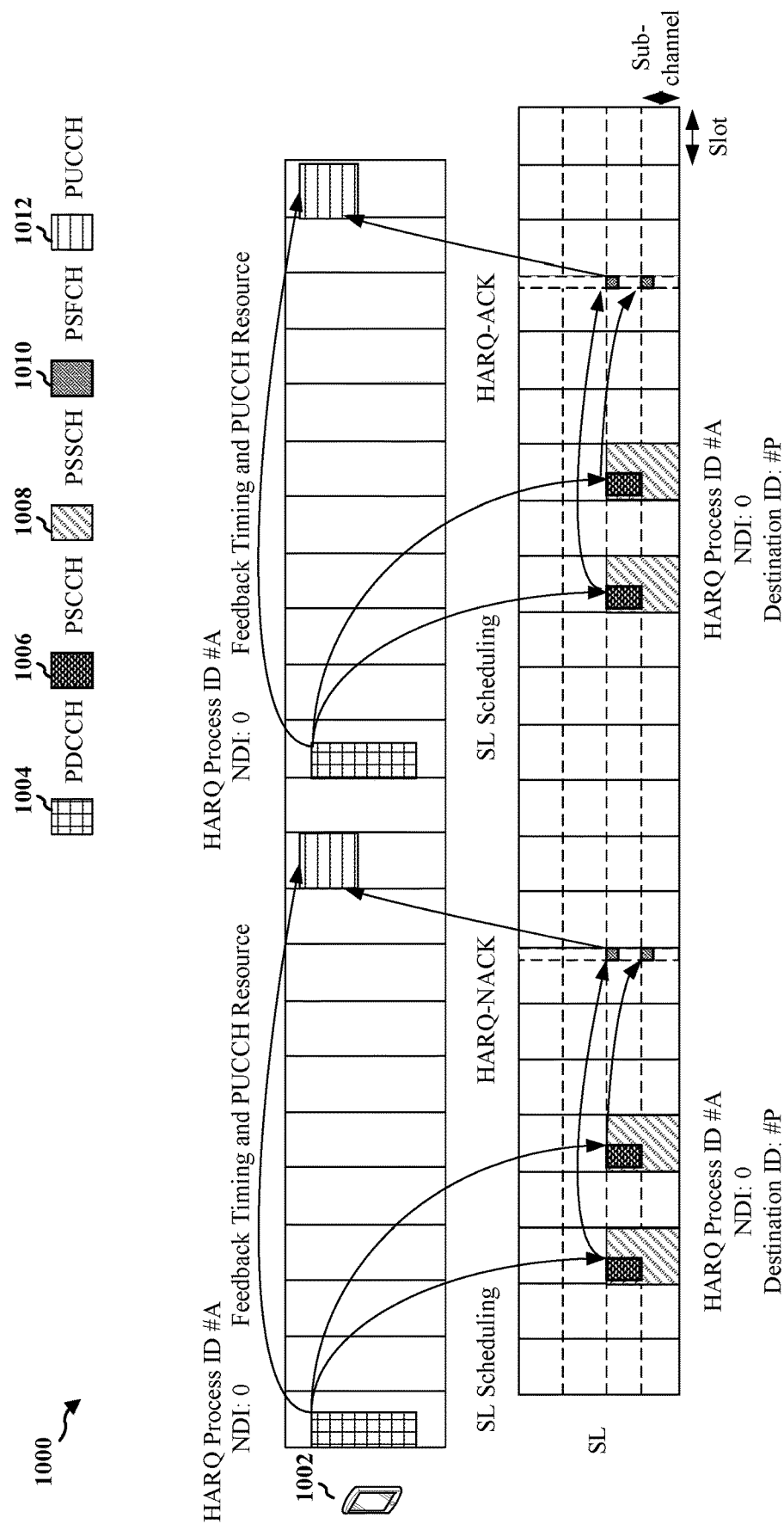
FIG. 10 is a diagram illustrating an example of sidelink communication based on mode 1 resource allocation.

FIG. 10 illustrates an example 1000 of sidelink communication based on mode 1 resource allocation. In the illustrated example, the base station may transmit to a Tx UE 1002 a PDCCH 1004 scheduling resources for PSCCH 1006, PSSCH 1008 and PSFCH 1010 in a plurality of resource reservations. While FIG. 10 illustrates the example where the resources are indicated in a DCI from the base station in the PDCCH, the resources may alternatively be configured in an RRC configuration. In this example, the DCI may indicate a HARQ Process ID #A and an NDI of 0 for each of the resources. Moreover, the Tx UE 1002 may repeat the sidelink communication in each of the configured resources according to a time gap indicated in the DCI. For instance, in the example of FIG. 10 where the base station configures two resource reservations for the sidelink communication, the Tx UE may communicate the sidelink data in two repetitions to the Rx UE beginning three slots after reception of the DCI. If the Rx UE fails to receive or decode the sidelink communication in the repetitions, the Rx UE may provide a HARQ-NACK to the Tx UE in PSFCH 1010, as illustrated in the example of FIG. 10. In response to receiving the HARQ-NACK, the Tx UE 1002 may provide the HARQ-NACK feedback to the base station in a PUCCH 1012 according to a PSFCH to HARQ feedback timing and a PRI indicated in the DCI. For instance, in the example of FIG. 10, the Tx UE may provide the HARQ-NACK feedback to the base station in a configured resource of PUCCH 1012 beginning two slots after reception of the PSFCH 1010. In response to the HARQ-NACK, the base station may again provide DCI in PDCCH 1004 to the UE including the same HARQ Process ID and NDI to configure the Tx UE to re-transmit the sidelink repetitions in the resource reservations until a HARQ-ACK is received from the Rx UE, as illustrated in the example of FIG. 10.

Figure 11:
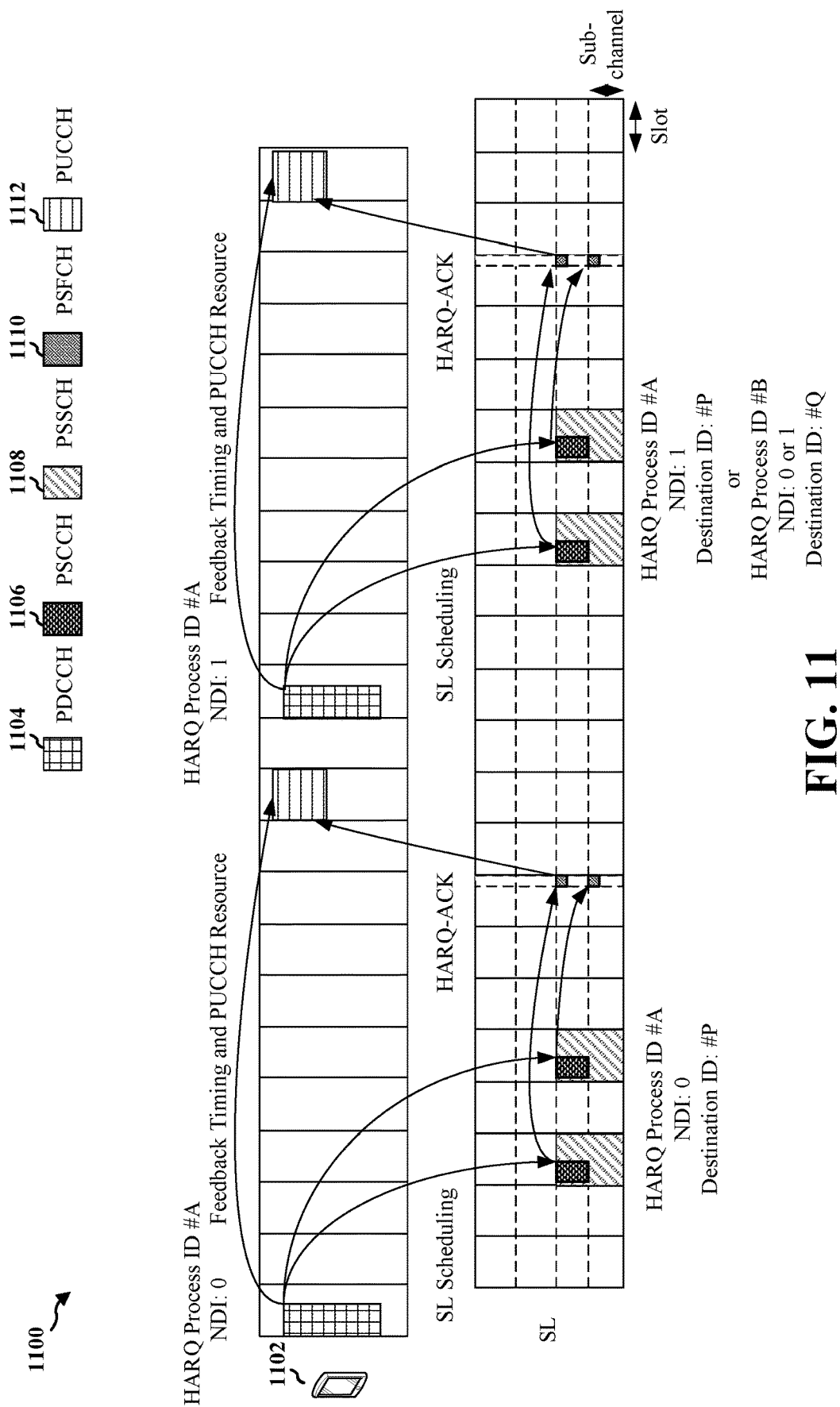
FIG. 11 is a diagram illustrating another example of sidelink communication based on mode 1 resource allocation.

FIG. 11 illustrates another example 1100 of sidelink communication based on mode 1 resource allocation. Similar to the example of FIG. 10, in the illustrated example, the base station may transmit to a Tx UE 1102 a PDCCH 1104 scheduling resources for PSCCH 1106, PSSCH 1108 and PSFCH 1110 in a plurality of resource reservations. Likewise, the DCI may initially indicate a HARQ Process ID #A and an NDI of 0 for each of the resources, and the Tx UE 1102 may repeat the sidelink communication in each of the configured resources according to a time gap indicated in the DCI. However, in this example, the Rx UE successfully decoded the sidelink communication in at least one of the repetitions, so the Rx UE may provide a HARQ-ACK to the Tx UE in PSFCH 1110, as illustrated in the example of FIG. 11. In response to receiving the HARQ-ACK, the Tx UE 1102 may similarly provide the HARQ-ACK feedback to the base station in a PUCCH 1112 according to a PSFCH to HARQ feedback timing and a PRI indicated in the DCI. In response to the HARQ-ACK, the base station may provide DCI in PDCCH 1104 to the Tx UE including the same HARQ Process ID but a toggled NDI to configure the UE to transmit new sidelink data in the resource reservations. The Tx UE may then transmit the new sidelink data with HARQ Process #A to the same Rx UE (#P). Alternatively, the Tx UE may transmit the new sidelink data (or re-transmit the prior sidelink data) with a different HARQ Process #B to a different Rx UE #Q.

Currently, sidelink resource pools and sidelink resource allocations are slot-based (e.g., one scheduling opportunity or resource reservation per slot). For example, when the base station configures (in DCI or via RRC) a resource pool index and a number of resource reservations in the associated resource pool for sidelink communication, each of the resource reservations in the resource pool may span a duration of one slot at minimum (such as illustrated in FIG. 6). In another example, each resource reservation may span a number of symbols less than that of a slot, but only one resource reservation may be present in a slot. For instance, in a slot-based resource allocation, even if a resource reservation spans only the first 7 symbols in a 14 symbol slot, the remaining 7 symbols of that slot may not be allocated in another resource reservation for sidelink communication. Moreover, the base station may provide system information including a semi-static slot format for a given bandwidth, where the slot format indicates which symbols of a slot are downlink (DL), uplink (UL), or flexible (F, which may be configured as either DL or UL). The base station may also indicate a configured start symbol (in a parameter sl-StartSymbol or another name) and a configured number of symbols or length (in a parameter sl-LengthSymbols or another name) which are applicable for sidelink communications. Based on all of this information, the Tx UE may determine whether a resource pool may be used for sidelink transmission.

Figure 12A:
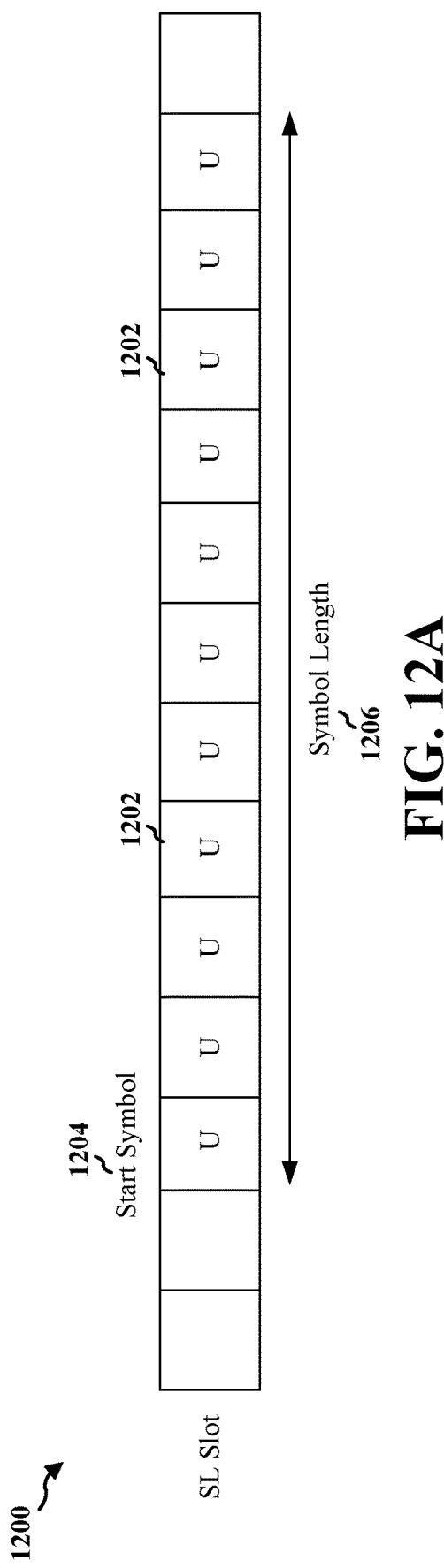
FIGS. 12A-12B are diagrams illustrating examples of different semi-statically configured slot formats.
Figure 12B:
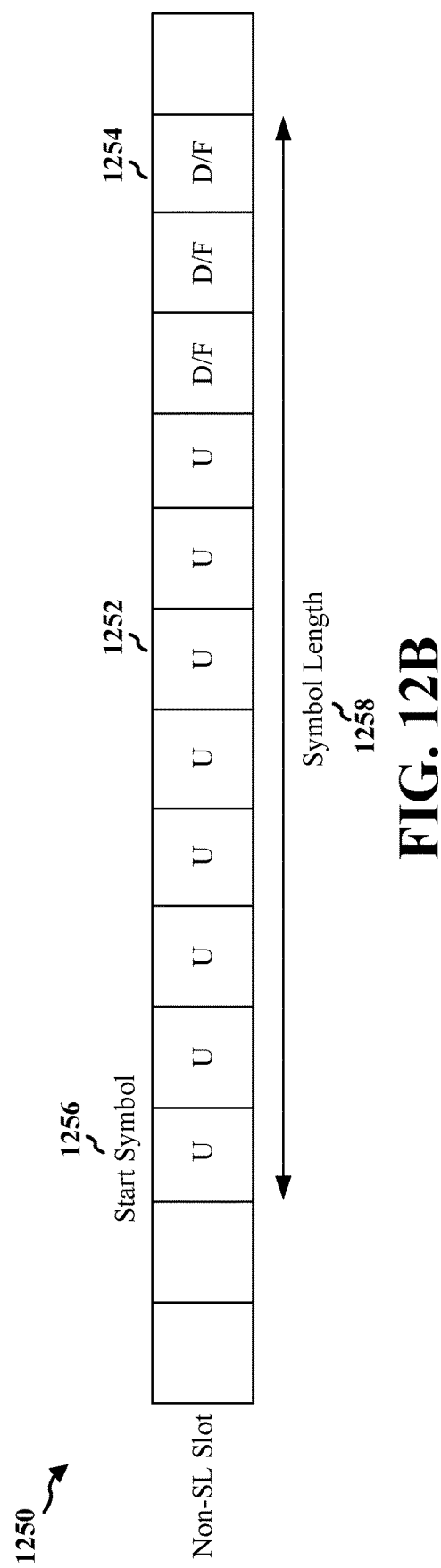

FIGS. 12A and 12B illustrate examples 1200, 1250 of semi-statically configured slot formats. In particular, FIG. 12A illustrates an example of a slot format with symbols 1202 in only the UL direction, while FIG. 12B illustrates an example of another slot format with symbols 1252 in the UL direction and symbols 1254 in the DL or F direction. When the Tx UE determines a resource pool (e.g., from a DCI format 3_0), the Tx UE may check, for each slot in the resource pool, whether all of the symbols in the slot within a range given by a start symbol 1204, 1256 and a symbol length 1206, 1258 are semi-statically configured UL symbols. If all of the symbols of that slot within the range are UL, such as illustrated in the example of FIG. 12A, then the UE may determine that the slot is valid for sidelink communication, and the UE may transmit sidelink data in the configured resources within that slot. On the other hand, if any of the symbols of the slot within the range are DL or F, such as illustrated in the example of FIG. 12B, the UE may determine the slot is invalid for sidelink communication and thus may not transmit sidelink data within that slot and perform the sidelink communication in a subsequent slot.

Thus, slot-based resource allocation may result in increased scheduling latency for sidelink communications. For example, if a Tx UE receives a DCI format 3_0 shortly before a configured start symbol for the sidelink communication, or if the Tx UE receives the DCI in the middle of a configured symbol length for the sidelink communication, the Tx UE may not have sufficient time to configure and transmit the sidelink communication within that configured range of symbols to the Rx UE. As a result, the Tx UE may wait until a subsequent slot to send the sidelink communication, increasing scheduling latency. Moreover, slot-based resource allocation has relatively coarse granularity (one scheduling opportunity or resource reservation per slot), resulting in limited flexibility for sidelink communications. For example, each resource reservation may encompass a fixed number of symbols (e.g., 14 symbols for a slot), limiting the number of possible resource allocations available for sidelink communications. Moreover, the aforementioned, semi-statically configured slot formats applicable for slot-based resource allocations may reduce the number of resources available for sidelink communications. For example, a Tx UE may be limited to transmit sidelink data in reserved resources within slots having only UL symbols, thereby reducing the number of possible slots which may be scheduled for sidelink communications.

Accordingly, aspects of the present disclosure allow a base station to schedule sidelink data in mini-slots rather than merely slots. For instance, the base station may configure and transmit control information indicating a sidelink data resource for a mini-slot. A Tx UE which receives this control information may transmit sidelink data in the sidelink data resource to a Rx UE. Similarly, a Rx UE may receive control information indicating a sidelink data resource for a mini-slot, and accordingly receive sidelink data in the sidelink resource from a Tx UE. As a result of mini-slot based resource allocations, the scheduling latency for sidelink communications may be reduced, the number of available resources for sidelink communications may be increased, and more flexibility in sidelink communications may be achieved than in slot-based resource allocations.

Figure 13:
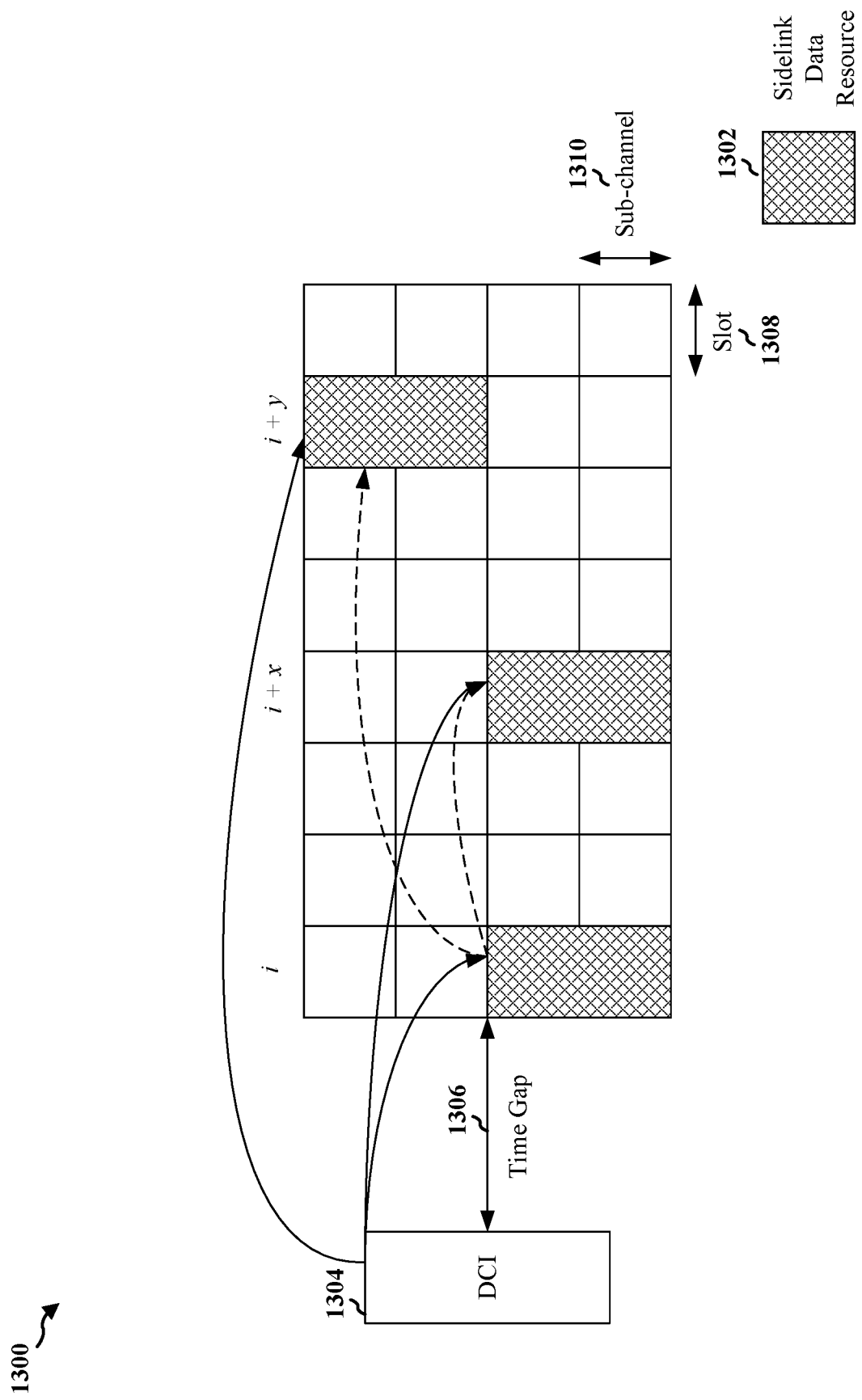
FIG. 13 is a diagram illustrating an example of a resource pool including sidelink data resources in which a Tx UE may transmit sidelink data to a Rx UE.

In various examples, a mini-slot based resource allocation may include more than one scheduling opportunity or resource reservation per slot. Moreover, a mini-slot may include any number of symbols less than that of a slot (e.g., if a slot is 14 symbols, a mini-slot may be any number between and including 1 and 13 symbols). In one example, during mode 1 resource allocation, a base station may provide a DCI indicating use of a mini-slot based resource allocation to schedule sidelink data resources configured in the DCI. For instance, each of the resource reservations in a resource pool configured by the base station may span a duration of one mini-slot at minimum (such as illustrated in FIGS. 14-19 described below), rather than one slot at minimum as in slot-based resource allocations (such as illustrated in FIG. 13 described below). Thus, unlike slot-based resource allocations, here more than one resource reservation may be present in a slot. For example, in a mini-slot based resource allocation including 7-symbol mini-slots, two sidelink data resources may be within a 14 symbol slot, in contrast to only one 7-symbol, sidelink data resource in a slot-based resource allocation. In different examples, the base station may indicate a mini-slot based resource allocation via a resource pool index in the DCI, a cyclic redundancy check scrambling sequence for the DCI, a RRC configuration indicating a mini-slot based TDRA and FDRA, one or more dedicated fields in the DCI, a time resource indicator value (TRIV) for the TDRA and a frequency resource indicator value (FRIV) for the FDRA in the DCI, or a configuration index in the DCI. Moreover, the Tx UE receiving the DCI may indicate the mini-slot based resource allocation in SCI to the Rx UE. Additionally, while the aforementioned examples specifically refer to mode 1 resource allocation, the aspects of the present disclosure are not limited to this type of resource allocation. For instance, during mode 2 resource allocation, the Tx UE may similarly provide SCI indicating use of a mini-slot based resource allocation to schedule sidelink data resources which are autonomously determined by the Tx UE.

Generally, in mode 1 resource allocation, a base station may provide a DCI indicating a resource pool index corresponding to one of multiple resource pools supporting different services, and a time gap between a last symbol of the DCI and a first symbol of a sidelink data resource (resource reservation). The DCI may indicate one or more sidelink data resources via a lowest subchannel index, a TDRA, and a FDRA, and the Tx UE may transmit sidelink data in the indicated sidelink data resource(s). For instance, if the base station allocates three resource reservations for sidelink communication to the Tx UE, the Tx UE may repeat or retransmit sidelink data in the three resource reservations. The Tx UE may provide SCI as well to the Rx UE indicating the resource allocation, including the bandwidth of the first transmission and the resources reserved for repetition or re-transmission if necessary.

FIG. 13 illustrates an example 1300 of a resource pool including sidelink data resources 1302 in which a Tx UE may transmit sidelink data to a Rx UE. The resource pool and each of the sidelink data resources 1302 may be indicated in a DCI 1304 from a base station, and a first symbol of a first one of the sidelink data resources may follow a time gap 1306 indicated in the DCI. Each of the sidelink data resources 1302 may span a slot 1308 in the time domain and one or more subchannels 1310 in the frequency domain (two subchannels in the illustrated example). For instance, one of the sidelink data resources may occupy slot i across two subchannels, a second one of the sidelink data resources may occupy slot i+x across two subchannels, and a third one of the sidelink data resources may occupy slot i+y across two subchannels, where the values of i, x, and y may be configured according for example to Table 1 as described with respect to FIG. 6. Additionally, the sidelink data resources may include only uplink symbols according to a semi-static slot format configuration such as described above with respect to FIG. 12A. In response to the DCI, the Tx UE may transmit sidelink data in one of the sidelink resources, and if the Tx UE receives a HARQ-NACK from the Rx UE in PSFCH, the Tx UE may retransmit the same sidelink data in a subsequent one of the sidelink data resources. Alternatively, the Tx UE may disable HARQ feedback from the Rx UE, and instead of performing sidelink data re-transmissions, the Tx UE may repeat the same sidelink data in each of the sidelink data resources. The sidelink data repetitions may result in increased likelihood of successful decoding at the Rx UE.

In the various aspects of the present disclosure, rather than configuring a slot-based resource allocation such as illustrated and described with respect to FIG. 13, the base station may configure a mini-slot based resource allocation for the Tx UE to communicate sidelink data with an Rx UE. For instance, each sidelink data resource may be configured to occupy a portion of a slot, rather than an entire slot. During mode 1 resource allocation, the base station may repurpose or configure dedicated fields in DCI to indicate a mini-slot based resource allocation such as described below with respect to FIGS. 14-19. Additionally, the base station may indicate a mini-slot based resource allocation to Tx UEs capable of applying this allocation while indicating a slot-based resource allocation for other Tx UEs incapable of applying this allocation. The base station may indicate the mini-slot based resource allocation according to any of the following examples, which may be applied alone or in combination with other examples.

Figure 14:
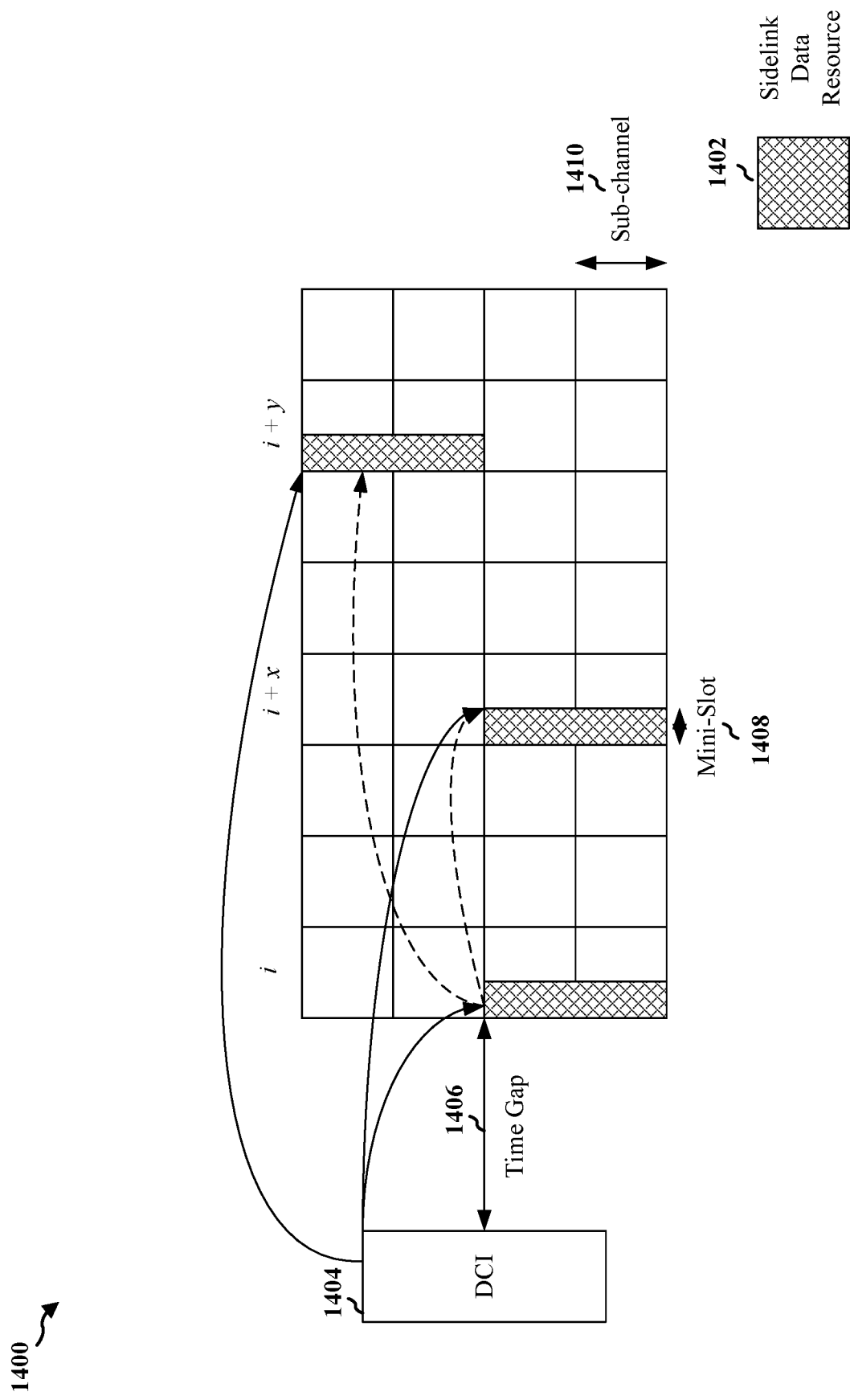
FIG. 14 is a diagram illustrating another example of a resource pool including sidelink data resources in which a Tx UE may transmit sidelink data to a Rx UE.

In a first example, the base station may configure the resource pool index in DCI to indicate a mini-slot based resource allocation. For instance, the base station may provide an RRC configuration including an association of multiple RP indices with one physical resource pool, including one RP index for a slot-based allocation and one or more RP indices for a mini-slot based allocation. For instance, one RP index may correspond to the resource pool including sidelink resources spanning a slot such as illustrated in FIG. 13, while another RP index may correspond to the same resource pool but with sidelink data resources spanning a number of symbols less than that of a slot such as illustrated in FIG. 14. The number of symbols (granularity of the mini-slot) may for example be 2 symbols, 4 symbols, 5 symbols, 7 symbols, or other number of symbols less than that of a slot. Additionally, if the RRC configuration includes multiple RP indices for a mini-slot based allocation, each RP index may correspond to a different granularity of the mini-slot. For instance, for the same resource pool illustrated in FIG. 13, one RP index may indicate that each of the sidelink data resources in a slot span 2 symbols, another RP index may indicate that each of the sidelink data resources in a slot span 7 symbols, and so forth. Additionally, each RP index corresponding to a mini-slot based resource allocation may indicate, not only the number of symbols for each sidelink data resource, but also the subchannels for each sidelink data resource, the starting symbol for each sidelink data resource, and the number of symbols or symbol length of each sidelink data resource.

In a second example, the base station may configure a scrambling sequence to be applied to a cyclic redundancy check (CRC) for a DCI, wherein the scrambling sequence is configured to indicate a mini-slot based resource allocation. Generally, before appending a CRC (e.g., 24 CRC bits) to DCI, the base station scrambles the CRC bits based on a radio network temporary identifier of the UE (e.g., a cell RNTI [C-RNTI]). After appending the scrambled CRC to the DCI, the base station scrambles the CRC-appended DCI based on a pseudo random sequence before modulating and mapping the scrambled DCI on resource elements for transmission to the Tx UE. In this example, the base station may operate in this manner when providing a DCI with a CRC indicating a slot-based resource allocation such as illustrated in FIG. 13. However, to indicate a mini-slot based resource allocation, the base station may configure and apply a different scrambling sequence other than that used for slot-based resource allocation. For instance, the base station may configure and apply a different pseudo random sequence corresponding to a mini-slot based allocation for scrambling a CRC-appended DCI. Alternatively, the base station may apply a different RNTI (other than the C-RNTI) corresponding to a mini-slot based resource allocation (or alternatively information that is not a RNTI), to scramble the CRC bits before appending the CRC to the DCI. Thus, the different scrambling sequence may be a different pseudo random sequence, a different RNTI, or other information than a RNTI. The base station may configure a single scrambling sequence for any mini-slot granularity, or the base station may configure multiple scrambling sequences respectively for different mini-slot granularities. In other words, each scrambling sequence may be associated with a slot based resource allocation to schedule the sidelink data resource or a mini-slot based resource allocation to schedule the sidelink data resource. In this way, the scrambling sequence may indicate whether the slot-based resource allocation or the mini-slot based resource allocation is used. Additionally, the scrambling sequence may indicate which of the different mini-slot granularities to use.

Still referring to the second example, when the Tx UE receives the scrambled CRC-appended DCI from the base station, the Tx UE may attempt to decode the DCI or the CRC by performing blind de-scrambling using each of the configured scrambling sequences. For instance, the Tx UE may attempt to decode the DCI using the different pseudo random sequence or attempt to decode the CRC using the different RNTI or the other information than a RNTI that were previously described. If the decoding attempt is successful, for example, if the Tx UE determines that the decoded CRC matches an expected CRC computed by the Tx UE, then the Tx UE may determine that the DCI corresponds to a mini-slot based resource allocation. Thus, the UE may determine that the sidelink data resources configured in the DCI may span a number of symbols less than that of a slot such as illustrated in FIG. 14. If multiple mini-slot granularities are configured respectively for different scrambling sequences, the UE may also determine the mini-slot granularity for the sidelink data resources in response to the successful decoding attempt. Otherwise, if the decoding attempt fails, for example, if the Tx UE determines that the decoded CRC does not match the computed, expected CRC, then the Tx UE may determine that the DCI corresponds to a slot based resource allocation.

In a third example, the base station may provide an RRC configuration to the Tx UE which indicates whether a DCI is for a mini-slot based resource allocation. For instance, the RRC configuration may include one or more parameters indicating whether sidelink data resources scheduled in one or more subsequent DCIs correspond to a mini-slot based resource allocation rather than a slot-based resource allocation. Alternatively or additionally, the RRC configuration may schedule the sidelink data resources, by itself or in combination with DCI. For example, the RRC configuration may include TDRA, FDRA, or other fields in DCI format 3_0, which fields may alone or in combination with DCI configure the Tx UE with sidelink data resources that each span a number of symbols less than that of a slot such as illustrated in FIG. 14. The RRC configuration may also indicate the mini-slot granularity for each of the sidelink data resources.

In a fourth example, the base station may include a dedicated field in the DCI indicating whether the grant is for a mini-slot based resource allocation or a slot-based resource allocation. For instance, the DCI may include a field having one or more bits which values may indicate whether or not the sidelink data resources configured in the DCI each span a number of symbols less than that of a slot such as illustrated in FIG. 14. Different values of this dedicated field may also respectively indicate different mini-slot granularities for the sidelink data resources. However, by including this field in the DCI, the base station may prevent backwards compatibility for those UEs lacking capability for mini-slot based resource allocation, in contrast to the other three examples previously described.

In a fifth example, the base station may configure an un-specified time resource indicator value (TRIV), an un-specified frequency resource indicator value (FRIV), or both a TRIV and FRIV, to indicate a mini-slot based resource allocation. When the base station provides the DCI including TDRA and FDRA to the Tx UE, the TDRA may include a TRIV indicating the slot(s), starting symbol, and symbol length of a sidelink data resource, and the FDRA may include a FRIV indicating the subchannel(s) of the sidelink data resource. Numerous TRIVs and FRIVs may be configured to indicate different time domain and frequency domain locations of the sidelink data resource in a slot-based resource allocation. For instance, a DCI including one TRIV and one FRIV may indicate the sidelink data resources illustrated in the example of FIG. 13. However, multiple TRIVs and FRIVs may be unspecified, that is, reserved or not currently indicating time domain or frequency domain locations of sidelink data resources. The number of unspecified TRIVs for a sidelink data resource may vary depending on the number of configured resource reservations, and the number of unspecified FRIVs for a sidelink data resource may vary depending on the number of configured subchannels in the resource pool.

Therefore, in the fifth example, the base station may configure one or more of these unspecified TRIVs or FRIVs to correspond to a mini-slot based configuration. For instance, the base station may configure an unspecified TRIV to respectively indicate a start symbol and symbol length for the sidelink data resource in a mini-slot, and the base station may configure an unspecified FRIV to respectively indicate the subchannel(s) of the sidelink data resource in the mini-slot. The base station may similarly configure multiple unspecified TRIVs and FRIVs to correspond to different mini-slot based resource allocations, for instance, each TRIV may be configured with a different start symbol and symbol length and each FRIV may be configured with different subchannels. The base station may then indicate a mini-slot based resource allocation to the Tx UE in DCI for a sidelink data resource by indicating one of these previously unspecified TRIVs or FRIVs in the TDRA or FDRA of the DCI, respectively. Similarly, the Tx UE may indicate the same mini-slot based resource allocation to a Rx UE in SCI for the initial sidelink data resource, and the Tx UE may indicate the same or a different mini-slot based resource allocation to the Rx UE in SCI for subsequent sidelink data resources. For example, the Tx UE may indicate a same or different one of these previously unspecified TRIVs or FRIVs in the TDRA or FDRA of the SCI, respectively.

In a sixth example, the base station may configure a configuration index in DCI to indicate a mini-slot based resource allocation. A Tx UE may indicate to a base station that the Tx UE has the capability of supporting configured grants (e.g., CG type 1 or type 2). In response to this capability indication, the base station may transmit a configured grant in DCI to the Tx UE activating configured sidelink data resources for a period of time associated with the configured resources. For instance, the base station may indicate a configuration index in the configuration index field of DCI, which index generally corresponds to one of multiple slot-based resource allocations for a sidelink data resource (or existing configured grant configurations). For example, a value in a 3 bit configuration index field may indicate one of eight configured grant configurations for a sidelink data resource. However, if the base station provides a dynamic grant in DCI to the Tx UE, the configuration index field may generally be left unused.

Accordingly in the sixth example, the base station may configure one or more of these configuration indices to indicate a mini-slot based resource allocation. For example, another parameter such as a flag may be added to each existing configured grant configuration which may be configured to indicate whether the grant configuration is for a slot or a mini-slot. In another example, the base station may configure one start symbol, symbol length, and subchannel (s) in a mini-slot to correspond to one configuration index, another start symbol, symbol length, and subchannel(s) in the mini-slot to correspond to another configuration index, and so forth. Thus, for dynamic grants where a 3-bit configuration index field may include eight different possibilities of sidelink data resource configurations, the base station may reconfigure each of these eight configuration indices to correspond to a respective mini-slot based resource allocation. Further, the configuration index field may be repurposed to indicate a mini-slot based resource allocation. Alternatively, for configured grants having a same 3-bit configuration index field, the base station may reconfigure one or more of these eight configuration indices to respectively correspond to different mini-slot based resource allocations (e.g., that are indicated by a RRC configuration or table). As a result, when the base station includes one of these indices in the configuration index field of DCI, the base station may indicate the corresponding sidelink data resources to each span a number of symbols less than that of a slot such as illustrated in FIG. 14.

FIG. 14 illustrates an example 1400 of a resource pool including sidelink data resources 1402 in which a Tx UE may transmit sidelink data to a Rx UE. The resource pool and each of the sidelink data resources 1402 may be indicated in a DCI 1404 from a base station (or an RRC configuration [not shown]), and a first symbol of a first one of the sidelink data resources may follow a time gap 1406 indicated in the DCI (or RRC configuration). Each of the sidelink data resources 1402 may span a mini-slot 1408 in the time domain and one or more subchannels 1410 in the frequency domain (two subchannels in the illustrated example). For instance, one of the sidelink data resources may occupy a mini-slot in slot i across two subchannels, a second one of the sidelink data resources may occupy a same or different mini-slot in slot i+x across two subchannels, and a third one of the sidelink data resources may occupy a same or different mini-slot in slot i+y across two subchannels. In this example, the values of i, x, and y may be configured according for example to Table 1 as described with respect to FIG. 6, and the starting symbol and symbol length of each of the mini-slots may be configured in the DCI (or RRC configuration). Additionally, the sidelink data resources may in one example include only uplink symbols according to a semi-static slot format configuration such as described above with respect to FIG. 12A, while in another example the sidelink data resources may include flexible or downlink symbols according to a different semi-static slot format configuration such as described above with respect to FIG. 12B. The DCI (or RRC configuration) may configure the sidelink data resources according to any one or more of the aforementioned examples to indicate a mini-slot based resource allocation to the Tx UE.

In any of the aforementioned examples, the base station may provide a DCI including a TDRA which indicates a mini-slot based resource allocation of sidelink data resources. The TDRA may include a start length indicator value (SLIV) indicating a start symbol and symbol length for one or more of the sidelink data resources configured in the DCI. The SLIV may be the same for each sidelink data resource, or the SLIV may change for between one or more of the sidelink data resources. For instance, in the example of FIG. 14, the sidelink data resource 1402 spanning two subchannels of a mini-slot in slot i may be associated with a different SLIV (for instance, a different starting symbol or mini-slot symbol length) than the sidelink data resources 1402 spanning two subchannels of a mini-slot in slots i+x and i+y. Although the sidelink data resources may change in the time domain, generally the sidelink data resources may not change in the frequency domain. For instance, as illustrated in the example of FIG. 14, each of the sidelink data resources 1402 may occupy two subchannels. The base station may encode the SLIV in the TDRA according to any of the following examples, which may be applied alone or in combination with other examples.

In the following examples, the base station may configure the DCI to indicate a SLIV associated with one or more of the configured sidelink data resources, along with one or more timing offsets between respective pairs of the sidelink data resources. For instance, each TRIV in TDRA (or resource pool index) may be associated with a common SLIV or different individual SLIVs each including a start symbol and a symbol length applied to one or more resource reservations. Moreover, if multiple resource reservations are configured, the TDRA may also indicate a slot timing offset $\Delta t$ between resource reservations, for instance, a first slot timing offset t1 for one of the resource reservations, and if available, a second slot timing offset t2 for another one of the resource reservations. For example, if the base station configures three resource reservations such as illustrated in the example of FIG. 14, if the DCI (e.g., through TDRA) indicates a common SLIV having a start symbol of 0 and a symbol length of 5 symbols, and if the TDRA indicates the first slot timing offset t1 and the second slot timing offset t2, the base station may apply this SLIV to mini-slots in slots i, i+t1, and i+t2 accordingly. In other examples, the base station may configure more than three resource reservations in an RRC configuration (and thus more than three sidelink data resources in DCI), and the DCI may indicate a common or individual SLIV, a slot timing offset, and other parameters for each of these sidelink data resources. The base station may configure a larger number of resource reservations for mini-slot based resource allocations than for slot-based resource allocations due to the smaller size of each mini-slot compared to a slot.

Furthermore, the TDRA field of the DCI may also include a number of bits indicating various SLIVs for mini-slot based resource allocation, and other bits indicating values for the first slot timing offset t1 and second slot timing offset t2 (or slot timing offset $\Delta t$). As a result, the number of bits applied for the slot timing offset(s) may be limited in order to support a larger number of bits for SLIVs and thus more mini-slot-based resource allocations. Additionally, while in some cases the sidelink data resources may include only uplink symbols according to a semi-static slot format configuration such as described above with respect to FIG. 12A, in other cases the sidelink data resources may include flexible or downlink symbols according to a different semi-static slot format configuration such as described above with respect to FIG. 12B. Moreover, if an SLIV configured in DCI results in a sidelink data resource crossing a slot boundary, the base station or Tx UE may puncture the portion of the sidelink data resource in the subsequent slot with other data, thereby preventing sidelink data transmissions from crossing slot boundaries.

In a first example, the base station may configure the DCI to indicate a common SLIV which is applied to all resource reservations. For instance, the base station may configure a TRIV in the TDRA which is associated with a single SLIV, a first slot timing offset t1, a second slot timing offset t2. As a result, each sidelink data resource at slots i, i+t1, and i+t2 may include the same start symbol and symbol length, such as illustrated in the example of FIG. 14. In one example, the SLIV may be partially indicated in the TDRA and in another field of the DCI (e.g., a resource pool index). For instance, the base station may associate the TDRA (TRIV) indicated in the DCI with a start symbol for the common SLIV, and the base station may associate the resource pool index indicated in the DCI with a symbol length for the common SLIV, or vice-versa. Moreover, the slot timing offsets may have a fixed or semi-statically configurable relationship. For instance, the second slot timing offset t2 may be a function of the first slot timing offset t1 (e.g., t2 may be twice the time of t1). Thus, rather than indicating multiple slot timing offsets in the TDRA of the DCI, the base station may save bits in the DCI by indicating a single slot timing offset from which other slot timing offsets may be derived.

Figure 15:
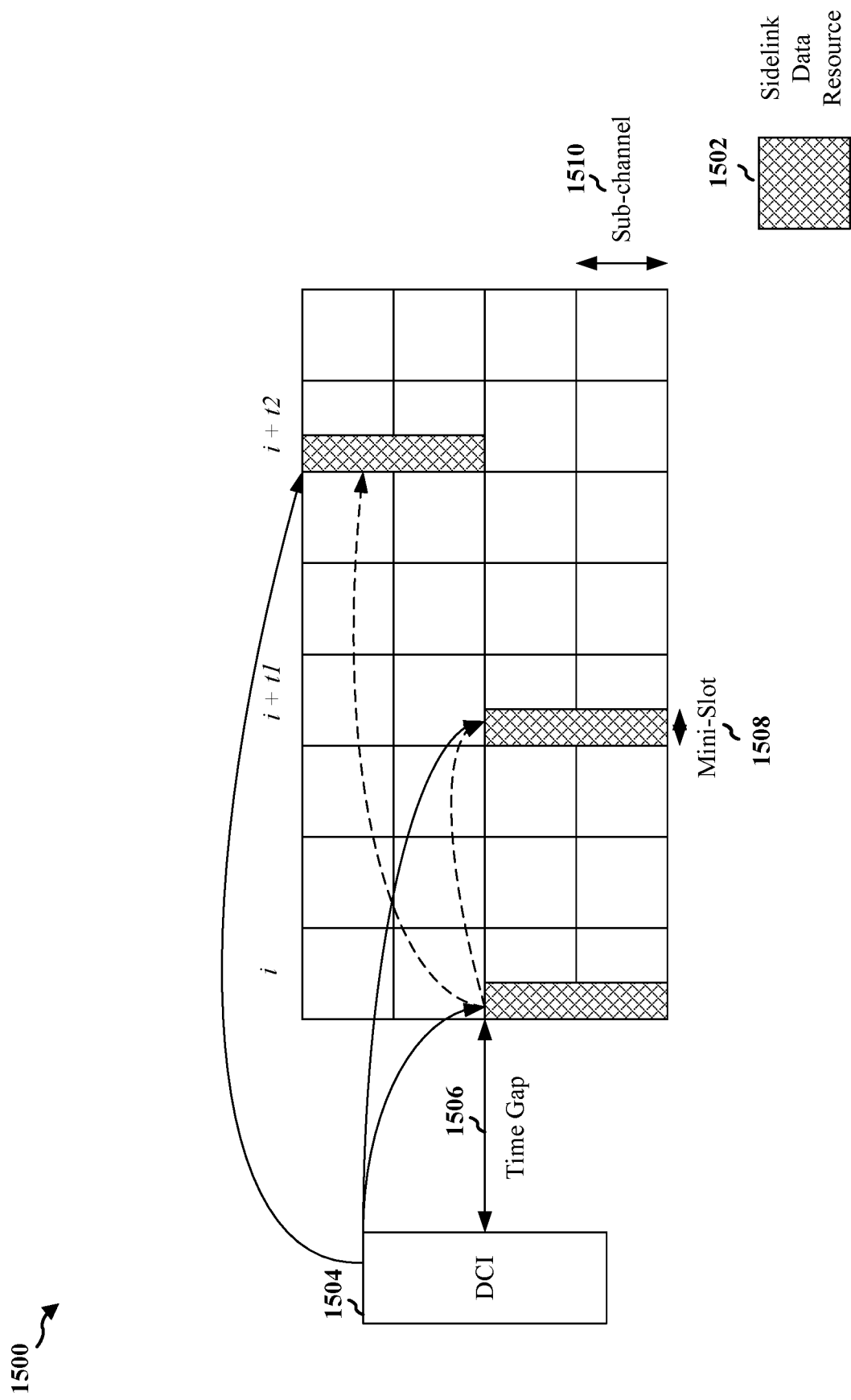
FIG. 15 is a diagram illustrating another example of a resource pool including sidelink data resources in which a Tx UE may transmit sidelink data to a Rx UE.

FIG. 15 illustrates an example 1500 of a resource pool including sidelink data resources 1502 having a common SLIV in which a Tx UE may transmit sidelink data to a Rx UE. The resource pool and each of the sidelink data resources 1502 may be indicated in a DCI 1504 from a base station (or an RRC configuration [not shown]), and a first symbol of a first one of the sidelink data resources may follow a time gap 1506 indicated in the DCI (or RRC configuration). Each of the sidelink data resources 1502 may span a mini-slot 1508 in the time domain and one or more subchannels 1510 in the frequency domain (two subchannels in the illustrated example). For instance, one of the sidelink data resources may occupy a mini-slot (corresponding to an indicated SLIV) in slot i across two subchannels, a second one of the sidelink data resources may occupy a same mini-slot (corresponding to the same SLIV) in slot i+t1 across two subchannels, and a third one of the sidelink data resources may occupy a same mini-slot (corresponding to the same SLIV) in slot i+t2 across two subchannels. In this example, the value of i represents the first symbol of the sidelink data resources following time gap 1506, the starting symbol and symbol length of each of the mini-slots may be configured via a common SLIV in the DCI (or RRC configuration), and the values of t1 and t2 may similarly be indicated in the DCI with the SLIV. The DCI (or RRC configuration) may configure the sidelink data resources according to the aforementioned first example to indicate a mini-slot based resource allocation to the Tx UE.

In a second example, the base station may configure the DCI to indicate not only a common SLIV which is applied to all resource reservations, but also a number of repetitions (a repetition factor K) for the sidelink data transmission. For instance, the base station may configure a TRIV in the TDRA which is associated with a single SLIV (similar to the example of FIG. 15), a repetition factor K corresponding to the number of resource reservations or sidelink data resources, and a slot timing offset $\Delta t$ referring to a time difference in symbols (or slots) between consecutive sidelink data resources (e.g., $\Delta t=t1-i=t2-t1$ in the example of FIG. 15). Thus, the DCI may allocate K sidelink data resources for repetition or re-transmission with the same SLIV in different slots ($\Delta t$ apart), similar to PUSCH repetition type A.

Still referring to the second example, the value of $\Delta t$ may be configured to accommodate Tx UE and Rx UE processing of HARQ feedback. For example, the value of $\Delta t$ may be configured to allow sufficient time for the Rx UE to attempt to decode a sidelink data transmission received in one sidelink data resource, for the Rx UE to provide HARQ feedback in PSFCH to the Tx UE in response to the decoding attempt, and for the Tx UE to prepare and re-transmit or repeat the sidelink data transmission in a subsequent sidelink data resource. Moreover, the base station may configure a FRIV in the FDRA which is associated with inter-repetition frequency hopping between one or more sidelink data resources according to a fixed frequency hopping pattern. The inter-repetition frequency hopping may be configured, for example, in the later of K sidelink data resources when the value of K meets or exceeds a threshold (e.g., K>2). For instance, in the illustrated example of FIG.

15, if the DCI indicates K=3 and if the FDRA is associated with a frequency hopping pattern to switch subcarriers every third transmission, the FDRA may configure the third sidelink data resource to occupy two different subchannels than those of the other sidelink data resources as illustrated, thereby providing frequency diversity for sidelink data repetitions or re-transmissions. Additionally, the sidelink data resources may not be limited to only uplink symbols, but may include flexible or downlink symbols according to a semi-static slot format configuration such as described above with respect to FIG. 12B. Furthermore, in some cases an SLIV configured in DCI may result in a sidelink data resource crossing a slot boundary. For example, if the start symbol of a mini-slot in a slot is adjacent or nearly adjacent to a subsequent slot boundary, or if the symbol length of the mini-slot in the slot causes the mini-slot to exceed the subsequent slot boundary, a crossed slot boundary may result. In such cases, the base station or Tx UE may puncture the portion of the sidelink data resource in the subsequent slot with other data, thereby preventing sidelink data transmissions from crossing slot boundaries.

Figure 16:
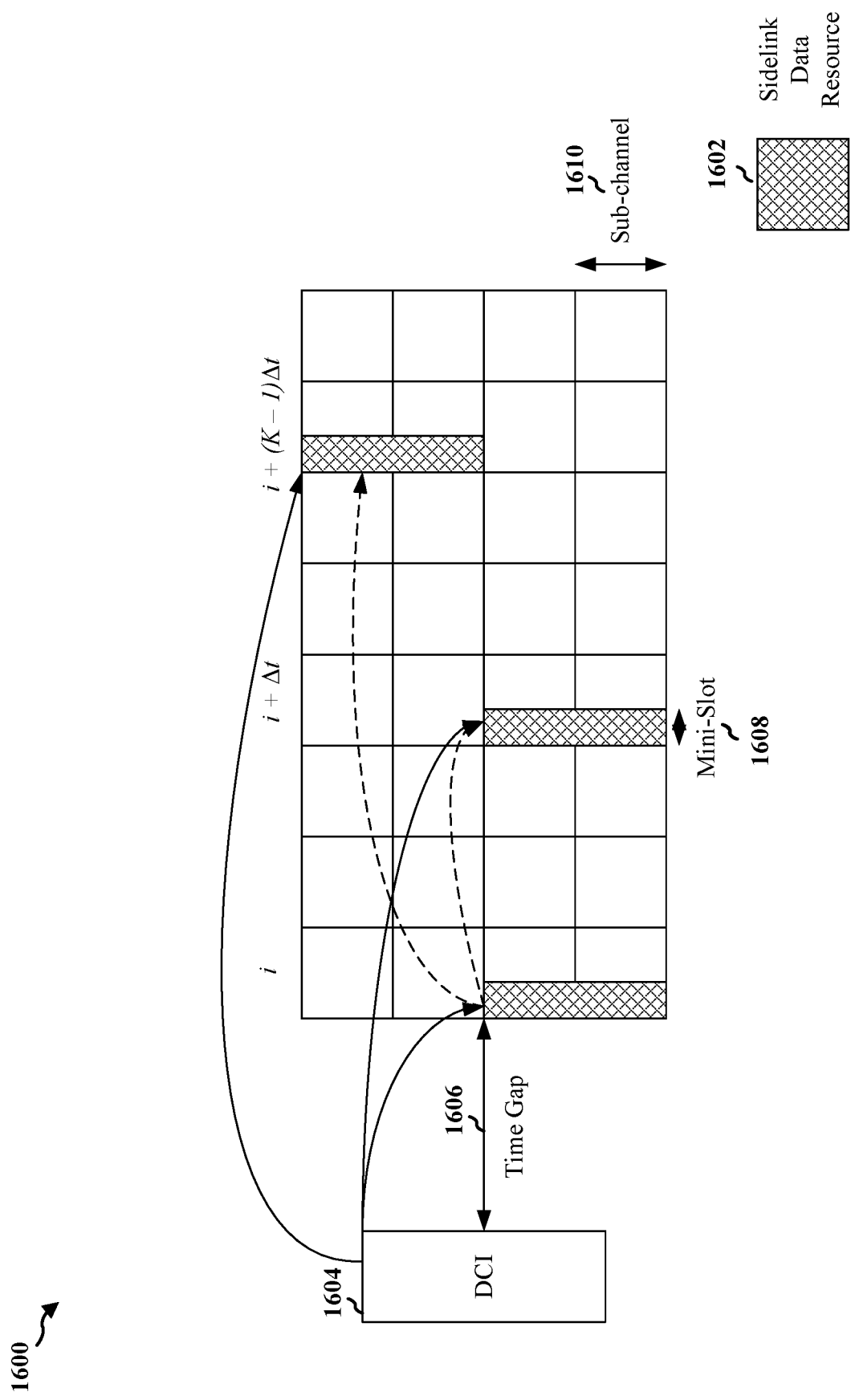
FIG. 16 is a diagram illustrating another example of a resource pool including sidelink data resources in which a Tx UE may transmit sidelink data to a Rx UE.

FIG. 16 illustrates an example 1600 of a resource pool including sidelink data resources 1602 having a common SLIV and slot time offset $\Delta t$ in which a Tx UE may transmit sidelink data to a Rx UE. The resource pool and each of the sidelink data resources 1602 may be indicated in a DCI 1604 from a base station (or an RRC configuration [not shown]), and a first symbol of a first one of the sidelink data resources may follow a time gap 1606 indicated in the DCI (or RRC configuration). Each of the sidelink data resources 1602 may span a mini-slot 1608 in the time domain and one or more subchannels 1610 in the frequency domain (two subchannels in the illustrated example). For instance, one of the sidelink data resources may occupy a mini-slot (corresponding to an indicated SLIV) in slot i across two subchannels, a second one of the sidelink data resources may occupy a same mini-slot (corresponding to the same SLIV) in slot i+$\Delta t$ across two subchannels, and so forth to a Kth one of the sidelink data resources which may occupy a same mini-slot (corresponding to the same SLIV) in slot i+(K−1)$\Delta t$ across two subchannels. In this example, the value of i represents the first symbol of the sidelink data resources following time gap 1506, the starting symbol and symbol length of each of the mini-slots may be configured via a common SLIV in the DCI (or RRC configuration), and the number of sidelink data resources K as well as the value of $\Delta t$ may similarly be indicated in the DCI (or RRC configuration) with the SLIV. The DCI (or RRC configuration) may configure the sidelink data resources according to the aforementioned second example to indicate a mini-slot based resource allocation to the Tx UE.

In a third example, the base station may configure the DCI to indicate multiple SLIVs applied respectively to different resource reservations, as well as the number of repetition (repetition factor K) for the sidelink data transmissions. For instance, the base station may configure a TRIV in the TDRA which is associated with multiple SLIVs (one SLIV for each resource reservation), and repetition factor K corresponding to the number of resource reservations or sidelink data resources. Unlike the previous example of FIG. 15 where each resource reservation is in a different slot, in this example, multiple ones of the resource reservations may be within a same slot. Thus, in one example, the base station may not configure a slot timing offset $\Delta t$ between consecutive sidelink data resources in the DCI, since the sidelink data resources may all be different mini-slots within a same single slot (e.g., $\Delta t=0$). In such example, the DCI may allocate K sidelink data resources with different SLIVs for intra-slot repetition in the same slot, similar to PUSCH repetition type B.

Alternatively, in a variation of the third example, the base station may configure the DCI not only to indicate the multiple resource reservations for intra-slot repetition in a same slot such as previously described, but to also indicate one or more additional resource reservations configured in a different slot(s) for inter-slot repetition or inter-slot re-transmission. For example, the TRIV configured in the TDRA may further be associated with slot timing offset t1 or $\Delta t$ for inter-slot repetitions or re-transmissions, as in the examples of FIG. 14 or 15. Moreover, one or more of the SLIVs associated with the TRIV for the intra-slot repetitions may apply to the inter-slot transmissions, or alternatively additional SLIV(s) for the inter-slot transmissions may be associated with the TRIV. Thus, the DCI may allocate sidelink data resources for intra-slot repetition with different SLIV in the same slot, similar to PUSCH repetition type B, as well as one or more sidelink data resource(s) for inter-slot repetition or re-transmission with a same or different SLIV in a different slot, similar to PUSCH repetition type A. Also, as in the previous example(s), the value of t1 or $\Delta t$ may be configured to accommodate Tx UE and Rx UE processing of HARQ feedback.

Figure 17:
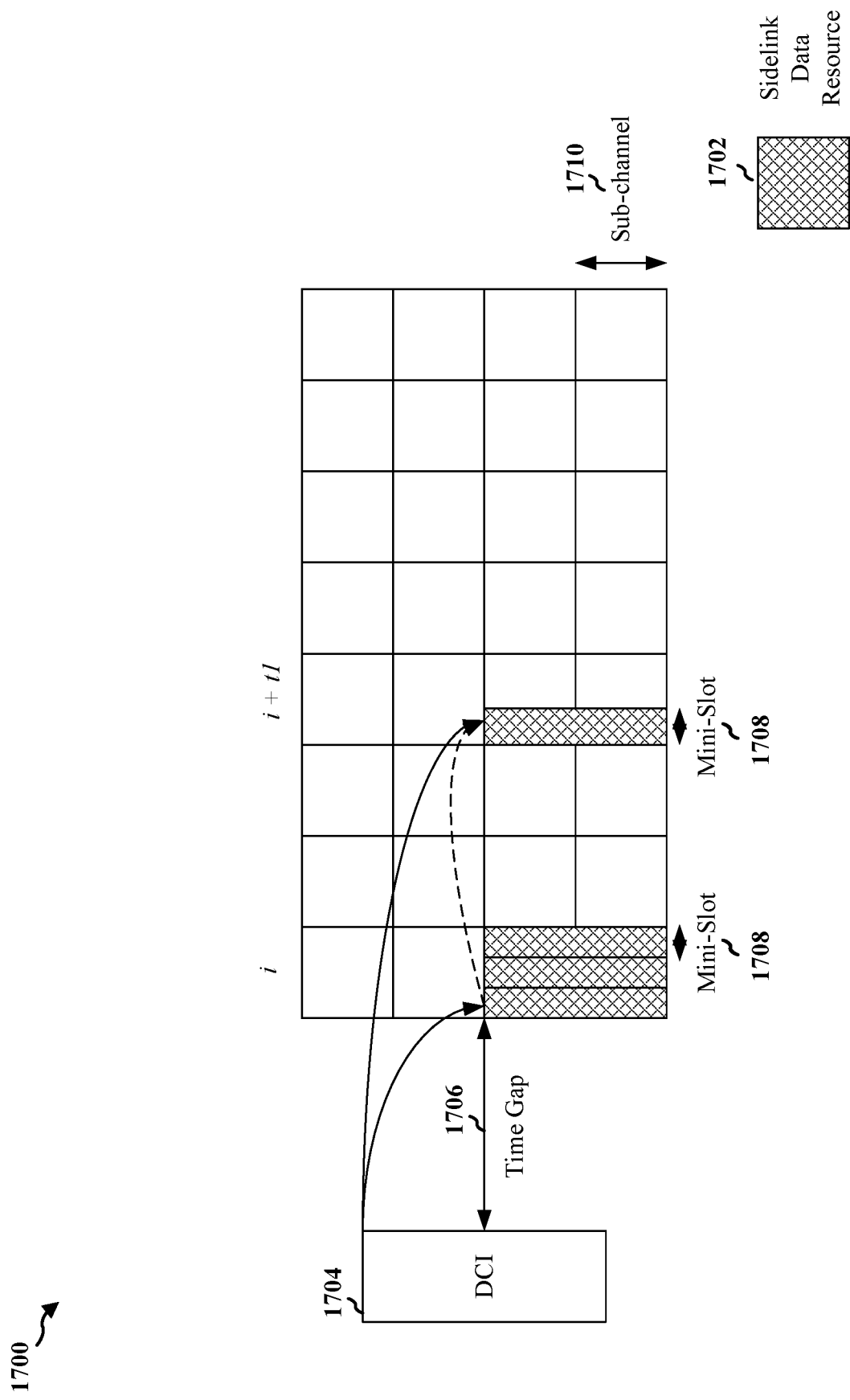
FIG. 17 is a diagram illustrating another example of a resource pool including sidelink data resources in which a Tx UE may transmit sidelink data to a Rx UE.

FIG. 17 illustrates an example 1700 of a resource pool including sidelink data resources 1702 having different SLIVs for intra-slot repetitions, and optionally a slot time offset t1 for inter-slot repetitions or re-transmissions, in which a Tx UE may transmit sidelink data to a Rx UE. The resource pool and each of the sidelink data resources 1702 may be indicated in a DCI 1704 from a base station (or an RRC configuration [not shown]), and a first symbol of a first one of the sidelink data resources may follow a time gap 1706 indicated in the DCI (or RRC configuration). Each of the sidelink data resources 1702 may span a mini-slot 1708 in the time domain and one or more subchannels 1710 in the frequency domain (two subchannels in the illustrated example). For instance, one of the sidelink data resources may occupy a mini-slot (corresponding to an indicated SLIV) in slot i across two subchannels, a second one of the sidelink data resources may occupy a different mini-slot (corresponding to a different indicated SLIV) in the same slot i across two subchannels, a third one of the sidelink data resources may occupy another different mini-slot (corresponding to another indicated SLIV) in the same slot i across two subchannels. Additionally, in one example, a fourth one of the sidelink data resources may occupy a mini-slot (corresponding to one of the other SLIVs or a different SLIV) in slot i+t1 across two subchannels. In this example, the value of i represents the first symbol of the sidelink data resources following time gap 1506, the starting symbol and symbol length of each of the mini-slots in slots i and i+t1 may be configured via different SLIVs in the DCI (or RRC configuration), and the number of sidelink data resources K as well as the value of t1 may similarly be indicated in the DCI (or RRC configuration) with the SLIV. The DCI (or RRC configuration) may configure the sidelink data resources according to the aforementioned third example to indicate a mini-slot based resource allocation to the Tx UE.

In a fourth example, the base station may configure the DCI to indicate multiple SLIVs applied respectively to different resource reservations, as well as multiple slot timing offsets for the different resource reservations. For instance, the base station may configure a TRIV in the TDRA which is associated with multiple SLIVs (one SLIV for each resource reservation), a first slot timing offset t1 for one resource reservation, and a second slot timing offset t2 for another resource reservation. As a result, each sidelink data resource at slots i, i+t1, and i+t2 may include different start symbols or symbol lengths. Although in this example the base station indicates three sidelink data resources (one SLIV for slot i, a different SLIV and slot timing offset t1 for slot i+t1, and another SLIV and slot timing offset t2 for slot i+t2), in other examples, the base station may configure more than three resource reservations in an RRC configuration (and thus more than three sidelink data resources in DCI), and the DCI may indicate different SLIVs, slot timing offsets, and other parameters for each of these sidelink data resources. For example, the base station may configure a TRIV in the TDRA which is associated with four SLIVs and three timing offsets for four reservations, five SLIVs and four timing offsets for five reservations, and so forth.

In variations of the fourth example, the base station may configure the slot timing offsets t1, t2, etc. in an RRC configuration, or the slot timing offsets may be fixed. Moreover, each of the slot timing offsets may be configured with respect to a corresponding PSFCH for a respective one of the sidelink data resources. For instance, the value of t1 may be configured to accommodate Tx UE and Rx UE processing of HARQ feedback in PSFCH for slot i, and the value of t2 may be configured to accommodate Tx UE and Rx UE processing of HARQ feedback in PSFCH for slot i+t1. Furthermore, each of the SLIVs configured in the DCI may have a fixed or semi-statically configurable relationship. For instance, the SLIV for the sidelink data resource in slot i+t1 may be a function of the SLIV for the sidelink data resource in slot i (e.g., the former SLIV includes twice the symbol length of the latter SLIV), and the SLIV for the sidelink data resource in slot i+t2 may be a function of the SLIV for the sidelink data resource in slot i+t1 (or slot i) (e.g., the former SLIV similarly includes twice the symbol length of the latter SLIV or four times the symbol length of the initial SLIV). Thus, rather than indicating multiple SLIVs in the TDRA of the DCI, the base station may save bits in the DCI by indicating a single SLIV from which other SLIVs may be derived.

Additionally, in some examples, the SLIVs may include different start symbols or symbol lengths in different sidelink data resources. For instance, the SLIV for slot i may include one start symbol or symbol length, the SLIV for slot i+t1 may include another start symbol or another symbol length, and so forth. Alternatively, in other examples, the SLIVs may be configured such that a SLIV for a respective sidelink data resource specifically increases in symbol length over time. For instance, the SLIV for slot i may include one symbol length, the SLIV for slot i+t1 may include twice the symbol length of the SLIV in slot i, and so forth. Similarly, the SLIV for slot i+t1 may include an earlier start symbol than the SLIV for slot i). The increase in symbol length over time (or earlier start symbol over time) may allow later repetitions or re-transmissions to have lower block error rates (BLERs) than earlier repetitions or re-transmissions, which may be particularly helpful for Tx UEs in IIoT with transmission latency bounds (e.g., sidelink data expiration times). Moreover, the sidelink data resources may not all be limited to mini-slots. For instance, to reduce BLER over time as the sidelink data moves towards expiry, one sidelink data resource may include a SLIV spanning two symbols in a mini-slot of slot i, another sidelink data resource may include a different SLIV spanning five symbols in a mini-slot of slot i+t1, and another sidelink data resource may include a different SLIV spanning the entirety of slot i+t2. In this way, the reliability of the sidelink data repetition or re-transmission may improve with lower BLER the closer the sidelink data moves toward expiration.

Figure 18:
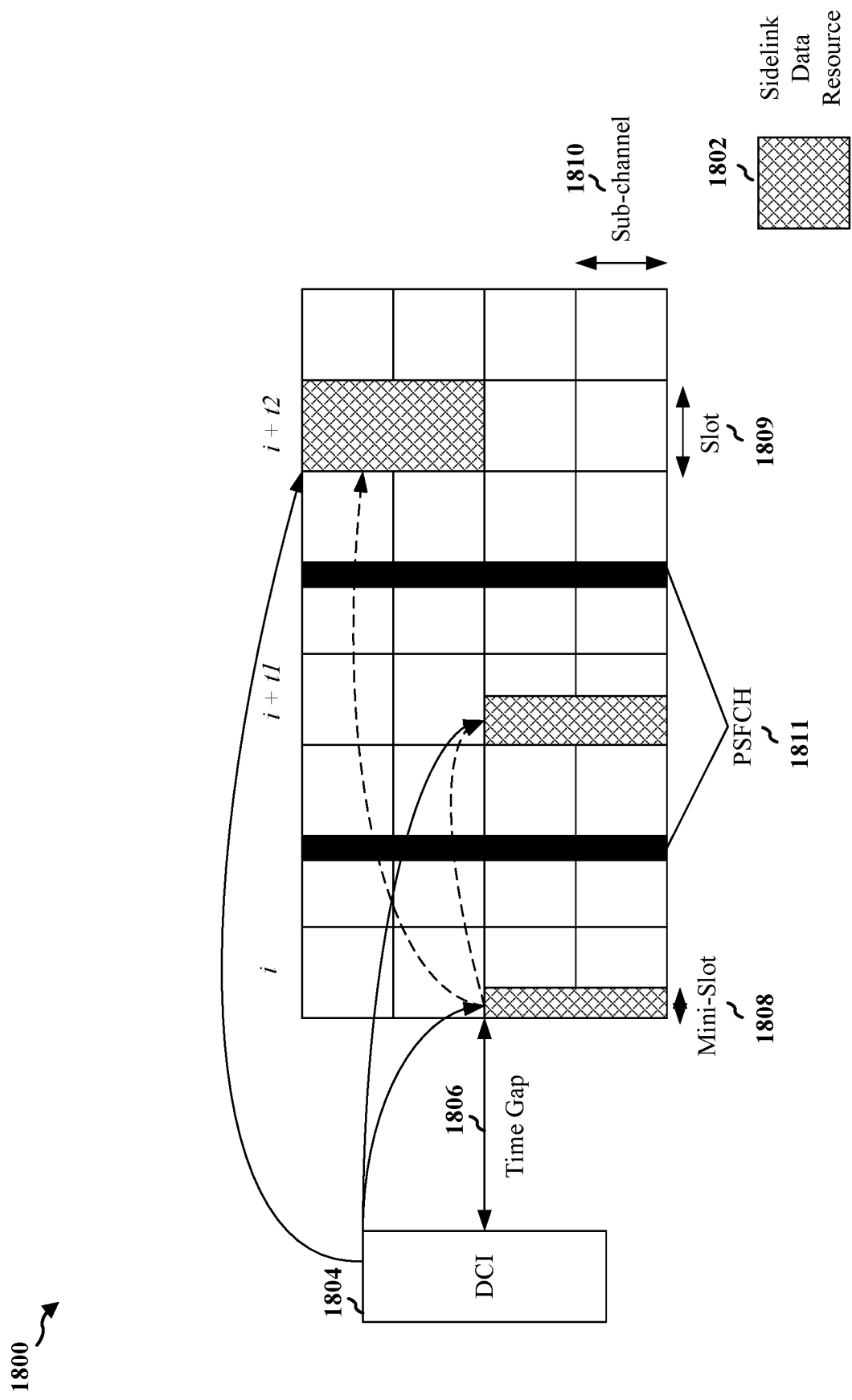
FIG. 18 is a diagram illustrating another example of a resource pool including sidelink data resources in which a Tx UE may transmit sidelink data to a Rx UE.

FIG. 18 illustrates an example 1800 of a resource pool including sidelink data resources 1802 having different SLIVs and slot time offsets t1 and t2 in which a Tx UE may transmit sidelink data to a Rx UE. The resource pool and each of the sidelink data resources 1802 may be indicated in a DCI 1804 from a base station (or an RRC configuration [not shown]), and a first symbol of a first one of the sidelink data resources may follow a time gap 1806 indicated in the DCI (or RRC configuration). Each of the sidelink data resources 1802 may span a mini-slot 1808 or slot 1809 in the time domain and one or more subchannels 1810 in the frequency domain (two subchannels in the illustrated example). For instance, one of the sidelink data resources may occupy a mini-slot (corresponding to an indicated SLIV) in slot i across two subchannels, a second one of the sidelink data resources may occupy a different mini-slot (corresponding to a different indicated SLIV) in slot i+t1 across two subchannels, and a third one of the sidelink data resources may occupy every symbol (corresponding to another indicated SLIV) in slot i+t1 across two subchannels. In this example, the value of i represents the first symbol of the sidelink data resources following time gap 1806, the starting symbol and symbol length of each of the mini-slots in slots i, i+t1, and i+t2 may be configured via different SLIVs in the DCI (or RRC configuration), and the number of sidelink data resources as well as the values of t1 and t2 may similarly be indicated in the DCI (or RRC configuration) with the SLIV. Additionally or alternatively, the values of t1 and t2 may each be configured with respect to a PSFCH 1811 (e.g., to provide a delay of one slot after the last symbol of PSFCH for HARQ processing and sidelink data re-transmission as in the example of FIG. 18). The DCI (or RRC configuration) may configure the sidelink data resources according to the aforementioned fourth example to indicate a mini-slot based resource allocation (as well as a slot based resource allocation) to the Tx UE.

Accordingly, in the above-described examples, the Tx UE may receive a DCI, or an RRC configuration in combination with DCI, indicating mini-slot based resource allocations from a base station in mode 1 resource allocation. After receiving the DCI, the Tx UE may determine from the DCI (or RRC configuration) whether its reserved resources for sidelink data transmission are mini-slots, based for example on the RP index, TDRA associated with common or individual SLIVs, repetition factors, and slot offsets, FDRA, lowest subchannel index, configuration index, dedicated fields, or other parameters as previously described with respect to FIGS. 14-19. Alternatively, if mode 2 resource allocation is instead configured, the Tx UE may autonomously determine these parameters associated with its sidelink data resources. Moreover, to similarly inform the Rx UE of these mini-slot based resource allocations (in mode 1 or mode 2 resource allocation), the Tx UE may transmit a SCI including the aforementioned parameters to the Rx UE. For instance, the Tx UE may configure SCI-1 to include the RP index, TDRA associated with common or individual SLIVs, repetition factors, and slot offsets, FDRA, lowest subchannel index, configuration index, dedicated fields, or other parameters as previously described with respect to FIGS. 14-18. After the Rx UE decodes the SCI, the Rx UE may similarly determine whether its reserved resources for receiving the sidelink data transmission are mini-slots. Thus, the following examples describe ways in which the Rx UE may be informed of these parameters in either mode 1 resource allocation or mode 2 resource allocation.

In a first example, where the RP index or TDRA indicate a mini-slot based resource allocation as previously described, the Tx UE may configure the RP index or TDRA in the SCI to exclusively apply for Rx UEs capable of applying mini-slot based resource allocations. Similarly, in mode 1 resource allocation, the base station may configure the RP index or TDRA in the DCI, which the Tx UE may copy into the SCI, to exclusively apply for Rx UEs capable of applying mini-slot based resource allocations. This configuration may prevent Rx UEs which are incapable of applying mini-slot based resource allocations from incorrectly interpreting the RP index or TDRA in SCI as indicating a slot-based resource allocation. For instance, different bands (bandwidths or bandwidth parts) may have different RP indices and TRIVs for TDRA. As a result, in one band, an RP index may correspond to a resource pool configured for slot-based resource allocations such as illustrated in FIG. 13, while in another band, another RP index may correspond to a different resource pool in another band configured for mini-slot based resource allocations such as illustrated in FIGS. 14-18. Similarly, in one band, a TRIV may be associated with a SLIV indicating a slot-based resource allocation such as illustrated in FIG. 13, while in another band, the same TRIV may be associated with a different SLIV indicating a mini-slot based resource allocation such as illustrated in FIGS. 14-18. Therefore, during mode 1 resource allocation, the base station may configure in DCI, depending on the band, different RP indices or TRIVs for different Tx UEs such that Tx UEs which are incapable of applying mini-slot based resource allocations will only be configured with slot-based resource allocations. The Tx UE may then copy the band-based RP index or TDRA into the SCI to ensure the same result for Rx UEs. Similarly, during mode 2 resource allocation, the Tx UE may configure in SCI different RP indices or TRIVs for different Rx UEs depending on the band.

In a second example, during mode 1 resource allocation in some cases, the Tx UE and Rx UE may both be in coverage of the base station. Therefore, the Tx UE and Rx UE may both receive DCI from the base station indicating a mini-slot based resource allocation for sidelink data. For instance, if the base station broadcasts or multicasts the DCI indicating the mini-slot based resource allocation to the Tx UE, the Rx UE may receive the same DCI. Alternatively, the base station may provide a separate DCI to the Rx UE indicating the RP index, TDRA associated with common or individual SLIVs, repetition factors, and slot offsets, FDRA, lowest subchannel index, configuration index, dedicated fields, or other parameters as previously described with respect to FIGS. 14-18. As a result, the Tx UE may refrain from providing the Rx UE a duplicate indication of the mini-slot based resource allocation. For instance, the Tx UE may omit sending the SCI including the aforementioned parameters to the Rx UE. The Tx UE may determine whether the Rx UE has received this DCI, and thus refrain from providing the SCI, in response to HARQ feedback from the Rx UE or base station. For example, if the Rx UE successfully decode the DCI, the Rx UE may provide an acknowledgment (ACK) to the Tx UE, or the Rx UE may provide an ACK to the base station which in turn may forward the ACK to the Tx UE, and the Tx UE may refrain from sending the SCI in response to the ACK. Alternatively, if the Rx UE fails to decode the DCI, the Rx UE may provide a non-acknowledgment (NACK) to the Tx UE (directly or indirectly via the base station similar to ACK), and the Tx UE may refrain from sending the SCI in response to the NACK.

In a third example, the Tx UE may inform the Rx UE of the mini-slot based resource allocation in SCI-2, rather than SCI-1, depending on the initially configured sidelink data resource. For instance, during mode 2 resource allocation, the Tx UE may autonomously determine to reserve the sidelink data resource in the initial symbols of a slot, for example, in response to channel sensing. Similarly, during mode 1 resource allocation, the base station may configure the sidelink data resource in the initial symbols of a slot, for example, in DCI. In either case, if in one example the sidelink data resource is configured in initial symbols of a slot typically associated with PSCCH, both the Rx UE capable of applying mini-slot based resource allocations and the Rx UE incapable of applying mini-slot based resource allocations may attempt to decode SCI-1 in these initial symbols of the slot. As a result, if the SCI-1 indicates a mini-slot based resource allocation, for example, through a TDRA associated with common or individual SLIVs, repetition factors, and slot offsets as previously described, incapable Rx UEs may interpret the TDRA erroneously. To prevent this erroneous interpretation, the Tx UE may configure SCI-1 in these initial symbols to have parameters indicating a slot-based resource allocation such as described above with respect to FIG. 13, while configuring SCI-2 to indicate the mini-slot based resource allocation. For instance, the Tx UE may include in SCI-1 a TDRA including a SLIV indicating a slot for each sidelink data resource, while including in SCI-2 the TDRA associated with common or individual SLIVs or other parameters for a mini-slot in each sidelink data resource as previously described with respect to FIGS. 14-18. Thus, when a Rx UE incapable of applying mini-slot based resource allocations receives and decodes SCI-1 and SCI-2, that UE may correctly interpret the slots including configured sidelink data resources, while disregarding the mini-slots including the configured sidelink data resources (e.g., in response to determining that this UE is not the destination UE in SCI-2). In contrast, when a Rx UE capable of applying mini-slot based resource allocations receives and decodes SCI-1 and SCI-2, that UE may correctly interpret the mini-slot based resource allocation. On the other hand, if in a different example the sidelink data resource is configured in later symbols of the slot (which are not typically associated with PSCCH), the Rx UE incapable of applying mini-slot based resource allocations may not attempt to decode SCI-1 in these initial symbols of the slot. As a result, the risk of erroneous TDRA interpretation by incapable Rx UEs is significantly reduced, and therefore the Tx UE may configure SCI-1 in these later symbols to indicate the mini-slot based resource allocation such as previously described, without relying on SCI-2 for this purpose.

Figure 19:
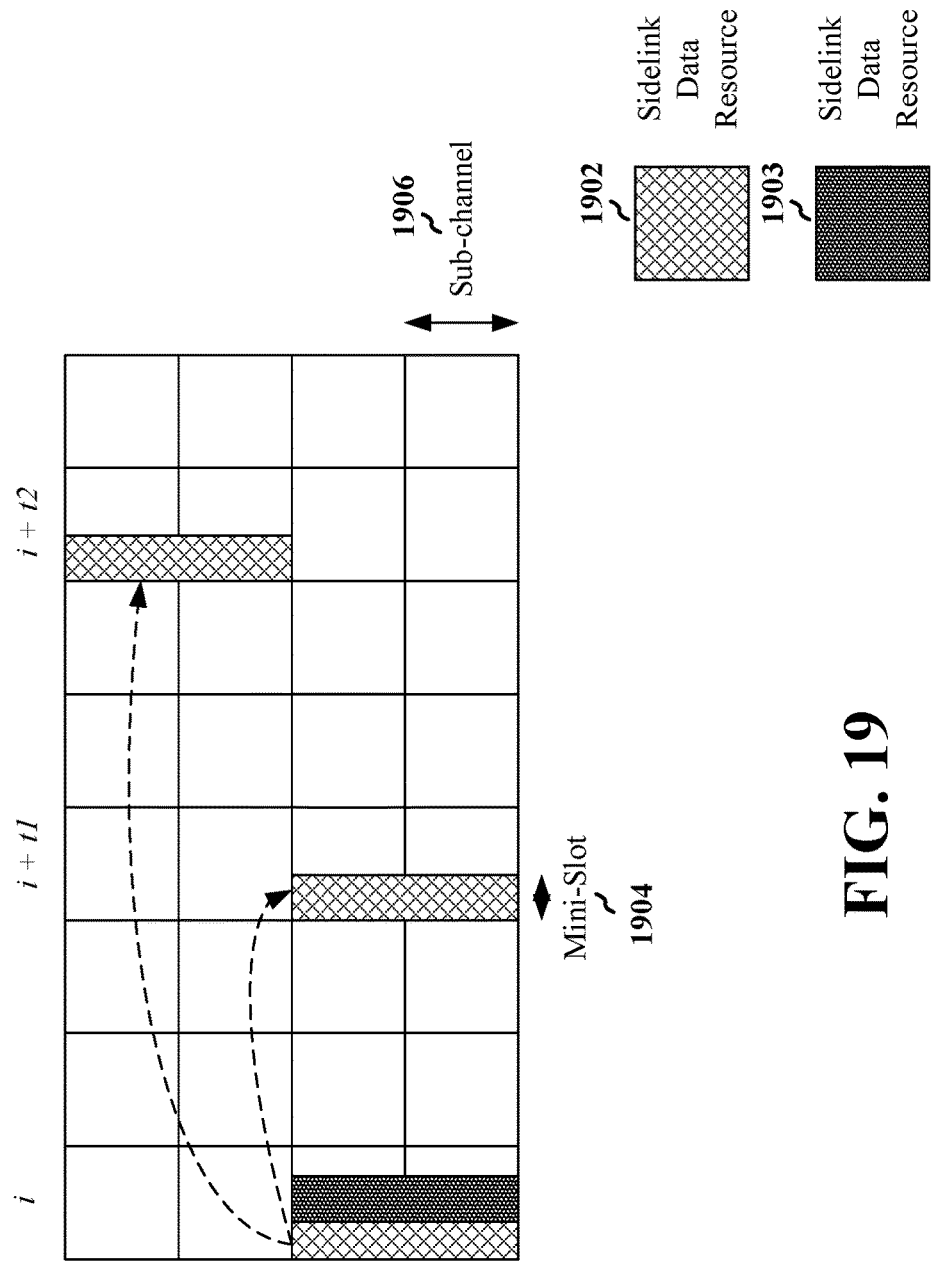
FIG. 19 is a diagram illustrating another example of a resource pool including sidelink data resources in which a Tx UE may transmit sidelink data to a Rx UE.

FIG. 19 illustrates an example 1900 of a resource pool including sidelink data resources 1902 or sidelink data resources 1903 in which a Tx UE may transmit sidelink data to a Rx UE. The resource pool and each of the sidelink data resources 1902 (or alternatively the sidelink data resource 1903) may be autonomously determined by the Tx UE in a mode 2 resource allocation or indicated from the base station in a mode 1 resource allocation. Each of the sidelink data resources 1902, 1903 may span a mini-slot 1904 in the time domain and one or more subchannels 1906 in the frequency domain (two subchannels in the illustrated example).

In one example where sidelink data resources 1902 are configured, one of the sidelink data resources 1902 may occupy a mini-slot in initial symbols of slot i across two subchannels, a second one of the sidelink data resources 1902 may occupy a same or different mini-slot in initial symbols of slot i+t1 across two subchannels, and a third one of the sidelink data resources 1902 may occupy a same or different mini-slot in initial symbols of slot i+t2 across two subchannels, where i, t1, and t2 refer to respective slots or slot offsets as previously described with respect to FIG. 15. Since the sidelink data resource in slot i occupies initial symbols as illustrated, the Tx UE may indicate a slot-based resource allocation in SCI-1 and a mini-slot based resource allocation in SCI-2. For instance, SCI-1 may be configured to indicate slots i, i+t1, and i+t2 are reserved for sidelink data transmissions, while SCI-2 may be configured to more specifically indicate sidelink data resources 1902 in mini-slots of slots i, i+t1, and i+t2.

Alternatively, in another example where sidelink data resource 1903 is configured, sidelink data resource 1903 may occupy a mini-slot in later symbols of slot i across two subchannels. Since the sidelink data resource 1903 in slot i occupies later symbols as illustrated, the Tx UE may indicate the mini-slot based resource allocation in SCI-1 instead of SCI-2. For instance, SCI-1 may be configured to indicate sidelink data resources 1903 in mini-slots of slots i, i+t1, and i+t2 such as previously described.

Figure 20:
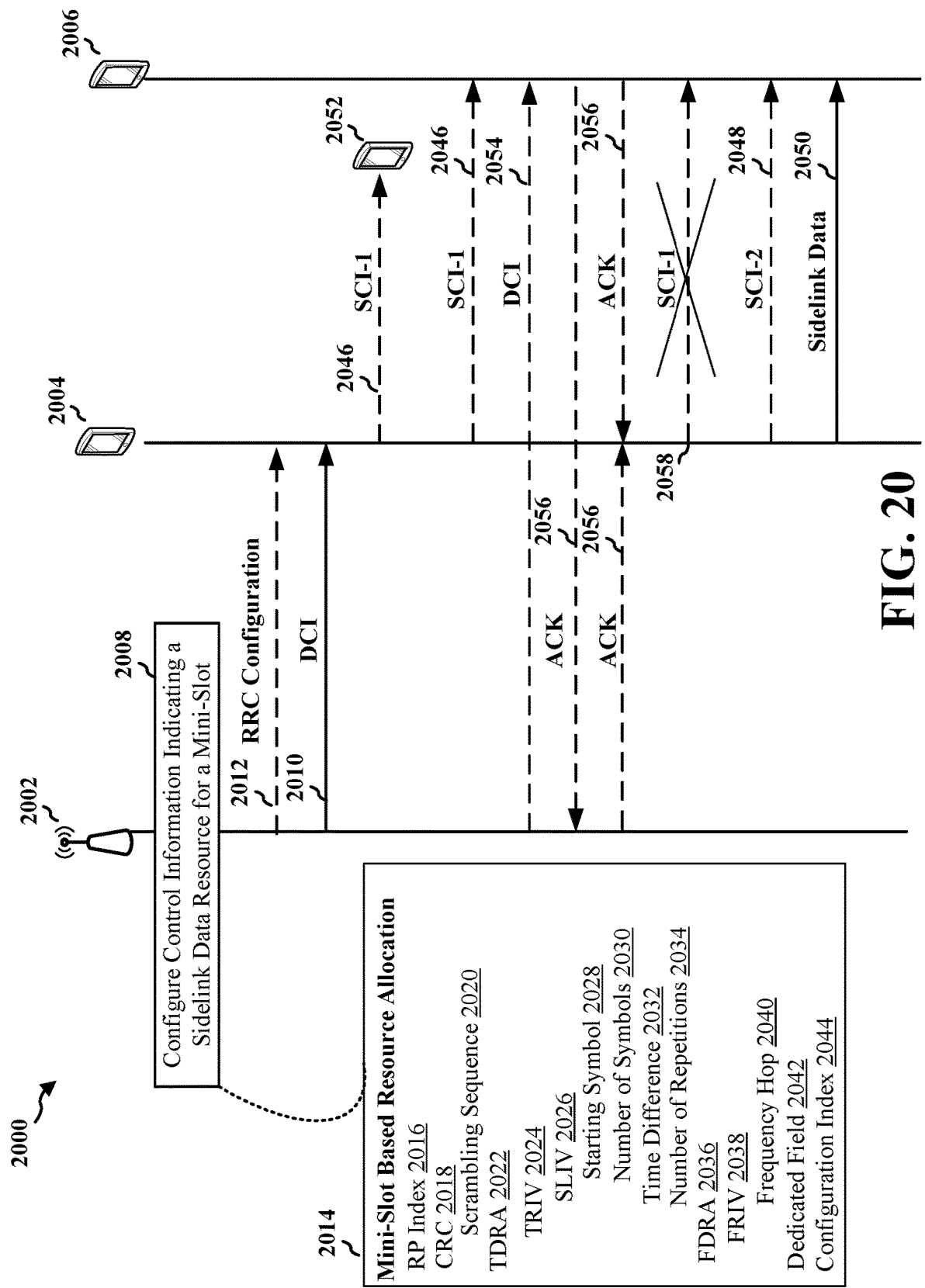
FIG. 20 is a diagram illustrating a call flow between a base station, a Tx UE, and a Rx UE.

FIG. 20 illustrates an example 2000 of a call flow between a base station 2002, a Tx UE 2004, and a Rx UE 2006. At block 2008, the base station may configure control information indicating a sidelink data resource for a mini-slot. For instance, in mode 1 resource allocation, the base station may configure and transmit a DCI 2010 or a RRC configuration 2012 which indicate (individually or in combination) a mini-slot based resource allocation 2014 in sidelink data resources (e.g., sidelink data resource 1402, 1502, 1602, 1702, 1802, 1902, 1903). The mini-slot based resource allocation 2014 may be indicated through one or more parameters of the DCI 2010, the RRC configuration 2012, or a combination of the DCI and RRC configuration. For instance, the base station may indicate use of a mini-slot (e.g., mini-slot 1408, 1508, 1608, 1708, 1808, 1904) for sidelink communications through one or more of the following parameters of DCI 2010 or RRC configuration 2012: a resource pool index 2016, a CRC 2018 with different scrambling sequence 2020 for DCI 2010, a TDRA 2022 including a TRIV 2024 which indicates a SLIV 2026 (including a starting symbol 2028 and number of symbols 2030), a time difference 2032 between sidelink data resources, a number of repetitions 2034, a FDRA 2036 including a FRIV 2038 which indicates subchannels and a frequency hop 2040 in subchannels between sidelink data resources, a dedicated field 2042, and a configuration index 2044.

The DCI or RRC configuration may indicate the mini-slot based resource allocation 2014 through any one or combination of these parameters as previously described with respect to FIGS. 14-19. For instance, the base station 2002 may configure the resource pool index 2016 in DCI 2010 to indicate a mini-slot based resource allocation in which the sidelink data resources 1402 span mini-slot 1408 in the time domain, as previously described in the first example with respect to FIG. 14. Alternatively or additionally, the base station may configure the different scrambling sequence 2020 applied to CRC 2018 to indicate a mini-slot based resource allocation in which the sidelink data resources 1402 span mini-slot 1408 in the time domain, as previously described in the second example with respect to FIG. 14. Alternatively or additionally, the base station may provide RRC configuration 2012 to indicate a mini-slot based resource allocation in which the sidelink data resources 1402 span mini-slot 1408 in the time domain, as previously described in the third example with respect to FIG. 14. Alternatively or additionally, the base station may include dedicated field 2042 in DCI 2010 to indicate a mini-slot based resource allocation in which the sidelink data resources 1402 span mini-slot 1408 in the time domain, as previously described in the fourth example with respect to FIG. 14. Alternatively or additionally, the base station may configure an un-specified TRIV (e.g., TRIV 2024), an un-specified FRIV (e.g., FRIV 2038), or both in DCI 2010 to indicate a mini-slot based resource allocation in which the sidelink data resources 1402 span mini-slot 1408 in the time domain, as previously described in the fifth example with respect to FIG. 14. Alternatively or additionally, the base station may configure the configuration index 2044 in DCI 2010 to indicate a mini-slot based resource allocation in which the sidelink data resources 1402 span mini-slot 1408 in the time domain, as previously described in the sixth example with respect to FIG. 14.

In other examples, alternatively or additionally to the aforementioned examples, the base station may configure a common SLIV (e.g., SLIV 2026) for all resource reservations (e.g., where starting symbol 2028 and number of symbols 2030 is the same for each reservation) and slot timing offsets (e.g., time differences 2032), as previously described with respect to the example of FIG. 15. Alternatively or additionally, the base station may configure a common SLIV (e.g., SLIV 2026) for all resource reservations (e.g., where starting symbol 2028 and number of symbols 2030 is the same for each reservation), a repetition factor K (e.g., number of repetitions 2034), and a slot timing offset (e.g., time difference 2032), as previously described with respect to the example of FIG. 16. Alternatively or additionally, the base station may configure multiple SLIVs (e.g., SLIVs 2026) for resource reservations (e.g., where starting symbol 2028 or number of symbols 2030 is different for respective reservations), a repetition factor K (e.g., number of repetitions 2034), and in some cases a slot timing offset (e.g., time difference 2032), as previously described with respect to the example of FIG. 17. Alternatively or additionally, the base station may configure multiple SLIVs (e.g., SLIVs 2026) for resource reservations (e.g., where starting symbol 2028 or number of symbols 2030 is different for respective reservations), a repetition factor K (e.g., number of repetitions 2034), and multiple slot timing offsets (e.g., time differences 2032), as previously described with respect to the example of FIG. 18.

In mode 1 resource allocation, the Tx UE 2004 may receive the DCI 2010 (or the RRC configuration 2012) from the base station 2002 indicating the mini-slot based resource allocation 2014 through one or more of the aforementioned parameters. Alternatively, in mode 2 resource allocation, the Tx UE 2004 may itself determine the mini-slot based resource allocation 2014, for example, in response to identifying one or more of the aforementioned parameters. In either mode, the Tx UE 2004 may provide to the Rx UE 2006, a SCI-1 2046 or a SCI-2 2048 indicating one or more of the aforementioned parameters in configured or determined sidelink data resources. After transmitting this information to the Rx UE 2006, the Tx UE 2004 may transmit sidelink data 2050 to the Rx UE in the configured or determined sidelink data resources. Similarly, the Rx UE 2006 may determine the mini-slot based resource allocation 2014 from received control information from either the Tx UE 2004 or base station 2002 (e.g., from SCI-1 2046, SCI-2 2048, or DCI), after which the Rx UE may receive the sidelink data 2050 from the Tx UE in the determined sidelink data resources.

In a first previously described example in which the Rx UE 2006 may be informed of mini-slot based resource allocation, the Tx UE 2004 may broadcast or multicast SCI-1 2046 including resource pool index 2016 or TDRA 2022 which exclusively applies for Rx UEs capable of applying mini-slot based resource allocations. In this example, the Tx UE 2004 may broadcast or multicast SCI-1 2046 to Rx UE 2006 and other UE 2052, which may be configured on different bands or bandwidth parts with different associated resource pools or TDRAs since Rx UE 2006 is capable of applying mini-slot based resource allocations but other UE 2052 is incapable of applying mini-slot based resource allocations. As a result, the SCI-1 2046 including the resource pool index 2016 or TDRA 2022 may indicate to Rx UE 2006 the mini-slot based resource allocation 2014 while indicating to other UE 2052 a slot-based resource allocation such as described with respect to FIG. 13.

In a second previously described example in which the Rx UE 2006 may be informed of mini-slot based resource allocation, the Rx UE 2006 and the Tx UE 2004 may both be in coverage of the base station 2002, and so the Rx UE 2006 may receive a DCI 2054 from the base station including one or more of the aforementioned parameters as previously described in a second example. The DCI 2054 may be the same DCI 2010 received by Tx UE 2004 or a different DCI. In response to reception of the DCI 2054 (or DCI 2010), the Rx UE may provide an ACK 2056 to either the Tx UE 2004 or the base station 2002 (which may forward the ACK to the Tx UE). In response to the ACK 2056, the Tx UE 2004 may determine that the Rx UE 2006 has received the mini-slot based resource allocation 2014, and therefore at 2058, the Tx UE may refrain from sending SCI-1 2046 to the Rx UE as illustrated.

In a third previously described example in which the Rx UE 2006 may be informed of mini-slot based resource allocation 2014, the Tx UE may inform the Rx UE of the mini-slot based resource allocation either in SCI-2 2048 or SCI-1 2046 depending on the initially configured sidelink data resource such as described above with respect to FIG. 19. For instance, where sidelink data resources 1902 are configured, the Tx UE may indicate a slot-based resource allocation in SCI-1 and a mini-slot based resource allocation in SCI-2. Thus, the Tx UE 2004 may inform the Rx UE 2006 of the mini-slot based resource allocation 2014 in SCI-2 2048. Alternatively, in another example where sidelink data resource 1903 is configured, the Tx UE may indicate the mini-slot based resource allocation in SCI-1 instead of SCI-2. In such case, the Tx UE 2004 may inform the Rx UE 2006 of the mini-slot based resource allocation 2014 in SCI-1 2046.

Figure 21:
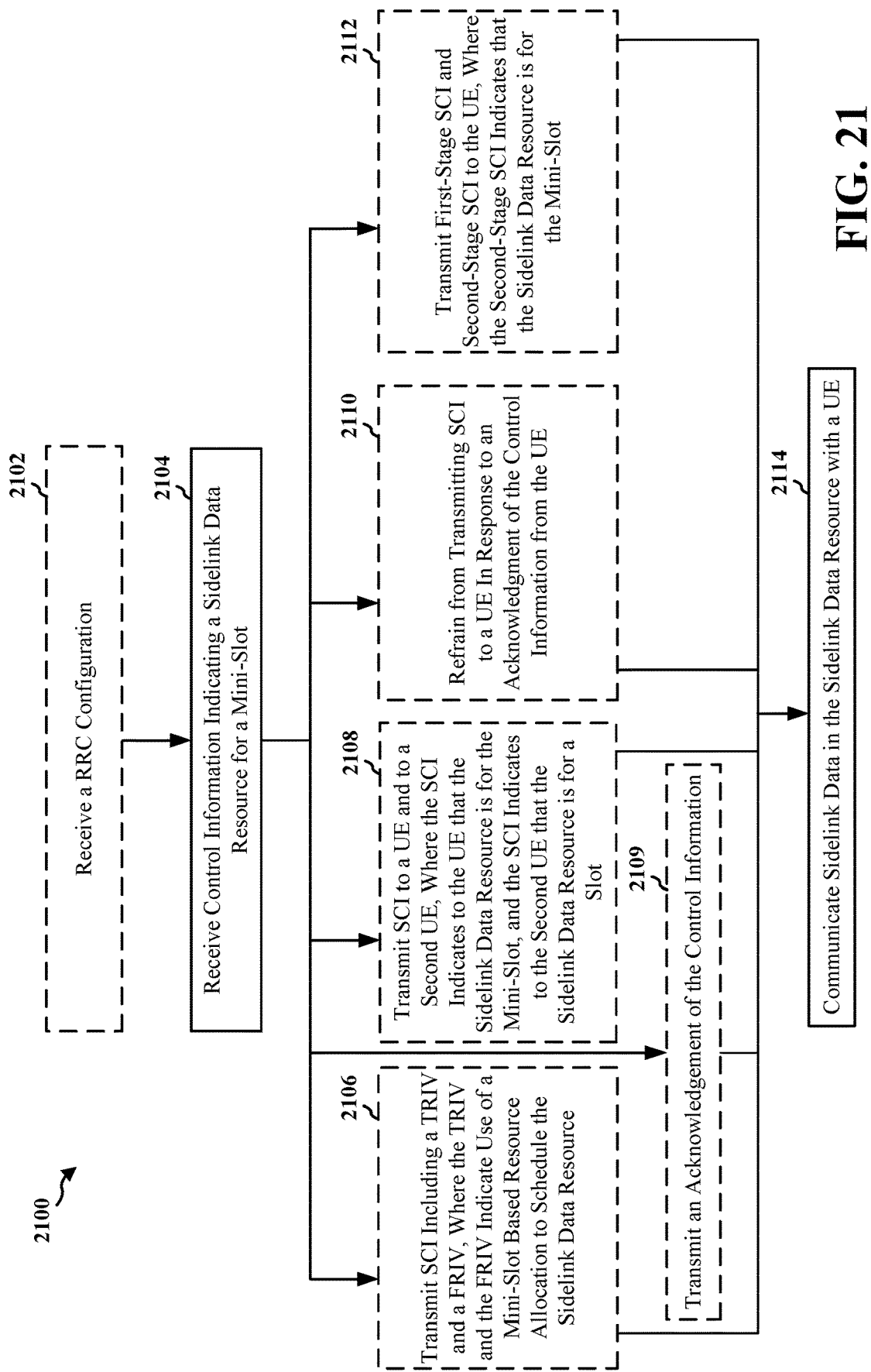
FIG. 21 is a flowchart of a method of wireless communication at a Tx UE.

FIG. 21 is a flowchart 2100 of a method of wireless communication. In one example, the method may be performed by a Tx UE (e.g., the UE 104, first wireless communication device 410, second wireless communication device 450, PLC 902, Tx UE 802, 852, 1002, 1102, 2004; the apparatus 2302). In another example, the method may be performed by a Rx UE (e.g., the UE 104, first wireless communication device 410, second wireless communication device 450, sensors or actuators 904, Rx UE 806, 856, 2006; the apparatus 2302). Optional aspects are illustrated in dashed lines. The method provides for indication of mini-slot based resource allocations in sidelink communications of a Tx UE or a Rx UE.

At 2102, the UE may receive a RRC configuration. For example, 2102 may be performed by RRC configuration component 2340. For instance, referring to FIG. 20, Tx UE 2004 may receive RRC configuration 2012 from base station 2002. In one example, the Tx UE 2004 (e.g., second wireless communication device 450) may receive the RRC configuration 2012 from base station 2002 (e.g., first wireless communication device 410) according to the following example process: the UE may obtain the RRC configuration using one or more of the antennas 452, the UE may demodulate the obtained RRC configuration (e.g., in RX processor 456), and the UE may decode the demodulated RRC configuration (e.g., in the controller/processor 459). The UE may also store the decoded RRC configuration in memory 460.

At 2104, the UE receives control information indicating a sidelink data resource for a mini-slot. For example, 2104 may be performed by control information component 2342. For instance, in one example referring to FIGS. 14-20, the Tx UE 2004 may receive DCI 1404, 1504, 1604, 1704, 1804, 2010 scheduling one or more of the sidelink data resources 1402, 1502, 1602, 1702, 1802, 1902, 1903 in mini-slot 1408, 1508, 1608, 1708, 1808, 1904. For example, during mode 1 resource allocation, base station 2002 may provide the DCI to Tx UE 2004 indicating use of mini-slot based resource allocation 2014 to schedule sidelink data resources configured in the DCI. In another example, referring to FIGS. 14-20, the Rx UE 2006 may receive SCI-1 2046, SCI-2 2048, or DCI 1404, 1504, 1604, 1704, 1804, 2054 scheduling or indicating one or more of the sidelink data resources 1402, 1502, 1602, 1702, 1802, 1902, 1903 in mini-slot 1408, 1508, 1608, 1708, 1808, 1904. For example, Tx UE 2004 may provide SCI to Rx UE 2006 indicating use of mini-slot based resource allocation 2014 to schedule sidelink data resources configured in the SCI, or base station 2002 may provide DCI to Rx UE 2006 indicating use of mini-slot based resource allocation 2014 to schedule sidelink data resources configured in the DCI. In one example, the Tx UE 2004 (e.g., second wireless communication device 450) may receive the DCI 2010 from base station 2002 (e.g., first wireless communication device 410) according to the following example process: the UE may obtain the DCI using one or more of the antennas 452, the UE may demodulate the obtained DCI (e.g., in RX processor 456), and the UE may decode the demodulated DCI (e.g., in the controller/processor 459). The Tx UE may also store the decoded DCI in memory 460. In another example, the Rx UE 2006 (e.g., second wireless communication device 450) may receive the control information from Tx UE 2004 or base station 2002 (e.g., first wireless communication device 410) according to the following example process: the UE may obtain the control information using one or more of the antennas 452, the UE may demodulate the obtained control information (e.g., in RX processor 456), and the UE may decode the demodulated control information (e.g., in the controller/processor 459). The Rx UE may also store the decoded control information in memory 460.

The control information may indicate use of a mini-slot based resource allocation to schedule the sidelink data resource, where the mini-slot based resource allocation includes more than one resource reservation in a slot. For instance, each of the resource reservations in a resource pool configured by the base station may span a duration of one mini-slot at minimum (such as illustrated in FIGS. 14-19), rather than one slot at minimum as in slot-based resource allocations (such as illustrated in FIG. 13). Thus, unlike slot-based resource allocations, here more than one resource reservation may be present in a slot. For example, in a mini-slot based resource allocation including 7-symbol mini-slots, two sidelink data resources may be within a 14 symbol slot, in contrast to only one 7-symbol, sidelink data resource in a slot-based resource allocation.

In a first example, the control information may include a resource pool index indicating a use of a mini-slot based resource allocation to schedule the sidelink data resource. For instance, referring to FIG. 20, the DCI 2010 may include resource pool index 2016 indicating use of mini-slot based resource allocation 2014 to schedule one or more of the sidelink data resources 1402, 1502, 1602, 1702, 1802, 1902, 1903. The resource pool index 2016 may be associated in an RRC configuration. For instance, the base station 2002 may provide RRC configuration including an association of multiple RP indices with one physical resource pool, including one RP index for a slot-based allocation and one or more RP indices for a mini-slot based allocation. For instance, one RP index may correspond to the resource pool including sidelink resources spanning a slot such as illustrated in FIG. 13, while another RP index may correspond to the same resource pool but with sidelink data resources spanning a number of symbols less than that of a slot such as illustrated in FIG. 14.

In one instance of the first example, the resource pool index may further indicate a starting symbol and a number of symbols for the mini-slot. For instance, referring to FIG. 20, the resource pool index 2016 in DCI 2020 may be associated in RRC configuration 2012 with start symbol 2028 and number of symbols 2030 for mini-slot 1408, 1508, 1608, 1708, 1808, 1904. In one example, the start symbol 2028 and other symbols of the sidelink data resource 1402, 1502, 1602, 1702, 1802, 1902, 1903 may include only uplink symbols according to a semi-static slot format configuration such as described above with respect to FIG. 12A, while in another example the start symbol and other symbols of the sidelink data resources may include uplink, flexible or downlink symbols according to a different semi-static slot format configuration such as described above with respect to FIG. 12B. The number of symbols (granularity of the mini-slot) may for example be 2 symbols, 4 symbols, 5 symbols, 7 symbols, or other number of symbols less than that of a slot. Additionally, if the RRC configuration 2012 includes multiple RP indices for a mini-slot based allocation, each RP index may correspond to a different granularity of the mini-slot. For instance, for the same resource pool illustrated in FIG. 13, one RP index may indicate that each of the sidelink data resources in a slot span 2 symbols, another RP index may indicate that each of the sidelink data resources in a slot span 7 symbols, and so forth. Additionally, each RP index corresponding to a mini-slot based resource allocation may indicate, not only the number of symbols for each sidelink data resource, but also the subchannels for each sidelink data resource, the starting symbol for each sidelink data resource, and the number of symbols or symbol length of each sidelink data resource.

In a second example, the control information may include a CRC that is scrambled with a scrambling sequence to indicate use of a mini-slot based resource allocation to schedule the sidelink data resource. For instance, referring to FIG. 20, the base station 2002 may apply CRC 2018 to DCI 2010, which CRC may be scrambled with scrambling sequence 2020 to indicate use of mini-slot based resource allocation 2014 for scheduling one or more of the sidelink data resources 1402, 1502, 1602, 1702, 1802, 1902, 1903. The scrambling sequence 2020 may be a different scrambling sequence than that typically applied to a DCI. For instance, generally, before appending a CRC (e.g., 24 CRC bits) to a DCI, the base station scrambles the CRC bits based on a radio network temporary identifier of the UE (e.g., a cell RNTI [C-RNTI]). After appending the scrambled CRC to the DCI, the base station scrambles the CRC-appended DCI based on a pseudo random sequence before modulating and mapping the scrambled DCI on resource elements for transmission to the Tx UE. In this example, the base station may operate in this manner when providing a DCI with a CRC indicating a slot-based resource allocation such as illustrated in FIG. 13. However, to indicate a mini-slot based resource allocation, the base station may configure and apply a different scrambling sequence other than that used for slot-based resource allocation. For instance, the base station may configure and apply a different pseudo random sequence corresponding to a mini-slot based allocation for scrambling a CRC-appended DCI. Alternatively, the base station may apply a different RNTI (other than the C-RNTI) corresponding to a mini-slot based resource allocation (or alternatively information that is not a RNTI), to scramble the CRC bits before appending the CRC to the DCI. Thus, the different scrambling sequence may be a different pseudo random sequence, a different RNTI, or other information than a RNTI. The base station may configure a single scrambling sequence for any mini-slot granularity, or the base station may configure multiple scrambling sequences respectively for different mini-slot granularities.

In a third example, the control information may include a TDRA and a FDRA, where the TDRA and FDRA indicate the sidelink data resource. In this example, the RRC configuration received at 2102 (as performed by RRC configuration component 2340) may indicate that the TDRA and the FDRA are for a mini-slot based resource allocation. For instance, referring to FIG. 20, the DCI 2010 may include TDRA 2022 and FDRA 2036 which indicate one or more of the sidelink data resources 1402, 1502, 1602, 1702, 1802, 1902, 1903. For instance, the TDRA 2022 may be associated with SLIV 2026 indicating starting symbol 2028 and number of symbols 2030 of the sidelink data resource, and the FDRA 2036 may indicate the subchannels 1410, 1510, 1610, 1710, 1810, 1906 of the sidelink data resource. Moreover, the RRC configuration 2012 may include one or more parameters indicating whether the sidelink data resources scheduled in DCI 2010 correspond to a mini-slot based resource allocation rather than a slot-based resource allocation. For instance, the RRC configuration 2012 may include one or more parameters indicating whether sidelink data resources 1402, 1502, 1602, 1702, 1802, 1902, 1903 include mini-slots 1408, 1508, 1608, 1708, 1808, 1904 rather than slots 1308. Alternatively or additionally, the RRC configuration may schedule the sidelink data resources 1402, 1502, 1602, 1702, 1802, 1902, 1903, by itself or in combination with DCI 2010. For example, the RRC configuration may include TDRA 2022, FDRA 2036, or other fields in DCI format 3_0, which fields may alone or in combination with DCI configure the Tx UE with sidelink data resources that each span a number of symbols less than that of a slot such as illustrated in FIGS. 14-19. The RRC configuration 2102 may also indicate the mini-slot granularity for each of the sidelink data resources.

In a fourth example, the control information may include a dedicated field for indicating use of a mini-slot based resource allocation to schedule the sidelink data resource. For instance, referring to FIG. 20, the DCI 2010 may include dedicated field 2042 indicating whether the DCI is for a mini-slot based resource allocation or a slot-based resource allocation. For instance, the DCI may include a field having one or more bits which values may indicate whether or not the sidelink data resources 1402, 1502, 1602, 1702, 1802, 1902, 1903 configured in the DCI each span a number of symbols less than that of a slot such as illustrated in FIGS. 14-19. Different values of this dedicated field may also respectively indicate different mini-slot granularities for the sidelink data resources.

In a fifth example, at 2106, the Tx UE may transmit SCI including a TRIV and a FRIV, where the TRIV and the FRIV indicate use of a mini-slot based resource allocation to schedule the sidelink data resource. For example, 2106 may be performed by SCI component 2344. For instance, referring to FIG. 20, the Tx UE 2004 may transmit SCI (e.g., SCI-1 2046 or SCI-2 2048) including TRIV 2024 and FRIV 2038 which indicate that one or more of the sidelink data resources 1402, 1502, 1602, 1702, 1802, 1902, 1903 include mini-slots 1408, 1508, 1608, 1708, 1808, 1904. The TRIV and FRIV may be un-specified values indicated in TDRA 2022 and FDRA 2036, that is, reserved values or values not currently indicating time domain or frequency domain locations of sidelink data resources. For instance, the base station 2002 may configure an unspecified TRIV to respectively indicate start symbol 2028 and number of symbols 2030 for the sidelink data resource in a mini-slot, and the base station may configure an unspecified FRIV to respectively indicate the subchannel(s) of the sidelink data resource in the mini-slot. The base station 2002 may similarly configure multiple unspecified TRIVs and FRIVs to correspond to different mini-slot based resource allocations, for instance, each TRIV may be configured with a different start symbol and symbol length and each FRIV may be configured with different subchannels. The base station 2002 may then indicate the mini-slot based resource allocation to the Tx UE in DCI 2010 for a sidelink data resource by indicating one of these previously unspecified TRIVs or FRIVs in the TDRA 2022 or FDRA 2036 of the DCI, respectively. Similarly, the Tx UE 2004 may indicate the same mini-slot based resource allocation to Rx UE 2006 in SCI for the initial sidelink data resource, and the Tx UE may indicate the same or a different mini-slot based resource allocation to the Rx UE 2006 in SCI for subsequent sidelink data resources. For example, the Tx UE 2004 may indicate a same or different one of these unspecified TRIVs or FRIVs in the TDRA or FDRA of the SCI (e.g., SCI-1 2046 or SCI-2 2048), respectively. In one example, the Tx UE 2004 (e.g., first wireless communication device 410) may transmit the SCI to the Rx UE 2006 (e.g., second wireless communication device 450) according to the following example process: the UE may encode the SCI (e.g., in the controller/processor 459), the UE may modulate the encoded SCI (e.g., in the TX processor 468), and the UE may send the modulated and encoded SCI using one or more of the antennas 452.

In a sixth example, the control information may include a configuration index that indicates use of a mini-slot based resource allocation to schedule the sidelink data resource. For instance, referring to FIG. 20, the DCI 2010 may include configuration index 2044 indicating that one or more of the sidelink data resources 1402, 1502, 1602, 1702, 1802, 1902, 1903 include mini-slots 1408, 1508, 1608, 1708, 1808, 1904. For example, the base station 2002 may configure one or more of the configuration indices associated with existing configured grant configurations (e.g., in RRC configuration 2012) to indicate a mini-slot based resource allocation. For example, another parameter such as a flag may be added to each existing configured grant configuration which may be configured to indicate whether the grant configuration is for a slot or a mini-slot. In another example, the base station may configure one start symbol, symbol length, and sub-channel(s) in a mini-slot to correspond to one configuration index, another start symbol, symbol length, and subchannel(s) in the mini-slot to correspond to another configuration index, and so forth. Thus, for dynamic grants where a 3-bit configuration index field may include eight different possibilities of sidelink data resource configurations, the base station may reconfigure each of these eight configuration indices to correspond to a respective mini-slot based resource allocation. Alternatively, for configured grants having a same 3-bit configuration index field, the base station may reconfigure one or more of these eight configuration indices to respectively correspond to different mini-slot based resource allocations. As a result, when the base station includes one of these indices in the configuration index field of DCI, the base station may indicate the corresponding sidelink data resources to each span a number of symbols less than that of a slot such as illustrated in FIGS. 14-19.

In a seventh example, the control information may include a TDRA, the TDRA may indicate a SLIV for a plurality of sidelink data resources including the sidelink data resource, and the TDRA may further indicate a time difference between a pair of the sidelink data resources. For instance, referring to FIG. 20, the DCI 2010 may include TDRA 2022 indicating SLIV 2026 (e.g., start symbol 2028 and number of symbols 2030) for sidelink data resources 1402, 1502, 1602, 1702, 1802, 1902, 1903, as well as time difference 2032 (e.g., a slot timing offset) between each consecutive pair of sidelink data resources. For example, each TRIV in TDRA (or resource pool index) may be associated with a common SLIV or different individual SLIVs each including a start symbol and a symbol length applied to one or more resource reservations. Moreover, if multiple resource reservations are configured, the TDRA may also indicate a slot timing offset Δt between resource reservations, for instance, a first slot timing offset t1 for one of the resource reservations, and if available, a second slot timing offset t2 for another one of the resource reservations. In other examples, the base station may configure more than three resource reservations in an RRC configuration (and thus more than three sidelink data resources in DCI), and the DCI may indicate a common or individual SLIV, a slot timing offset, and other parameters for each of these sidelink data resources.

In one instance of the seventh example, the SLIV may be the same for each of the sidelink data resources. For instance, referring to FIGS. 15 and 20, the SLIV 2026 of mini-slot 1508 may be the same for each of the sidelink data resources 1502. In one example process, referring to FIG. 20, the base station 2002 may configure TRIV 2024 in the TDRA 2022 which is associated with a single SLIV, a first slot timing offset t1, a second slot timing offset t2. As a result, each sidelink data resource 1402, 1502 at slots i, i+t1, and i+t2 may include the same start symbol and symbol length, such as illustrated in the example of FIG. 15. In one example, the SLIV 2026 may be partially indicated in the TDRA and in another field of the DCI 2010 (e.g., resource pool index 2016). For instance, the base station 2002 may associate the TDRA (TRIV) indicated in the DCI with a start symbol for the common SLIV, and the base station may associate the resource pool index indicated in the DCI with a symbol length for the common SLIV, or vice-versa. Moreover, the slot timing offsets may have a fixed or semi-statically configurable relationship. For instance, the second slot timing offset t2 may be a function of the first slot timing offset t1 (e.g., t2 may be twice the time of t1).

In another instance of the seventh example, the TDRA may further indicate a number of sidelink data repetitions, and each of the sidelink data repetitions may be in one of the sidelink data resources. Moreover, each of the sidelink data resources may be in a different slot. For instance, referring to FIGS. 16 and 20, the TDRA 2022 may indicate number of repetitions 2034 (K) for sidelink data resources 1602 in different slots (e.g., one repetition in the sidelink data resource 1602 in slot i, another repetition in the sidelink data resource 1602 in slot i+Δt, etc.). In one example process, referring to FIG. 20, the base station 2002 may configure the TDRA 2022 in DCI 2010 to indicate not only a common SLIV which is applied to all sidelink data resources 1602, but also the number of repetitions 2034 (a repetition factor K) for sidelink data 2050 in the sidelink data resources 1602. For instance, the base station may configure TRIV 2024 in the TDRA 2022 which is associated with a single SLIV, a repetition factor K corresponding to the number of resource reservations or sidelink data resources, and a slot timing offset Δt referring to a time difference in symbols (or slots) between consecutive sidelink data resources (e.g., Δt). Thus, the DCI may allocate K sidelink data resources for repetition or re-transmission with the same SLIV in different slots (Δt apart) such as illustrated in the example of FIG. 16.

Furthermore, in this other instance of the seventh example, the control information may include a FDRA, and the FDRA may indicate a frequency hop between a pair of the sidelink data resources. For instance, referring to FIGS. 16 and 20, the DCI 2010 may include FDRA 2036 which indicates frequency hop 2040 between the sidelink data resources 1602 in slots i+Δt and i+(K−1)Δt. In one example process, referring to FIG. 20, the base station 2002 may configure the FRIV 2038 in the FDRA 2036 of DCI 2010 to be associated with inter-repetition frequency hopping between sidelink data resources 1602 according to a fixed frequency hopping pattern such as illustrated in FIG. 16. The frequency hop 2040 may be configured, for example, in the later of K sidelink data resources when the value of K meets or exceeds a threshold (e.g., K>2 in the example of FIG. 16).

Additionally, in another case of this instance of the seventh example, at least two of the sidelink data resources may be in mini-slots within a slot. For instance, referring to FIG. 17, multiple sidelink data resources 1702 may be within a single slot (e.g., multiple mini-slots 1708 are illustrated in slot i). In one example process, referring to FIG. 20, the base station 2002 may configure the DCI 2010 to indicate multiple SLIVs applied respectively to different sidelink data resources 1702, as well as the number of repetitions 2034 (repetition factor K) for sidelink data 2050 in the sidelink data resources 1702. For instance, the base station may configure TRIV 2024 in the TDRA 2022 of DCI 2010 to be associated with multiple SLIVs (one SLIV for each sidelink data resource), and repetition factor K corresponding to the number of sidelink data resources. Unlike the previous example of FIG. 16 where each sidelink data resource is in a different slot, in this example, multiple ones of the sidelink data resources may be within a same slot. Thus, in one example, the base station may not configure a slot timing offset Δt between consecutive sidelink data resources in the DCI, since the sidelink data resources may all be different mini-slots within a same single slot (e.g., Δt=0). In such example, the DCI may allocate K sidelink data resources with different SLIVs for intra-slot repetition in the same slot.

Furthermore, in this case of this instance of the seventh example, one of the sidelink data resources may be in a different slot from the slot. For instance, referring to FIG. 17, one of the sidelink data resources 1702 may be in a different slot (e.g., slot i+t1) than that of the other sidelink data resources 1702 (e.g., slot i). In one example process, referring to FIG. 20, the base station 2002 may configure the DCI 2010 not only to indicate the sidelink data resources 1702 for intra-slot repetition in a same slot such as previously described, but to also indicate one or more additional sidelink data resources configured in a different slot(s) for inter-slot repetition or inter-slot re-transmission. For example, the TRIV 2024 configured in the TDRA 2022 may further be associated with slot timing offset t1 or Δt for inter-slot repetitions or re-transmissions, as in the example of FIG. 17. Moreover, one or more of the SLIVs associated with the TRIV 2024 for the intra-slot repetitions may apply to the inter-slot transmissions, or alternatively additional SLIV(s) for the inter-slot transmissions may be associated with the TRIV 2024. Thus, the DCI may allocate sidelink data resources for intra-slot repetition with different SLIV in the same slot, as well as one or more sidelink data resource(s) for inter-slot repetition or re-transmission with a same or different SLIV in a different slot.

In another instance of the seventh example, the SLIV may be different for each of the sidelink data resources. For instance, referring to FIGS. 18 and 20, the SLIV 2026 of each sidelink data resource 1802 may be different (e.g., one symbol length for mini-slot 1808 in slot i, another symbol length for mini-slot 1808 in slot i+t1, etc.). In one example process, referring to FIG. 20, the base station 2002 may configure the DCI 2010 to indicate multiple SLIVs applied respectively to different sidelink data resources 1802, as well as multiple slot timing offsets for the different sidelink data resources. For instance, the base station may configure the TRIV 2024 in the TDRA 2022 to be associated with multiple SLIVs (one SLIV for each sidelink data resource), a first slot timing offset t1 for one sidelink data resource, and a second slot timing offset t2 for another sidelink data resource. As a result, each sidelink data resource at slots i, i+t1, and i+t2 of FIG. 18 may include different start symbols or symbol lengths. Additionally, the SLIVs may include different start symbols or symbol lengths in different sidelink data resources. For instance, the SLIV for slot i may include one start symbol or symbol length, the SLIV for slot i+t1 may include another start symbol or another symbol length, and so forth. Alternatively, in other examples, the SLIVs may be configured such that a SLIV for a respective sidelink data resource specifically increases in symbol length over time. For instance, the SLIV for slot i may include one symbol length, the SLIV for slot i+t1 may include twice the symbol length of the SLIV in slot i, and so forth. Similarly, the SLIV for slot i+t1 may include an earlier start symbol than the SLIV for slot i). The increase in symbol length over time (or earlier start symbol over time) may allow later repetitions or re-transmissions to have lower block error rates (BLERs) than earlier repetitions or re-transmissions. Moreover, the sidelink data resources may not all be limited to mini-slots.

In an eighth example where the UE (e.g., apparatus 2302) is a Tx UE, at 2108, the Tx UE may transmit SCI to a UE and to a second UE, where the SCI may indicate to the UE that the sidelink data resource is for the mini-slot, and where the SCI may indicate to the second UE that the sidelink data resource is for a slot. For example, 2108 may be performed by SCI component 2344. For instance, referring to FIGS. 13, 19 and 20, the Tx UE 2004 may transmit SCI-1 2046 to Rx UE 2006 and to other UE 2052, where the SCI-1 to Rx UE 2006 indicates sidelink data resources 1903 including mini-slots 1904 in mini-slot based resource allocation 2014, while the SCI-1 to other UE 2052 indicates sidelink data resource 1302 including slots 1308 in a slot-based resource allocation. In one example process, referring to FIG. 20, the Tx UE 2004 may configure the RP index 2016 or TDRA 2022 in the SCI to exclusively apply for Rx UEs 2006 capable of applying mini-slot based resource allocation 2014. Similarly, in mode 1 resource allocation, the base station 2002 may configure the RP index 2016 or TDRA 2022 in the DCI 2010, which the Tx UE 2004 may copy into the SCI, to exclusively apply for Rx UEs 2006 capable of applying mini-slot based resource allocations. This configuration may prevent other UEs 2052 which are incapable of applying mini-slot based resource allocations from incorrectly interpreting the RP index or TDRA in SCI as indicating a slot-based resource allocation. For instance, different bands (bandwidths or bandwidth parts) may have different RP indices and TRIVs for TDRA. As a result, in one band, an RP index may correspond to a resource pool configured for slot-based resource allocations such as illustrated in FIG. 13, while in another band, another RP index may correspond to a different resource pool in another band configured for mini-slot based resource allocations such as illustrated in FIGS. 14-19. Similarly, in one band, a TRIV may be associated with a SLIV indicating a slot-based resource allocation such as illustrated in FIG. 13, while in another band, the same TRIV may be associated with a different SLIV indicating a mini-slot based resource allocation such as illustrated in FIGS. 14-19. Therefore, during mode 1 resource allocation, the base station may configure in DCI 2010, depending on the band, different RP indices or TRIVs for different Tx UEs such that Tx UEs which are incapable of applying mini-slot based resource allocations will only be configured with slot-based resource allocations. The Tx UE may then copy the band-based RP index or TDRA into the SCI to ensure the same result for Rx UEs. Similarly, during mode 2 resource allocation, the Tx UE may configure in SCI different RP indices or TRIVs for different Rx UEs depending on the band.

In a variation of the eighth example where the UE (e.g., apparatus 2302) is a Rx UE and the sidelink data is communicated from a Tx UE to the Rx UE, the control information may be first-stage SCI. For instance, referring to FIG. 20, the control information received at 2104 may be SCI-1 2046. In one example process, referring to FIGS. 13, 19 and 20, the Rx UE 2006 may receive SCI-1 2046 from Tx UE 2004, where the SCI-1 indicates sidelink data resources 1903 including mini-slots 1904 in mini-slot based resource allocation 2014. The Tx UE 2004 may configure the RP index 2016 or TDRA 2022 in the SCI to exclusively apply for Rx UE 2006 when Rx UE is capable of applying mini-slot based resource allocation 2014. For instance, different bands (bandwidths or bandwidth parts) may have different RP indices and TRIVs for TDRA (e.g., one corresponding to a mini-slot based resource allocation and another corresponding to a slot-based resource allocation), and the Tx UE may configure in SCI-1 the RP index 2016 or TRIV 2024 in mini-slot based resource allocation 2014 for Rx UE 2006 depending on the band.

In a ninth example where the UE (e.g., apparatus 2302) is a Rx UE and the sidelink data is communicated from a Tx UE to the Rx UE, at 2109, the Rx UE may transmit an acknowledgment of the control information. For example, 2109 may be performed by acknowledgment component 2348. In this example, the control information may be DCI. For instance, referring to FIG. 20, the control information received at 2104 may be DCI 2054 (or DCI 2010), and in response to receiving the DCI, the Rx UE 2006 may transmit ACK 2056 to the base station 2002 or Tx UE 2004. In one example process, referring to FIG. 20, during mode 1 resource allocation in some cases, the Tx UE 2004 and Rx UE 2006 may both be in coverage of the base station 2002. Therefore, the Tx UE and Rx UE may both receive DCI from the base station indicating mini-slot based resource allocation 2014 for sidelink data 2050. For instance, if the base station broadcasts or multicasts the DCI 2010 indicating the mini-slot based resource allocation to the Tx UE, the Rx UE may receive the same DCI. Alternatively, the base station may provide a separate DCI (e.g., DCI 2054) to the Rx UE 2006 indicating the RP index, TDRA associated with common or individual SLIVs, repetition factors, and slot offsets, FDRA, lowest subchannel index, configuration index, dedicated fields, or other parameters as previously described with respect to FIGS. 14-18. In response to receiving the DCI, the Rx UE may provide ACK 2056 to the base station 2002 or the Tx UE 2004. In one example, the Rx UE 2006 (e.g., first wireless communication device 410) may transmit the ACK to the Tx UE 2004 or base station 2002 (e.g., second wireless communication device 450) according to the following example process: the UE may encode the ACK (e.g., in the controller/processor 459), the UE may modulate the encoded ACK (e.g., in the TX processor 468), and the UE may send the modulated and encoded ACK using one or more of the antennas 452. In response to receiving ACK 2056 from the Rx UE (or base station 2002), the Tx UE 2004 may refrain from providing the Rx UE 2006 a duplicate indication of the mini-slot based resource allocation in SCI.

In a variation of the ninth example where the UE (e.g., apparatus 2302) is a Tx UE, at 2110, the Tx UE may refrain from transmitting SCI to a UE in response to an acknowledgment of the control information from the UE. For example, 2110 may be performed by SCI component 2344. For instance, referring to FIG. 20, at 2058, the Tx UE 2004 may refrain from transmitting SCI-1 2046 to Rx UE 2006 in response to receiving ACK 2056 directly from Rx UE 2006 (or indirectly from Rx UE 2006 via base station 2002). In one example, referring to FIG. 20, during mode 1 resource allocation in some cases, the Tx UE 2004 and Rx UE 2006 may both be in coverage of the base station 2002. Therefore, the Tx UE and Rx UE may both receive DCI from the base station indicating mini-slot based resource allocation 2014 for sidelink data 2050. For instance, if the base station broadcasts or multicasts the DCI 2010 indicating the mini-slot based resource allocation to the Tx UE, the Rx UE may receive the same DCI. Alternatively, the base station may provide a separate DCI (e.g., DCI 2054) to the Rx UE 2006 indicating the RP index, TDRA associated with common or individual SLIVs, repetition factors, and slot offsets, FDRA, lowest subchannel index, configuration index, dedicated fields, or other parameters as previously described with respect to FIGS. 14-18. As a result, the Tx UE 2004 may refrain from providing the Rx UE 2006 a duplicate indication of the mini-slot based resource allocation. For instance, at 2058, the Tx UE may omit sending the SCI including the aforementioned parameters to the Rx UE. The Tx UE may determine whether the Rx UE has received this DCI, and thus refrain from providing the SCI, in response to HARQ feedback (e.g., ACK 2056) from the Rx UE or base station.

In a tenth example where the UE (e.g., apparatus 2302) is a Tx UE, at 2112, the Tx UE may transmit first-stage SCI and second-stage SCI to a UE, where the second-stage SCI indicates that the sidelink data resource is for the mini-slot. For example, 2112 may be performed by SCI component 2344. For instance, referring to FIGS. 19 and 20, the Tx UE 2004 may transmit SCI-1 2046 and SCI-2 2048 to Rx UE 2006, where the SCI-2 indicates the mini-slot based resource allocation 2014 of sidelink data resource 1902 for mini-slot 1904. In one example process, referring to FIG. 20, the Tx UE 2004 may inform the Rx UE 2006 of the mini-slot based resource allocation 2014 in SCI-2 2048, rather than SCI-1 2046, depending on the initially configured sidelink data resource. For instance, during mode 2 resource allocation, the Tx UE 2004 may autonomously determine to reserve the sidelink data resource 1902 in the initial symbols of a slot, for example, in response to channel sensing. Similarly, during mode 1 resource allocation, the base station 2002 may configure the sidelink data resource 1902 in the initial symbols of a slot, for example, in DCI 2010. In either case, if in one example the sidelink data resource 1902 is configured in initial symbols of a slot typically associated with PSCCH, such as illustrated in the example of FIG. 19, both the Rx UE 2006 capable of applying mini-slot based resource allocations and the other UE 2052 incapable of applying mini-slot based resource allocations may attempt to decode SCI-1 2046 in these initial symbols of the slot. As a result, the Tx UE 2004 may configure SCI-1 2046 in these initial symbols to have parameters indicating a slot-based resource allocation such as described above with respect to FIG. 13, while configuring SCI-2 2048 to indicate the mini-slot based resource allocation 2014. For instance, the Tx UE 2004 may include in SCI-1 a TDRA including a SLIV indicating a slot for each sidelink data resource, while including in SCI-2 the TDRA 2022 associated with common or individual SLIVs or other parameters for a mini-slot in each sidelink data resource 1902 as previously described with respect to FIGS. 14-18. Thus, when other UE 2052 incapable of applying mini-slot based resource allocations receives and decodes SCI-1 and SCI-2, that UE may correctly interpret the slots including configured sidelink data resources, while disregarding the mini-slots including the configured sidelink data resources (e.g., in response to determining that this UE is not the destination UE in SCI-2). In contrast, when Rx UE 2006 capable of applying mini-slot based resource allocations receives and decodes SCI-1 and SCI-2, that UE may correctly interpret the mini-slot based resource allocation.

In a variation of the tenth example where the UE (e.g., apparatus 2302) is a Rx UE and the sidelink data is communicated from a Tx UE to the Rx UE, the control information may be second-stage SCI. For instance, referring to FIG. 20, the control information received at 2104 may be SCI-2 2048. In one example process, referring to FIGS. 19 and 20, the Rx UE 2006 may receive SCI-1 2046 and SCI-2 2048 from Tx UE 2004, where the SCI-2 indicates the mini-slot based resource allocation 2014 of sidelink data resource 1902 for mini-slot 1904. In one example process, referring to FIG. 20, the Tx UE 2004 may inform the Rx UE 2006 of the mini-slot based resource allocation 2014 in SCI-2 2048, rather than SCI-1 2046, depending on the initially configured sidelink data resource. For instance, during mode 2 resource allocation, the Tx UE 2004 may autonomously determine to reserve the sidelink data resource 1902 in the initial symbols of a slot, for example, in response to channel sensing. Similarly, during mode 1 resource allocation, the base station 2002 may configure the sidelink data resource 1902 in the initial symbols of a slot, for example, in DCI 2010. In either case, if in one example the sidelink data resource 1902 is configured in initial symbols of a slot typically associated with PSCCH, such as illustrated in the example of FIG. 19, the Tx UE 2004 may configure SCI-1 2046 in these initial symbols to have parameters indicating a slot-based resource allocation such as described above with respect to FIG. 13, while configuring SCI-2 2048 to indicate the mini-slot based resource allocation 2014. For instance, the Tx UE 2004 may include in SCI-1 a TDRA including a SLIV indicating a slot for each sidelink data resource, while including in SCI-2 the TDRA 2022 associated with common or individual SLIVs or other parameters for a mini-slot in each sidelink data resource 1902 as previously described with respect to FIGS. 14-18. When Rx UE 2006 capable of applying mini-slot based resource allocations receives and decodes SCI-1 and SCI-2, that UE may correctly interpret the mini-slot based resource allocation accordingly.

Finally, at 2114, the UE may communicate (e.g., transmit or receive) sidelink data in the sidelink data resource with a UE. For example, 2114 may be performed by sidelink data component 2346. In one example, the UE (e.g., apparatus 2302) may be a Tx UE which transmits sidelink data in the sidelink data resource to a UE. For instance, referring to FIG. 20, the Tx UE 2004 may transmit sidelink data 2050 to Rx UE 2006 in sidelink data resources 1402, 1502, 1602, 1702, 1802, 1902, 1903. In one example, the Tx UE 2004 (e.g., first wireless communication device 410) may transmit the sidelink data to the Rx UE 2006 (e.g., second wireless communication device 450) according to the following example process: the UE may encode the sidelink data (e.g., in the controller/processor 459), the UE may modulate the encoded sidelink data (e.g., in the TX processor 468), and the UE may send the modulated and encoded sidelink data using one or more of the antennas 452. In another example, the UE (e.g., apparatus 2302) may be a Rx UE which receives sidelink data in the sidelink data resource from a UE. For instance, referring to FIG. 20, the Rx UE 2006 may receive sidelink data 2050 from Tx UE 2004 in sidelink data resources 1402, 1502, 1602, 1702, 1802, 1902, 1903. In one example, the Rx UE 2006 (e.g., second wireless communication device 450) may receive the sidelink data from Tx UE 2004 or base station 2002 (e.g., first wireless communication device 410) according to the following example process: the UE may obtain the sidelink data using one or more of the antennas 452, the UE may demodulate the obtained sidelink data (e.g., in RX processor 456), and the UE may decode the demodulated sidelink data (e.g., in the controller/processor 459). The Rx UE may also store the decoded sidelink data in memory 460.

Figure 22:
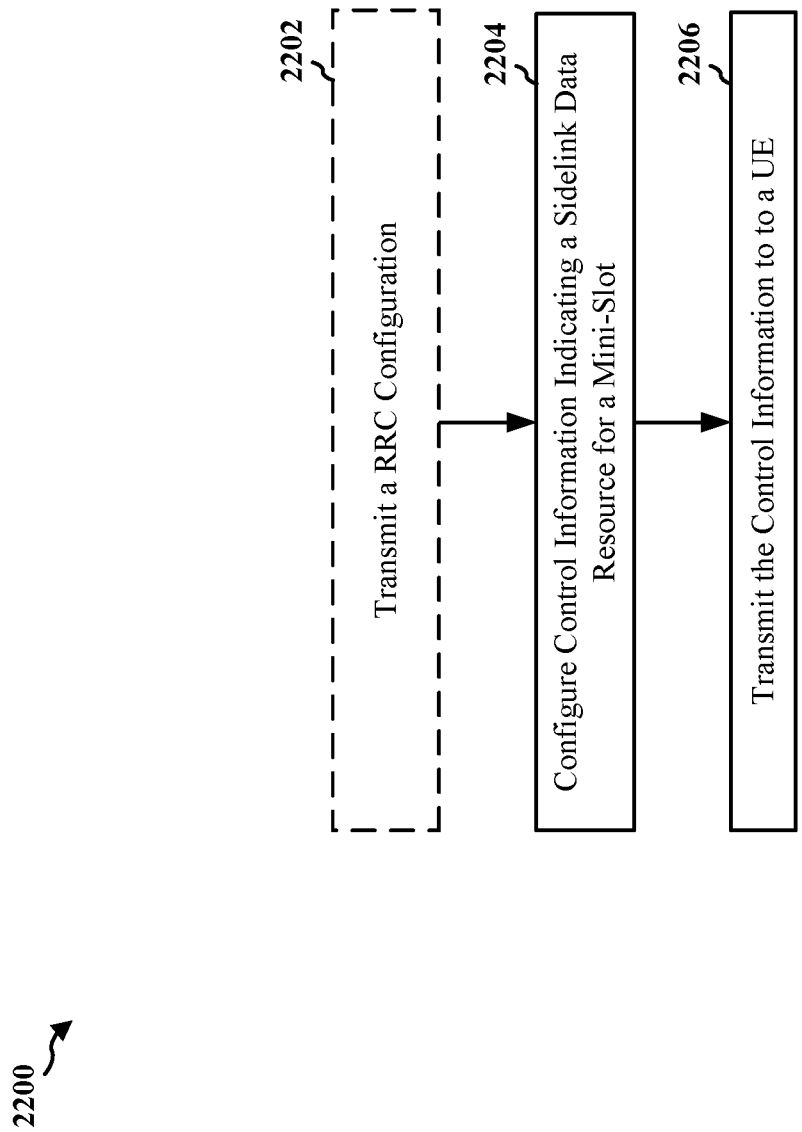
FIG. 22 is a flowchart of a method of wireless communication at a base station.

FIG. 22 is a flowchart 2200 of a method of wireless communication. The method may be performed by a base station (e.g., the base station 102/180, 808, 906, 2002, first wireless communication device 410; the apparatus 2402). Optional aspects are illustrated in dashed lines. The method provides for configuration of mini-slot based resource allocations in sidelink communications between a Tx UE and a Rx UE.

At 2202, the base station may transmit a RRC configuration. For example, 2202 may be performed by RRC configuration component 2440. For instance, referring to FIG. 20, base station 2002 may transmit RRC configuration 2012 to Tx UE 2004. In one example, the base station 2002 (e.g., first wireless communication device 410) may transmit the RRC configuration to the Tx UE 2004 (e.g., second wireless communication device 450) according to the following example process: the base station may encode the RRC configuration (e.g., in the controller/processor 459), the base station may modulate the encoded RRC configuration (e.g., in the TX processor 468), and the base station may send the modulated and encoded RRC configuration using one or more of the antennas 452.

At 2204, the base station configures control information indicating a sidelink data resource for a mini-slot. For example, 2204 may be performed by control information configuration component 2442. For instance, referring to FIG. 20, at block 2008, the base station 2002 may configure control information indicating a sidelink data resource for a mini-slot. For instance, in mode 1 resource allocation, the base station may configure and transmit DCI 2010 or RRC configuration 2012 which indicate (individually or in combination) mini-slot based resource allocation 2014 in sidelink data resources 1402, 1502, 1602, 1702, 1802, 1902, 1903 including mini-slots 1408, 1508, 1608, 1708, 1808, 1904. The mini-slot based resource allocation 2014 may be indicated through one or more parameters of the DCI 2010, the RRC configuration 2012, or a combination of the DCI and RRC configuration. For instance, the base station may indicate use of a mini-slot for sidelink communications through one or more of the following parameters of DCI 2010 or RRC configuration 2012: resource pool index 2016, CRC 2018 with different scrambling sequence 2020 for DCI 2010, TDRA 2022 including TRIV 2024 which indicates SLIV 2026 (including starting symbol 2028 and number of symbols 2030), time difference 2032 between sidelink data resources, number of repetitions 2034, FDRA 2036 including FRIV 2038 which indicates subchannels and a frequency hop 2040 in subchannels between sidelink data resources, dedicated field 2042, and configuration index 2044.

In a first example, the control information may include a resource pool index indicating a use of a mini-slot based resource allocation to schedule the sidelink data resource. For instance, referring to FIG. 20, the DCI 2010 may include resource pool index 2016 indicating use of mini-slot based resource allocation 2014 to schedule one or more of the sidelink data resources 1402, 1502, 1602, 1702, 1802, 1902, 1903. The resource pool index 2016 may be associated in an RRC configuration. For instance, the base station 2002 may provide RRC configuration including an association of multiple RP indices with one physical resource pool, including one RP index for a slot-based allocation and one or more RP indices for a mini-slot based allocation. For instance, one RP index may correspond to the resource pool including sidelink resources spanning a slot such as illustrated in FIG. 13, while another RP index may correspond to the same resource pool but with sidelink data resources spanning a number of symbols less than that of a slot such as illustrated in FIG. 14.

In a second example, the control information may include a CRC that is scrambled with a scrambling sequence to indicate use of a mini-slot based resource allocation to schedule the sidelink data resource. For instance, referring to FIG. 20, the base station 2002 may apply CRC 2018 to DCI 2010, which CRC may be scrambled with scrambling sequence 2020 to indicate use of mini-slot based resource allocation 2014 for scheduling one or more of the sidelink data resources 1402, 1502, 1602, 1702, 1802, 1902, 1903. The scrambling sequence 2020 may be a different scrambling sequence than that typically applied to a DCI. For instance, generally, before appending a CRC (e.g., 24 CRC bits) to a DCI, the base station scrambles the CRC bits based on a radio network temporary identifier of the UE (e.g., a cell RNTI [C-RNTI]). After appending the scrambled CRC to the DCI, the base station scrambles the CRC-appended DCI based on a pseudo random sequence before modulating and mapping the scrambled DCI on resource elements for transmission to the Tx UE. In this example, the base station may operate in this manner when providing a DCI with a CRC indicating a slot-based resource allocation such as illustrated in FIG. 13. However, to indicate a mini-slot based resource allocation, the base station may configure and apply a different scrambling sequence other than that used for slot-based resource allocation. For instance, the base station may configure and apply a different pseudo random sequence corresponding to a mini-slot based allocation for scrambling a CRC-appended DCI. Alternatively, the base station may apply a different RNTI (other than the C-RNTI) corresponding to a mini-slot based resource allocation (or alternatively information that is not a RNTI), to scramble the CRC bits before appending the CRC to the DCI. Thus, the different scrambling sequence may be a different pseudo random sequence, a different RNTI, or other information than a RNTI. The base station may configure a single scrambling sequence for any mini-slot granularity, or the base station may configure multiple scrambling sequences respectively for different mini-slot granularities.

In a third example, the control information may include a TDRA and a FDRA, where the TDRA and FDRA indicate the sidelink data resource. In this example, the RRC configuration transmitted at 2202 (as performed by RRC configuration component 2440) may indicate that the TDRA and the FDRA are for a mini-slot based resource allocation. For instance, referring to FIG. 20, the DCI 2010 may include TDRA 2022 and FDRA 2036 which indicate one or more of the sidelink data resources 1402, 1502, 1602, 1702, 1802, 1902, 1903. For instance, the TDRA 2022 may be associated with SLIV 2026 indicating starting symbol 2028 and number of symbols 2030 of the sidelink data resource, and the FDRA 2036 may indicate the subchannels 1410, 1510, 1610, 1710, 1810, 1906 of the sidelink data resource. Moreover, the RRC configuration 2012 may include one or more parameters indicating whether the sidelink data resources scheduled in DCI 2010 correspond to a mini-slot based resource allocation rather than a slot-based resource allocation. For instance, the RRC configuration 2012 may include one or more parameters indicating whether sidelink data resources 1402, 1502, 1602, 1702, 1802, 1902, 1903 include mini-slots 1408, 1508, 1608, 1708, 1808, 1904 rather than slots 1308. Alternatively or additionally, the RRC configuration may schedule the sidelink data resources 1402, 1502, 1602, 1702, 1802, 1902, 1903, by itself or in combination with DCI 2010. For example, the RRC configuration may include TDRA 2022, FDRA 2036, or other fields in DCI format 3_0, which fields may alone or in combination with DCI configure the Tx UE with sidelink data resources that each span a number of symbols less than that of a slot such as illustrated in FIGS. 14-19. The RRC configuration 2102 may also indicate the mini-slot granularity for each of the sidelink data resources.

In a fourth example, the control information may include a dedicated field for indicating use of a mini-slot based resource allocation to schedule the sidelink data resource. For instance, referring to FIG. 20, the DCI 2010 may include dedicated field 2042 indicating whether the DCI is for a mini-slot based resource allocation or a slot-based resource allocation. For instance, the DCI may include a field having one or more bits which values may indicate whether or not the sidelink data resources 1402, 1502, 1602, 1702, 1802, 1902, 1903 configured in the DCI each span a number of symbols less than that of a slot such as illustrated in FIGS. 14-19. Different values of this dedicated field may also respectively indicate different mini-slot granularities for the sidelink data resources.

In a fifth example, the control information may include a configuration index that indicates use of a mini-slot based resource allocation to schedule the sidelink data resource. For instance, referring to FIG. 20, the DCI 2010 may include configuration index 2044 indicating that one or more of the sidelink data resources 1402, 1502, 1602, 1702, 1802, 1902, 1903 include mini-slots 1408, 1508, 1608, 1708, 1808,

1904. For example, the base station 2002 may configure one or more of the configuration indices associated with existing configured grant configurations (e.g., in RRC configuration 2012) to indicate a mini-slot based resource allocation. For example, another parameter such as a flag may be added to each existing configured grant configuration which may be configured to indicate whether the grant configuration is for a slot or a mini-slot. In another example, the base station may configure one start symbol, symbol length, and subchannel(s) in a mini-slot to correspond to one configuration index, another start symbol, symbol length, and subchannel(s) in the mini-slot to correspond to another configuration index, and so forth. Thus, for dynamic grants where a 3-bit configuration index field may include eight different possibilities of sidelink data resource configurations, the base station may reconfigure each of these eight configuration indices to correspond to a respective mini-slot based resource allocation. Alternatively, for configured grants having a same 3-bit configuration index field, the base station may reconfigure one or more of these eight configuration indices to respectively correspond to different mini-slot based resource allocations. As a result, when the base station includes one of these indices in the configuration index field of DCI, the base station may indicate the corresponding sidelink data resources to each span a number of symbols less than that of a slot such as illustrated in FIGS. 14-19.

Finally, at 2206, the base station may transmit the control information to a UE. For example, 2206 may be performed by control information transmission component 2444. For instance, referring to FIGS. 14-20, the base station 2002 may transmit, to Tx UE 2004, DCI 1404, 1504, 1604, 1704, 1804, 2010 scheduling one or more of the sidelink data resources 1402, 1502, 1602, 1702, 1802, 1902, 1903 in mini-slot 1408, 1508, 1608, 1708, 1808, 1904. For example, during mode 1 resource allocation, base station 2002 may provide the DCI to Tx UE 2004 indicating use of mini-slot based resource allocation 2014 to schedule sidelink data resources configured in the DCI. For instance, each of the resource reservations in a resource pool configured by the base station may span a duration of one mini-slot at minimum (such as illustrated in FIGS. 14-19), rather than one slot at minimum as in slot-based resource allocations (such as illustrated in FIG. 13). In one example, the base station 2002 (e.g., first wireless communication device 410) may transmit the DCI to the Tx UE 2004 (e.g., second wireless communication device 450) according to the following example process: the base station may encode the DCI (e.g., in the controller/processor 459), the base station may modulate the encoded DCI (e.g., in the TX processor 468), and the base station may send the modulated and encoded DCI using one or more of the antennas 452.

Figure 23:
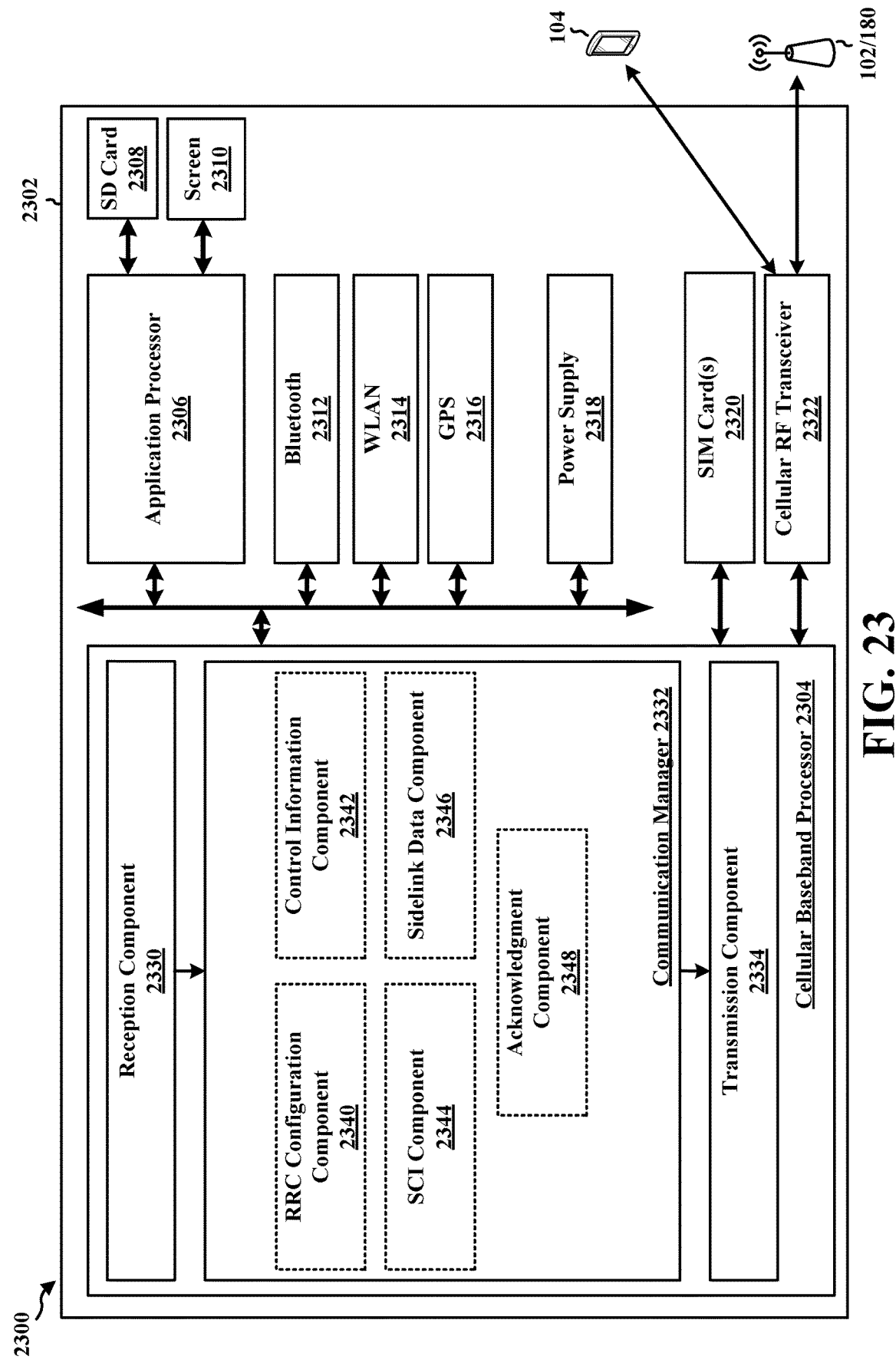
FIG. 23 is a diagram illustrating an example of a hardware implementation for an example apparatus.

FIG. 23 is a diagram 2300 illustrating an example of a hardware implementation for an apparatus 2302. The apparatus 2302 is a UE (e.g., a Tx UE or a Rx UE) and includes a cellular baseband processor 2304 (also referred to as a modem) coupled to a cellular RF transceiver 2322 and one or more subscriber identity modules (SIM) cards 2320, an application processor 2306 coupled to a secure digital (SD) card 2308 and a screen 2310, a Bluetooth module 2312, a wireless local area network (WLAN) module 2314, a Global Positioning System (GPS) module 2316, and a power supply 2318. The cellular baseband processor 2304 communicates through the cellular RF transceiver 2322 with the UE 104 and/or BS 102/180. The cellular baseband processor 2304 may include a computer-readable medium/memory. The computer-readable medium/memory may be non-transitory. The cellular baseband processor 2304 is responsible for general processing, including the execution of software stored on the computer-readable medium/memory. The software, when executed by the cellular baseband processor 2304, causes the cellular baseband processor 2304 to perform the various functions described supra. The computer-readable medium/memory may also be used for storing data that is manipulated by the cellular baseband processor 2304 when executing software. The cellular baseband processor 2304 further includes a reception component 2330, a communication manager 2332, and a transmission component 2334. The communication manager 2332 includes the one or more illustrated components. The components within the communication manager 2332 may be stored in the computer-readable medium/memory and/or configured as hardware within the cellular baseband processor 2304. The cellular baseband processor 2304 may be a component of the device 410, 450 and may include the memory 460, 476 and/or at least one of the TX processor 416, 468, the RX processor 456, 470, and the controller/processor 459, 475. In one configuration, the apparatus 2302 may be a modem chip and include just the baseband processor 2304, and in another configuration, the apparatus 2302 may be the entire device (e.g., see 410, 450 of FIG. 4) and include the aforediscussed additional modules of the apparatus 2302.

The communication manager 2332 includes an RRC configuration component 2340 that is configured to receive a RRC configuration, e.g., as described in connection with 2102. The communication manager 2332 further includes a control information component 2342 that is configured to receive control information indicating a sidelink data resource for a mini-slot, e.g., as described in connection with 2104. The communication manager 2332 further includes a SCI component 2344 that may receive input in the form of the sidelink data resource from the control information component 2342 and is configured to transmit SCI including a TRIV and a FRIV, where the TRIV and the FRIV indicate use of a mini-slot based resource allocation to schedule the sidelink data resource, e.g., as described in connection with 2106. The SCI component 2344 is also configured to transmit SCI to the UE and to a second UE, where the SCI indicates to the UE that the sidelink data resource is for the mini-slot, and the SCI indicates to the second UE that the sidelink data resource is for a slot, e.g., as described in connection with 2108. The SCI component 2344 is also configured to refrain from transmitting SCI to the UE in response to an acknowledgement of the control information from the UE, e.g., as described in connection with 2110. The SCI component 2344 is also configured to transmit first-stage SCI and second-stage SCI to the UE, where the second-stage SCI indicates that the sidelink data resource is for the mini-slot, e.g., as described in connection with 2112. The communication manager 2332 further includes a sidelink data component 2346 that may receive input in the form of the sidelink data resource from the control information component 2342 and is configured to communicate sidelink data in the sidelink data resource with a second UE, e.g., as described in connection with 2114. The communication manager 2332 further includes an acknowledgment component 2348 that may receive input in the form of the control information from the control information component 2342 and is configured to transmit an acknowledgment of the control information, e.g., as described in connection with 2109.

The apparatus may include additional components that perform each of the blocks of the algorithm in the aforementioned flowcharts of FIGS. 20 and 21. As such, each block in the aforementioned flowcharts of FIGS. 20 and 21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2302, and in particular the cellular baseband processor 2304, includes means for receiving control information indicating a sidelink data resource for a mini-slot; and means for communicating sidelink data in the sidelink data resource with a UE. In one configuration, the control information may include a TDRA and a FDRA, the TDRA and the FDRA indicating the sidelink data resource, and the means for receiving is further configured to receive a RRC configuring indicating that the TDRA and the FDRA are for a mini-slot based resource allocation. In one configuration, the means for transmitting is further configured to transmit SCI including a TRIV and a FRIV, where the TRIV and the FRIV indicate use of a mini-slot based resource allocation to schedule the sidelink data resource. In one configuration, the means for transmitting is further configured to transmit SCI to the UE and to a second UE, where the SCI indicates to the UE that the sidelink data resource is for the mini-slot, and the SCI indicates to the second UE that the sidelink data resource is for a slot. In one configuration, the apparatus 2302, and in particular the cellular baseband processor 2304, includes means for refraining from transmitting SCI to the UE in response to an acknowledgement of the control information from the UE. In one configuration, the means for transmitting is further configured to transmit first-stage SCI and second-stage SCI to the UE, where the second-stage SCI indicates that the sidelink data resource is for the mini-slot.

The aforementioned means may be one or more of the aforementioned components of the apparatus 2302 configured to perform the functions recited by the aforementioned means. As described supra, the apparatus 2302 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means. Alternatively, as also described supra, the apparatus 2302 may include the TX Processor 416, the RX Processor 470, and the controller/processor 475. As such, in one configuration, the aforementioned means may be the TX Processor 416, the RX Processor 470, and the controller/processor 475 configured to perform the functions recited by the aforementioned means.

Figure 24:
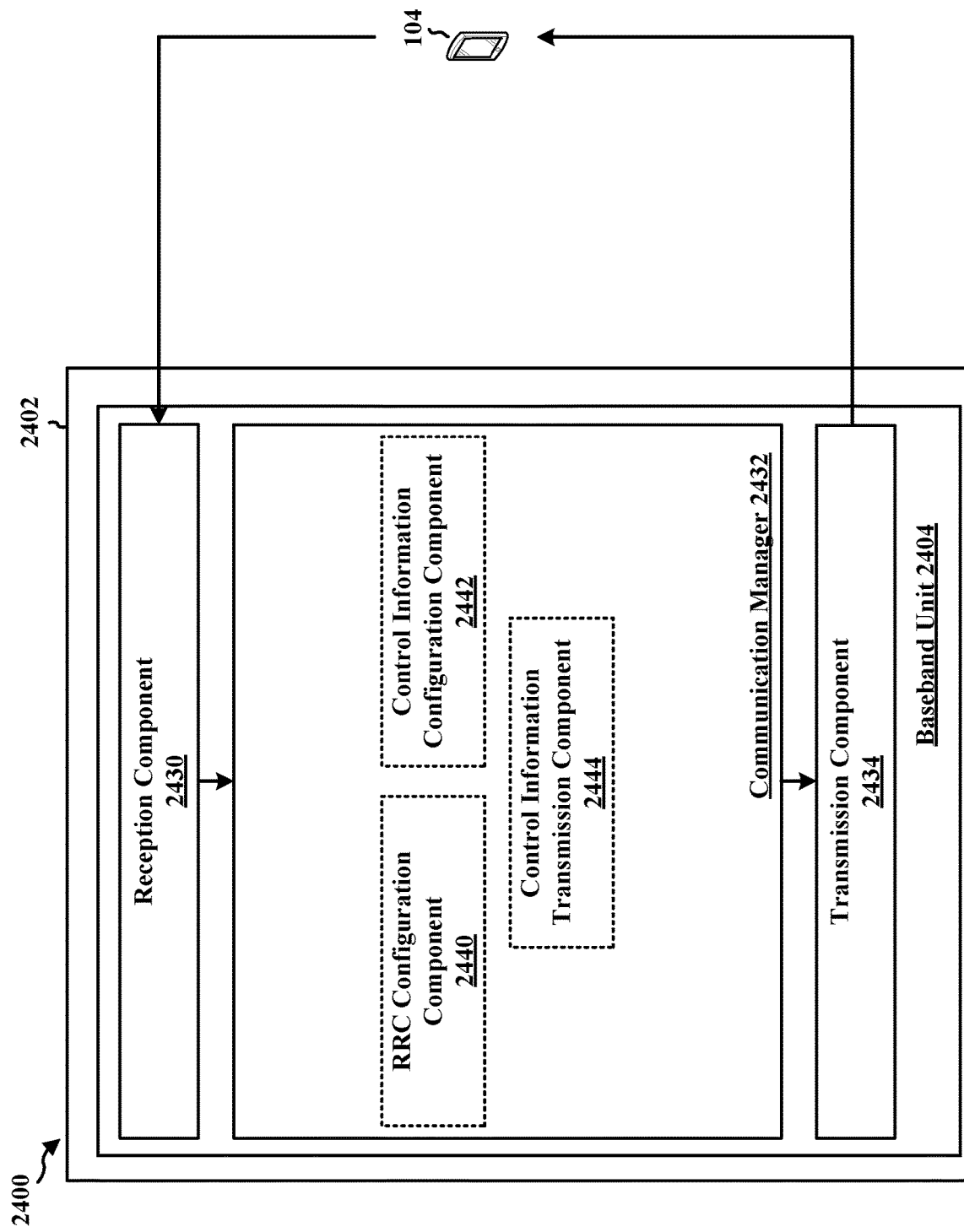
FIG. 24 is a diagram illustrating another example of a hardware implementation for another example apparatus.

FIG. 24 is a diagram 2400 illustrating an example of a hardware implementation for an apparatus 2402. The apparatus 2402 is a base station and includes a baseband unit 2404. The baseband unit 2404 may communicate through a cellular RF transceiver with the UE 104. The baseband unit 2404 may include a computer-readable medium/memory. The baseband unit 2404 is responsible for general processing, including the execution of software stored on the computer-readable medium/memory. The software, when executed by the baseband unit 2404, causes the baseband unit 2404 to perform the various functions described supra. The computer-readable medium/memory may also be used for storing data that is manipulated by the baseband unit 2404 when executing software. The baseband unit 2404 further includes a reception component 2430, a communication manager 2432, and a transmission component 2434. The communication manager 2432 includes the one or more illustrated components. The components within the communication manager 2432 may be stored in the computer-readable medium/memory and/or configured as hardware within the baseband unit 2404. The baseband unit may be a component of the device 410 and may include the memory 476 and/or at least one of the TX processor 416 the RX processor 470, and the controller/processor 475.

The communication manager 2432 includes an RRC configuration component 2440 that is configured to transmit a RRC configuration, e.g., as described in connection with 2202. The communication manager 2432 further includes a control information configuration component 2442 that is configured to configure control information indicating a sidelink data resource for a mini-slot, e.g., as described in connection with 2204. The communication manager 2432 further includes a control information transmission component 2444 that may receive input in the form of the sidelink data resource from the control information configuration component 2442 and is configured to transmit the control information to a UE, e.g., as described in connection with 2206.

The apparatus may include additional components that perform each of the blocks of the algorithm in the aforementioned flowcharts of FIGS. 20 and 22. As such, each block in the aforementioned flowcharts of FIGS. 20 and 22 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2402, and in particular the baseband unit 2404, includes means for configuring control information indicating a sidelink data resource for a mini-slot, and means for transmitting the control information to a UE. In one configuration, the control information may include a TDRA and a FDRA, the TDRA and the FDRA indicating the sidelink data resource, and the means for transmitting is further configured to transmit a RRC configuration indicating that the TDRA and FDRA are for a mini-slot based resource allocation.

Accordingly, aspects of the present disclosure allow a base station to indicate use of a mini-slot based resource allocation in sidelink communications between a Tx UE and a Rx UE. As a result, the scheduling latency for sidelink communications may be reduced, the number of available resources for sidelink communications may be increased, and more flexibility in sidelink communications may be achieved than in slot-based resource allocations. In some examples, the base station may indicate the mini-slot based resource allocation via a resource pool index in DCI, a cyclic redundancy check scrambling sequence for the DCI, a RRC configuration indicating a mini-slot based TDRA and FDRA, one or more dedicated fields in the DCI, a time resource indicator value (TRIV) for the TDRA and a frequency resource indicator value (FRIV) for the FDRA in the DCI, or a configuration index in the DCI. In other examples, the base station may configure the DCI to indicate the mini-slot based resource allocation via a common SLIV associated with configured sidelink data resources in different slots, individual SLIVs respectively associated with configured sidelink data resources in a same slot, or multiple SLIVs respectively associated with configured sidelink data resources in different slots, as well as via a number of repetitions for the sidelink data transmission and one or more slot timing offsets between respective pairs of the sidelink data resources. In additional examples, the Tx UE receiving the DCI may indicate the mini-slot based resource allocation in SCI to the Rx UE, and the Tx UE may inform the Rx UE of this mini-slot based resource allocation via a RP index or TDRA (which exclusively applies for Rx UEs capable of applying mini-slot based resource allocations), or via SCI-2 rather than SCI-1, to prevent erroneous interpretations of the resource allocation by other UEs. Alternatively, in another example, if the Rx UE and the Tx UE are both in coverage with the base station, the base station may inform the Rx UE of this mini-slot based resource allocation in a similar manner.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is an apparatus for wireless communication, comprising: a processor; memory coupled with the processor; and instructions stored in the memory and operable, when executed by the processor, to cause the apparatus to: receive control information indicating a sidelink data resource for a mini-slot; and communicate sidelink data in the sidelink data resource with a user equipment (UE).

Example 2 is the apparatus of Example 1, wherein the control information includes a resource pool index indicating use of a mini-slot based resource allocation to schedule the sidelink data resource.

Example 3 is the apparatus of Example 2, wherein the resource pool index further indicates a starting symbol and a number of symbols for the mini-slot.

Example 4 is the apparatus of any of Examples 1 to 3, wherein the control information includes a cyclic redundancy check (CRC) that is scrambled with a scrambling sequence to indicate use of a mini-slot based resource allocation to schedule the sidelink data resource.

Example 5 is the apparatus of any of Examples 1 to 4, wherein the control information includes a time domain resource assignment (TDRA) and a frequency domain resource assignment (FDRA), the TDRA and the FDRA indicating the sidelink data resource, and the instructions, when executed by the processor, further cause the apparatus to: receive a radio resource control (RRC) configuration indicating that the TDRA and FDRA are for a mini-slot based resource allocation.

Example 6 is the apparatus of any of Examples 1 to 5, wherein the control information includes a dedicated field for indicating use of a mini-slot based resource allocation to schedule the sidelink data resource.

Example 7 is the apparatus of any of Examples 1 to 6, wherein the instructions, when executed by the processor, further cause the apparatus to: transmit sidelink control information (SCI) including a time resource indicator value (TRIV) and a frequency resource indicator value (FRIV), wherein the TRIV and the FRIV indicate use of a mini-slot based resource allocation to schedule the sidelink data resource.

Example 8 is the apparatus of any of Examples 1 to 7, wherein the control information includes a configuration index that indicates use of a mini-slot based resource allocation to schedule the sidelink data resource.

Example 9 is the apparatus of any of Examples 1 to 8, wherein the control information includes a time domain resource assignment (TDRA), the TDRA indicates a start length indicator value (SLIV) for a plurality of sidelink data resources including the sidelink data resource, and the TDRA further indicates a time difference between a pair of the sidelink data resources.

Example 10 is the apparatus of Example 9, wherein the SLIV is the same for each of the sidelink data resources.

Example 11 is the apparatus of Example 9, wherein the TDRA further indicates a number of sidelink data repetitions, and each of the sidelink data repetitions is in one of the sidelink data resources.

Example 12 is the apparatus of Example 11, wherein each of the sidelink data resources is in a different slot.

Example 13 is the apparatus of Examples 11 or 12, wherein the control information includes a frequency domain resource assignment (FDRA), and the FDRA indicates a frequency hop between a pair of the sidelink data resources.

Example 14 is the apparatus of Example 9, wherein at least two of the sidelink data resources are in mini-slots within a slot.

Example 15 is the apparatus of Example 14, wherein one of the sidelink data resources is in a different slot from the slot.

Example 16 is the apparatus of Example 9, wherein the SLIV is different for each of the sidelink data resources.

Example 17 is the apparatus of any of Examples 1 to 16, wherein the instructions, when executed by the processor, further cause the apparatus to: transmit sidelink control information (SCI) to the UE and to a second UE, wherein the SCI indicates to the UE that the sidelink data resource is for the mini-slot, and the SCI indicates to the second UE that the sidelink data resource is for a slot.

Example 18 is the apparatus of any of Examples 1 to 16, wherein the instructions, when executed by the processor, further cause the apparatus to: refrain from transmitting sidelink control information (SCI) to the UE in response to an acknowledgement of the control information from the UE.

Example 19 is the apparatus of any of Examples 1 to 16, wherein the instructions, when executed by the processor, further cause the apparatus to: transmit first-stage sidelink control information (SCI) and second-stage SCI to the UE, wherein the second-stage SCI indicates that the sidelink data resource is for the mini-slot.

Example 20 is a method of wireless communication at a first user equipment (UE), comprising: receiving control information indicating a sidelink data resource for a mini-slot; and communicating sidelink data in the sidelink data resource with a second UE.

Example 21 is an apparatus for wireless communication, comprising: a processor; memory coupled with the processor; and instructions stored in the memory and operable, when executed by the processor, to cause the apparatus to: configure control information indicating a sidelink data resource for a mini-slot; and transmit the control information to a user equipment (UE).

Example 22 is the apparatus of Example 21, wherein the control information includes a resource pool index indicating use of a mini-slot based resource allocation to schedule the sidelink data resource.

Example 23 is the apparatus of Examples 21 or 22, wherein the control information includes a cyclic redundancy check (CRC) that is scrambled with a scrambling sequence to indicate use of a mini-slot based resource allocation to schedule the sidelink data resource.

Example 24 is the apparatus of any of Examples 21 to 23, wherein the control information includes a time domain resource assignment (TDRA) and a frequency domain resource assignment (FDRA), the TDRA and the FDRA indicating the sidelink data resource, and the instructions, when executed by the processor, further cause the apparatus to: transmit a radio resource control (RRC) configuration indicating that the TDRA and FDRA are for a mini-slot based resource allocation.

Example 25 is the apparatus of any of Examples 21 to 24, wherein the control information includes a dedicated field for indicating use of a mini-slot based resource allocation to schedule the sidelink data resource.

Example 26 is the apparatus of any of Examples 21 to 25, wherein the control information includes a configuration index that indicates use of a mini-slot based resource allocation to schedule the sidelink data resource.

Example 27 is a method of wireless communication at a base station, comprising: configuring control information indicating a sidelink data resource for a mini-slot; and transmitting the control information to a UE.

Example 28 is the apparatus of Example 1, wherein the sidelink data is communicated from the UE to the apparatus, and the control information is first-stage sidelink control information (SCI) or second-stage SCI.

Example 29 is the apparatus of Example 1, wherein the sidelink data is communicated from the UE to the apparatus, and the control information is downlink control information (DCI), and the instructions, when executed by the processor, further cause the apparatus to: transmit an acknowledgment of the control information.

Example 30 is the apparatus of any of Examples 1 to 19, wherein the control information indicates use of a mini-slot based resource allocation to schedule the sidelink data resource, the mini-slot based resource allocation including more than one resource reservation in a slot.

What is claimed is:

1. An apparatus for wireless communication, comprising:
   a processor;
   memory coupled with the processor; and
   instructions stored in the memory and operable, when executed by the processor, to cause the apparatus to:
   receive control information indicating a sidelink data resource for a mini-slot, the control information indicating use of a mini-slot based resource allocation to schedule the sidelink data resource; and
   communicate sidelink data in the sidelink data resource with a user equipment (UE).

2. The apparatus of claim 1, wherein the control information includes a resource pool index indicating use of the mini-slot based resource allocation to schedule the sidelink data resource.

3. The apparatus of claim 2, wherein the resource pool index further indicates a starting symbol and a number of symbols for the mini-slot.

4. The apparatus of claim 1, wherein the control information includes a cyclic redundancy check (CRC) that is scrambled with a scrambling sequence to indicate use of the mini-slot based resource allocation to schedule the sidelink data resource.

5. The apparatus of claim 1, wherein the control information includes a time domain resource assignment (TDRA) and a frequency domain resource assignment (FDRA), the TDRA and the FDRA indicating the sidelink data resource, and the instructions, when executed by the processor, further cause the apparatus to:
   receive a radio resource control (RRC) configuration indicating that the TDRA and the FDRA are for the mini-slot based resource allocation.

6. The apparatus of claim 1, wherein the control information includes a dedicated field for indicating use of the mini-slot based resource allocation to schedule the sidelink data resource.

7. The apparatus of claim 1, wherein the instructions, when executed by the processor, further cause the apparatus to:
   transmit sidelink control information (SCI) including a time resource indicator value (TRIV) and a frequency resource indicator value (FRIV), wherein the TRIV and the FRIV indicate use of the mini-slot based resource allocation to schedule the sidelink data resource.

8. The apparatus of claim 1, wherein the control information includes a configuration index associated with a configured grant configuration that indicates use of the mini-slot based resource allocation to schedule the sidelink data resource.

9. The apparatus of claim 1, wherein the control information includes a time domain resource assignment (TDRA), the TDRA indicates a start length indicator value (SLIV) for a plurality of sidelink data resources including the sidelink data resource for the mini-slot, and the TDRA further indicates a time difference between a pair of the sidelink data resources.

10. The apparatus of claim 9, wherein the SLIV is the same for each of the sidelink data resources.

11. The apparatus of claim 9, wherein the TDRA further indicates a number of sidelink data repetitions, and each of the sidelink data repetitions is in one of the sidelink data resources.

12. The apparatus of claim 11, wherein each of the sidelink data resources is in a different slot.

13. The apparatus of claim 11, wherein the control information includes a frequency domain resource assignment (FDRA), and the FDRA indicates a frequency hop between the pair of the sidelink data resources including the sidelink data resource for the mini-slot.

14. The apparatus of claim 9, wherein at least two of the sidelink data resources are in mini-slots within a slot.

15. The apparatus of claim 14, wherein one of the sidelink data resources is in a different slot from the slot.

16. The apparatus of claim 9, wherein the SLIV is different for each of the sidelink data resources including the sidelink data resource for the mini-slot.

17. The apparatus of claim 1, wherein the instructions, when executed by the processor, further cause the apparatus to:
transmit sidelink control information (SCI) to the UE and to a second UE, wherein the SCI indicates to the UE that the sidelink data resource is for the mini-slot, and the SCI indicates to the second UE that the sidelink data resource is for a slot.

18. The apparatus of claim 1, wherein the instructions, when executed by the processor, further cause the apparatus to:
refrain from transmitting sidelink control information (SCI) to the UE in response to an acknowledgement of the control information from the UE.

19. The apparatus of claim 1, wherein the instructions, when executed by the processor, further cause the apparatus to:
transmit first-stage sidelink control information (SCI) and second-stage SCI to the UE, wherein the second-stage SCI indicates that the sidelink data resource is for the mini-slot.

20. The apparatus of claim 1, wherein the sidelink data is communicated from the UE to the apparatus, and the control information is first-stage sidelink control information (SCI) or second-stage SCI.

21. The apparatus of claim 1, wherein the sidelink data is communicated from the UE to the apparatus, the control information is downlink control information (DCI), and the instructions, when executed by the processor, further cause the apparatus to:
transmit an acknowledgment of the control information.

22. The apparatus of claim 1, wherein the mini-slot based resource allocation includes more than one resource reservation in a slot.

23. A method of wireless communication at a first user equipment (UE), comprising:
receiving control information indicating a sidelink data resource for a mini-slot, the control information indicating use of a mini-slot based resource allocation to schedule the sidelink data resource; and
transmitting sidelink data in the sidelink data resource to a second UE.

24. An apparatus for wireless communication, comprising:
a processor;
memory coupled with the processor; and
instructions stored in the memory and operable, when executed by the processor, to cause the apparatus to:
configure control information indicating a sidelink data resource for a mini-slot, the control information indicating use of a mini-slot based resource allocation to schedule the sidelink data resource; and
transmit the control information to a user equipment (UE).

25. The apparatus of claim 24, wherein the control information includes a resource pool index indicating use of the mini-slot based resource allocation to schedule the sidelink data resource.

26. The apparatus of claim 24, wherein the control information includes a cyclic redundancy check (CRC) that is scrambled with a scrambling sequence to indicate use of the mini-slot based resource allocation to schedule the sidelink data resource.

27. The apparatus of claim 24, wherein the control information includes a time domain resource assignment (TDRA) and a frequency domain resource assignment (FDRA), the TDRA and the FDRA indicating the sidelink data resource, and the instructions, when executed by the processor, further cause the apparatus to:
transmit a radio resource control (RRC) configuration indicating that the TDRA and the FDRA are for the mini-slot based resource allocation.

28. The apparatus of claim 24, wherein the control information includes a dedicated field for indicating use of the mini-slot based resource allocation to schedule the sidelink data resource.

29. The apparatus of claim 24, wherein the control information includes a configuration index associated with a configured grant configuration that indicates use of the mini-slot based resource allocation to schedule the sidelink data resource.

30. A method of wireless communication at a base station, comprising:
configuring control information indicating a sidelink data resource for a mini-slot, the control information indicating use of a mini-slot based resource allocation to schedule the sidelink data resource; and
transmitting the control information to a user equipment (UE).

* * * * *